US011096216B2

(12) United States Patent
Si et al.

(10) Patent No.: US 11,096,216 B2
(45) Date of Patent: Aug. 17, 2021

(54) METHOD AND APPARATUS FOR INITIAL ACCESS BLOCK ON STAND-ALONE NR UNLICENSED SPECTRUM

(71) Applicant: Samsung Electronics Co., Ltd, Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 16/213,208

(22) Filed: Dec. 7, 2018

(65) Prior Publication Data
US 2019/0191457 A1 Jun. 20, 2019

Related U.S. Application Data

(60) Provisional application No. 62/771,290, filed on Nov. 26, 2018, provisional application No. 62/751,059, (Continued)

(51) Int. Cl.
*H04W 74/08* (2009.01)
*H04W 16/14* (2009.01)
(52) U.S. Cl.
CPC ........ *H04W 74/0808* (2013.01); *H04W 16/14* (2013.01)
(58) Field of Classification Search
None
See application file for complete search history.

(56) References Cited

U.S. PATENT DOCUMENTS 10,057,785 B2 8/2018 Kwak et al.
2011/0312316 A1* 12/2011 Baldemair ............ H04W 24/10
455/422.1
(Continued)

FOREIGN PATENT DOCUMENTS

WO 2016/186406 A1 11/2016

OTHER PUBLICATIONS

"3rd Generation Partnership Project;Technical Specification Group Radio Access Network; Evolved Universal Terrestrial Radio Access (E-UTRA); Physical channels and modulation (Release 13)", 3GPP TS 36.211 V13.2.0, Jun. 2016, 168 pages.
(Continued)

*Primary Examiner* — Andrew C Oh

(57) ABSTRACT

A UE in a wireless communication system is provided. The UE comprises at least one processor configured to identify a DTTC including at least one of a first periodicity, a duration of a first transmission window, or a first timing offset of the first transmission window, wherein the DTTC is identified for the DSCH or RLM in a serving cell, and identify a DMTC including at least one of a second periodicity, a duration of a second transmission window, or a second timing offset of the second transmission window, wherein the DMTC is identified for RRM measurement based on the DSCH. The UE further comprises a transceiver operably connected to the processor, the transceiver configured to receive, from a BS, at least one DSCH from a set of DSCH over unlicensed downlink channels based on the identified DTTC, wherein the received at least one DSCH includes a SS/PBCH block.

21 Claims, 28 Drawing Sheets

Related U.S. Application Data filed on Oct. 26, 2018, provisional application No. 62/725,701, filed on Aug. 31, 2018, provisional application No. 62/714,362, filed on Aug. 3, 2018, provisional application No. 62/681,346, filed on Jun. 6, 2018, provisional application No. 62/608,821, filed on Dec. 21, 2017, provisional application No. 62/607,134, filed on Dec. 18, 2017.

(56) References Cited

U.S. PATENT DOCUMENTS

| | | | |
|---|---|---|---|
| 2013/0176952 A1* | 7/2013 | Shin | H04W 72/042 370/329 |
| 2015/0092768 A1* | 4/2015 | Ng | H04J 11/0069 370/350 |
| 2015/0207601 A1* | 7/2015 | Kim | H04L 5/005 370/329 |
| 2015/0223149 A1 | 8/2015 | Liu et al. | |
| 2015/0350941 A1* | 12/2015 | You | H04W 84/045 370/252 |
| 2016/0100404 A1* | 4/2016 | Han | H04L 5/00 370/329 |
| 2016/0127098 A1 | 5/2016 | Ng et al. | |
| 2016/0366576 A1* | 12/2016 | You | H04L 5/0094 |
| 2017/0048690 A1 | 2/2017 | Yang et al. | |
| 2017/0070312 A1* | 3/2017 | Yi | H04W 72/0406 |
| 2017/0078953 A1* | 3/2017 | You | H04L 5/0053 |
| 2017/0223737 A1* | 8/2017 | Patel | H04W 56/0015 |
| 2017/0289818 A1* | 10/2017 | Ng | H04L 5/0092 |
| 2017/0325216 A1* | 11/2017 | Nogami | H04L 1/1896 |
| 2018/0042028 A1* | 2/2018 | Nam | H04B 7/0626 |
| 2018/0049203 A1* | 2/2018 | Xue | H04L 5/0053 |
| 2018/0098361 A1* | 4/2018 | Ji | H04L 5/0007 |
| 2018/0115996 A1* | 4/2018 | Si | H04W 74/0808 |
| 2018/0123744 A1* | 5/2018 | Nogami | H04L 1/1854 |
| 2018/0124744 A1* | 5/2018 | Xue | H04W 72/005 |
| 2018/0139082 A1* | 5/2018 | Chen | H04L 5/0051 |
| 2018/0167946 A1* | 6/2018 | Si | H04L 1/0061 |
| 2018/0176942 A1* | 6/2018 | Kim | H04W 72/04 |
| 2018/0184390 A1* | 6/2018 | Wu | H04L 27/2692 |
| 2018/0184410 A1* | 6/2018 | John Wilson | H04L 5/0053 |
| 2018/0213561 A1* | 7/2018 | Bhorkar | H04W 74/0808 |
| 2018/0242232 A1* | 8/2018 | Chendamarai Kannan | H04B 7/0695 |
| 2018/0255578 A1* | 9/2018 | Kim | H04W 74/0808 |
| 2018/0262900 A1* | 9/2018 | Moon | H04L 5/005 |
| 2018/0302842 A1* | 10/2018 | Sugirtharaj | H04L 5/0044 |
| 2018/0310282 A1* | 10/2018 | Shi | H04L 5/0092 |
| 2019/0013909 A1* | 1/2019 | Li | H04W 74/0808 |
| 2019/0028253 A1* | 1/2019 | Ahn | H04W 48/16 |
| 2019/0053274 A1* | 2/2019 | Kim | H04W 48/16 |
| 2019/0081821 A1* | 3/2019 | Bendlin | H04L 25/03904 |
| 2019/0150196 A1* | 5/2019 | Koorapaty | H04L 1/1812 370/329 |
| 2019/0159243 A1* | 5/2019 | Tao | H04W 16/14 |
| 2019/0174510 A1* | 6/2019 | Shin | H04L 5/0044 |
| 2019/0215217 A1* | 7/2019 | Kim | H04L 27/2613 |
| 2019/0229867 A1* | 7/2019 | Yi | H04L 5/0048 |
| 2019/0230580 A1* | 7/2019 | Kim | H04L 5/0053 |
| 2019/0239059 A1* | 8/2019 | Koorapaty | H04W 56/001 |
| 2019/0254076 A1* | 8/2019 | Siomina | H04L 5/00 |
| 2019/0268208 A1* | 8/2019 | Seo | H04W 72/0406 |
| 2019/0274094 A1* | 9/2019 | Lu | H04L 5/0048 |
| 2019/0281636 A1* | 9/2019 | Liu | H04W 74/0833 |
| 2019/0297601 A1* | 9/2019 | You | H04L 27/2605 |
| 2019/0306847 A1* | 10/2019 | Seo | H04L 25/022 |
| 2019/0313451 A1* | 10/2019 | Liu | H04W 74/0808 |
| 2019/0342915 A1* | 11/2019 | Kim | H04W 72/0446 |
| 2019/0356524 A1* | 11/2019 | Yi | H04L 5/0094 |
| 2020/0008241 A1* | 1/2020 | Zhou | H04W 74/0816 |
| 2020/0059810 A1* | 2/2020 | Harada | H04W 56/0015 |
| 2020/0068378 A1* | 2/2020 | Lunden | H04W 74/0808 |
| 2020/0100221 A1* | 3/2020 | Tang | H04J 11/0076 |
| 2020/0119874 A1* | 4/2020 | Liu | H04L 5/0048 |
| 2020/0128578 A1* | 4/2020 | Park | H04L 5/00 |
| 2020/0145939 A1* | 5/2020 | Harada | H04W 72/005 |
| 2020/0145950 A1* | 5/2020 | Harada | H04W 72/042 |
| 2020/0162222 A1* | 5/2020 | Liu | H04W 72/042 |
| 2020/0288417 A1* | 9/2020 | Harada | H04W 24/10 |
| 2020/0305013 A1* | 9/2020 | Nurminen | H04L 5/0098 |

OTHER PUBLICATIONS

"3rd Generation Partnership Project;Technical Specification Group Radio Access Network; Evolved Universal Terrestrial Radio Access (E-UTRA); Physical layer procedures (Release 13)", 3GPP TS 36.213 V13.2.0, Jun. 2016, 756 pages.

"3rd Generation Partnership Project;Technical Specification Group Radio Access Network; Evolved Universal Terrestrial Radio Access (E-UTRA); Medium Access Control (MAC) protocol specification (Release 13)", 3GPP TS 36.321 V13.2.0, Jun. 2016, 91 pages.

"3rd Generation Partnership Project;Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, 623 pages.

International Search Report dated Mar. 8, 2019 in connection with International Patent Application No. PCT/KR2018/015960, 3 pages.

"3rd Generation Partnership Project; Technical Specification Group Radio Access Network; Evolved Universal Terrestrial Radio Access (E-UTRA); Physical channels and modulation (Release 14)", 3GPP TS 36.211 V14.4.0 (Sep. 2017), 87 pages.

\* cited by examiner

METHOD AND APPARATUS FOR INITIAL ACCESS BLOCK ON STAND-ALONE NR UNLICENSED SPECTRUM

CROSS-REFERENCE TO RELATED APPLICATION(S) AND CLAIM OF PRIORITY

The present application claims priority to:
U.S. Provisional Patent Application Ser. No. 62/607,134, filed on Dec. 18, 2017;
U.S. Provisional Patent Application Ser. No. 62/608,821, filed on Dec. 21, 2017;
U.S. Provisional Patent Application Ser. No. 62/681,346, filed on Jun. 6, 2018;
U.S. Provisional Patent Application Ser. No. 62/714,362, filed on Aug. 3, 2018;
U.S. Provisional Patent Application Ser. No. 62/725,701, filed on Aug. 31, 2018;
U.S. Provisional Patent Application Ser. No. 62/751,059, filed on Oct. 26, 2018; and
U.S. Provisional Patent Application Ser. No. 62/771,290, filed on Nov. 26, 2018.
The content of the above-identified patent documents are incorporated herein by reference.

TECHNICAL FIELD

The present application relates generally to discovery signal and channel. More specifically, this disclosure relates to channel design for the discovery signal.

BACKGROUND

For a new radio (NR) licensed spectrum, each synchronization and physical broadcasting channel (PBCH) signal block (SS/PBCH block) comprises one symbol for NR-primary synchronization signal (NR-PSS), two symbols for NR-PBCH, and one symbol for NR-secondary synchronization signal (NR-SSS) and NR-PBCH, where the four symbols are mapped consecutively and time division multiplexed. An NR-SS is a unified design, including the NR-PSS and NR-SSS sequence design, for all supported carrier frequency ranges in the NR. The transmission bandwidth of NR-PSS and NR-SSS is smaller than the transmission bandwidth of the whole SS/PBCH block. For initial cell selection for an NR cell, a UE assumes the default SS burst set periodicity as 20 ms, and for detecting a non-standalone NR cell, network provides one SS burst set periodicity information per frequency carrier to the UE and information to derive measurement timing/duration. Other than a master information block (MIB), the remaining minimum system information (RMSI) is carried by physical downlink shared channel (PDSCH) with scheduling info carried by the corresponding physical downlink control channel (PDCCH). A control resource set (CORESET) for receiving common control channels is required to be configured, and can be transmitted in PBCH.

SUMMARY

Embodiments of the present disclosure provide discovery signal and channel.

In one embodiment, a base station (BS) in a wireless communication system is provided. The BS comprises at least one processor configured to identify a set of discovery signals and channels (DSCH) including a set of synchronization signals and physical broadcast channel (SS/PBCH) blocks, identify a DSCH transmission timing configuration (DTTC) including at least one of a first periodicity, a duration of a first transmission window, or a first timing offset of the first transmission window, wherein the DTTC is identified for at least one of a transmission of the set of DSCH or radio link monitoring (RLM) in a serving cell, identify a DSCH measurement timing configuration (DMTC) including at least one of a second periodicity, a duration of a second transmission window, or a second timing offset of the second transmission window, wherein the DMTC is identified for radio resource management (RRM) measurement based on the set of DSCH, and perform a channel access procedure based on listen-before-talk (LBT) procedure for the set of DSCH based on the identified DTTC. The BS further comprises a transceiver operably connected to the processor, the transceiver configured to transmit, to a user equipment (UE), the set of DSCH over unlicensed downlink channels based on the LBT procedure.

In another embodiment, a user equipment (UE) in a wireless communication system is provided. The UE comprises at least one processor configured to identify a discovery signals and channels (DSCH) transmission timing configuration (DTTC) including at least one of a first periodicity, a duration of a first transmission window, or a first timing offset of the first transmission window, wherein the DTTC is identified for the DSCH or radio link monitoring (RLM) in a serving cell, and identify a DSCH measurement timing configuration (DMTC) including at least one of a second periodicity, a duration of a second transmission window, or a second timing offset of the second transmission window, wherein the DMTC is identified for radio resource management (RRM) measurement based on the DSCH. The UE further comprises a transceiver operably connected to the processor, the transceiver configured to receive, from a base station (BS), at least one DSCH from a set of DSCH over unlicensed downlink channels based on the identified DTTC, wherein the received at least one DSCH includes a synchronization signals and physical broadcast channel (SS/PBCH) block.

In yet another embodiment, a method of base station (BS) in a wireless communication system is provided The method comprises identifying a set of discovery signals and channels (DSCH) including a set of synchronization signals and physical broadcast channel (SS/PBCH) blocks, identifying a DSCH transmission timing configuration (DTTC) including at least one of a first periodicity, a duration of a first transmission window, or a first timing offset of the first transmission window, wherein the DTTC is identified for at least one of a transmission of the set of DSCH or radio link monitoring (RLM) in a serving cell, identifying a DSCH measurement timing configuration (DMTC) including at least one of a second periodicity, a duration of a second transmission window, or a second timing offset of the second transmission window, wherein the DMTC is identified for radio resource management (RRM) measurement based on the set of DSCH, performing a channel access procedure based on listen-before-talk (LBT) procedure for the set of DSCH based on the identified DTTC, and transmitting, to a user equipment (UE), the set of DSCH over unlicensed downlink channels based on the LBT procedure.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
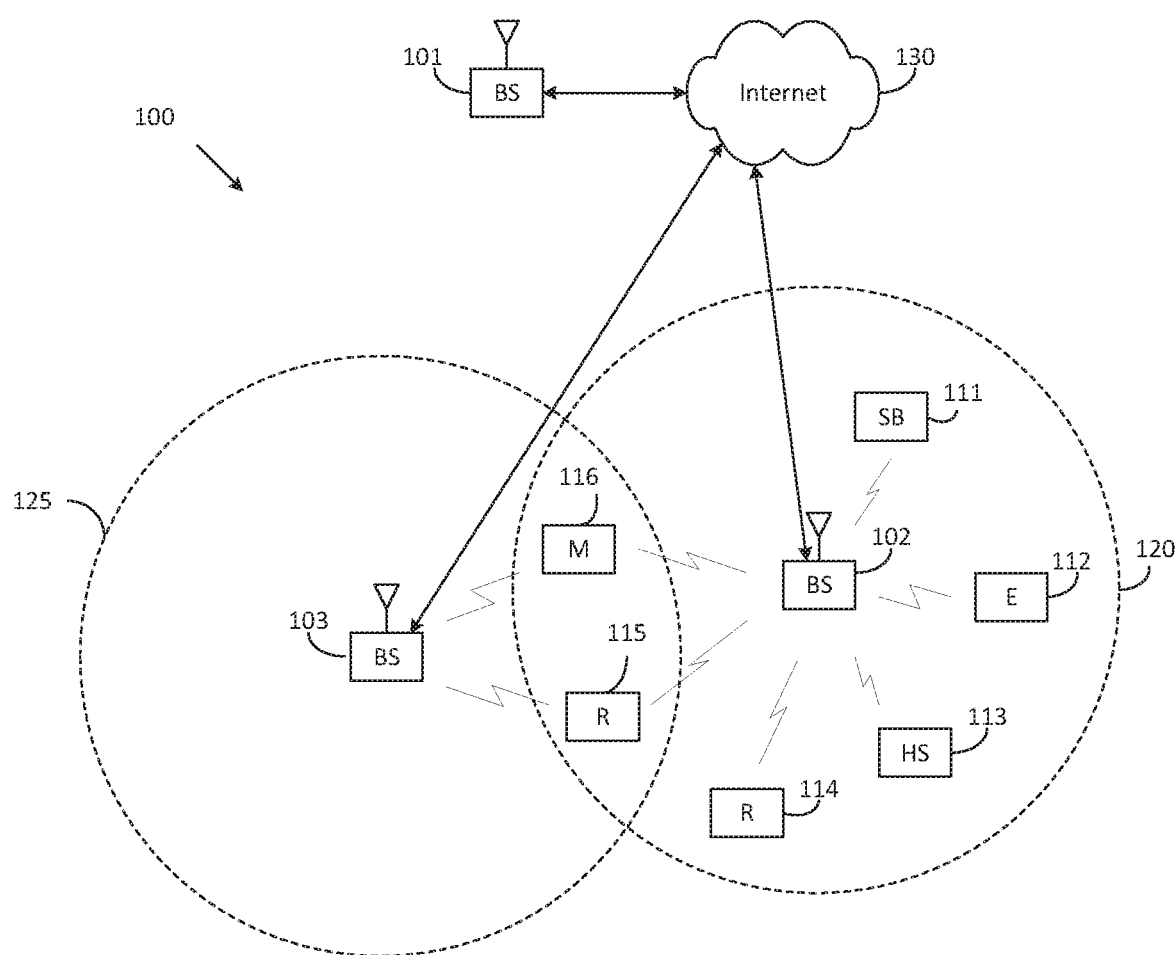
FIG. 1 illustrates an example wireless network according to embodiments of the present disclosure.
Figure 2:
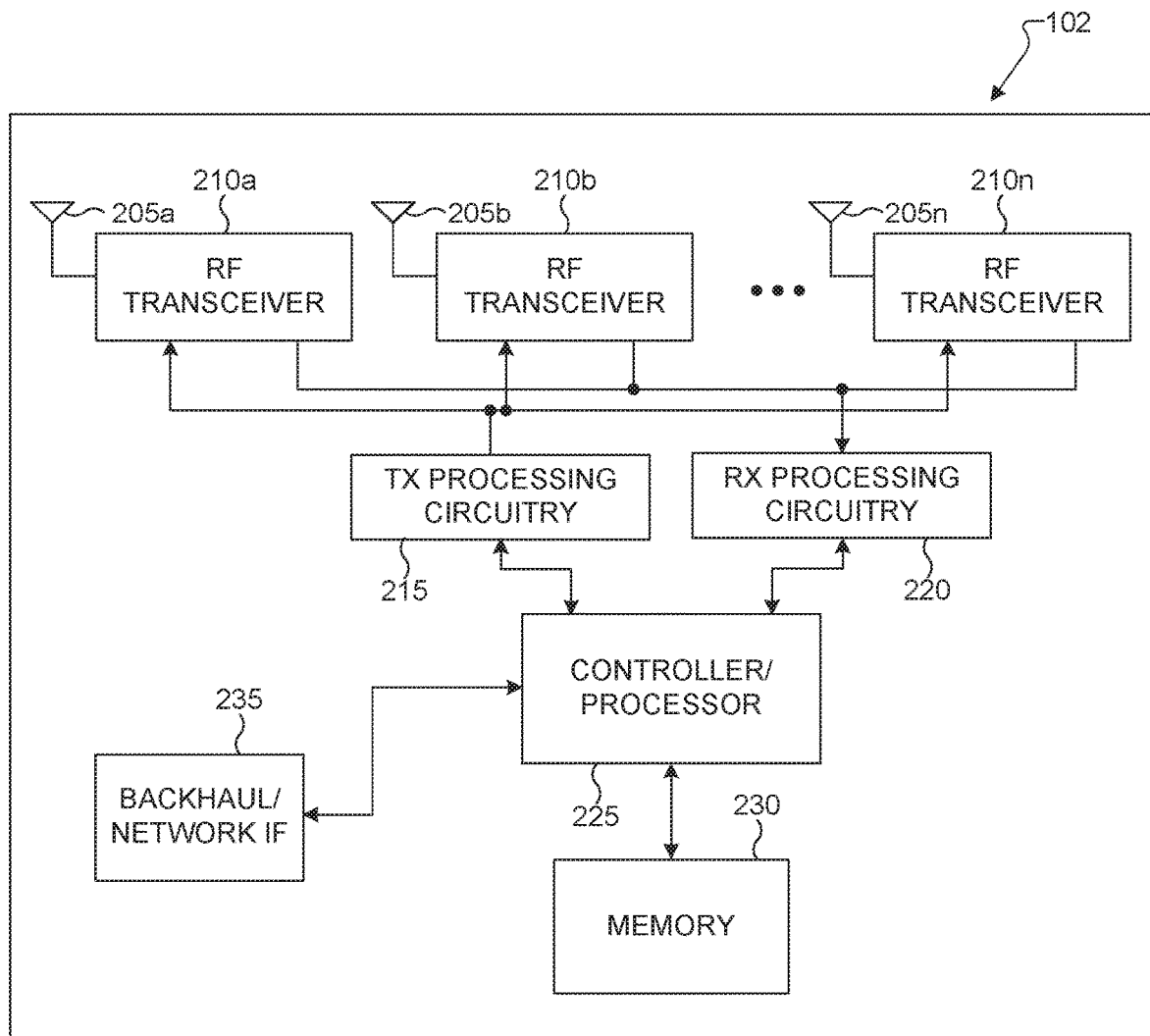
FIG. 2 illustrates an example eNB according to embodiments of the present disclosure.
Figure 3:
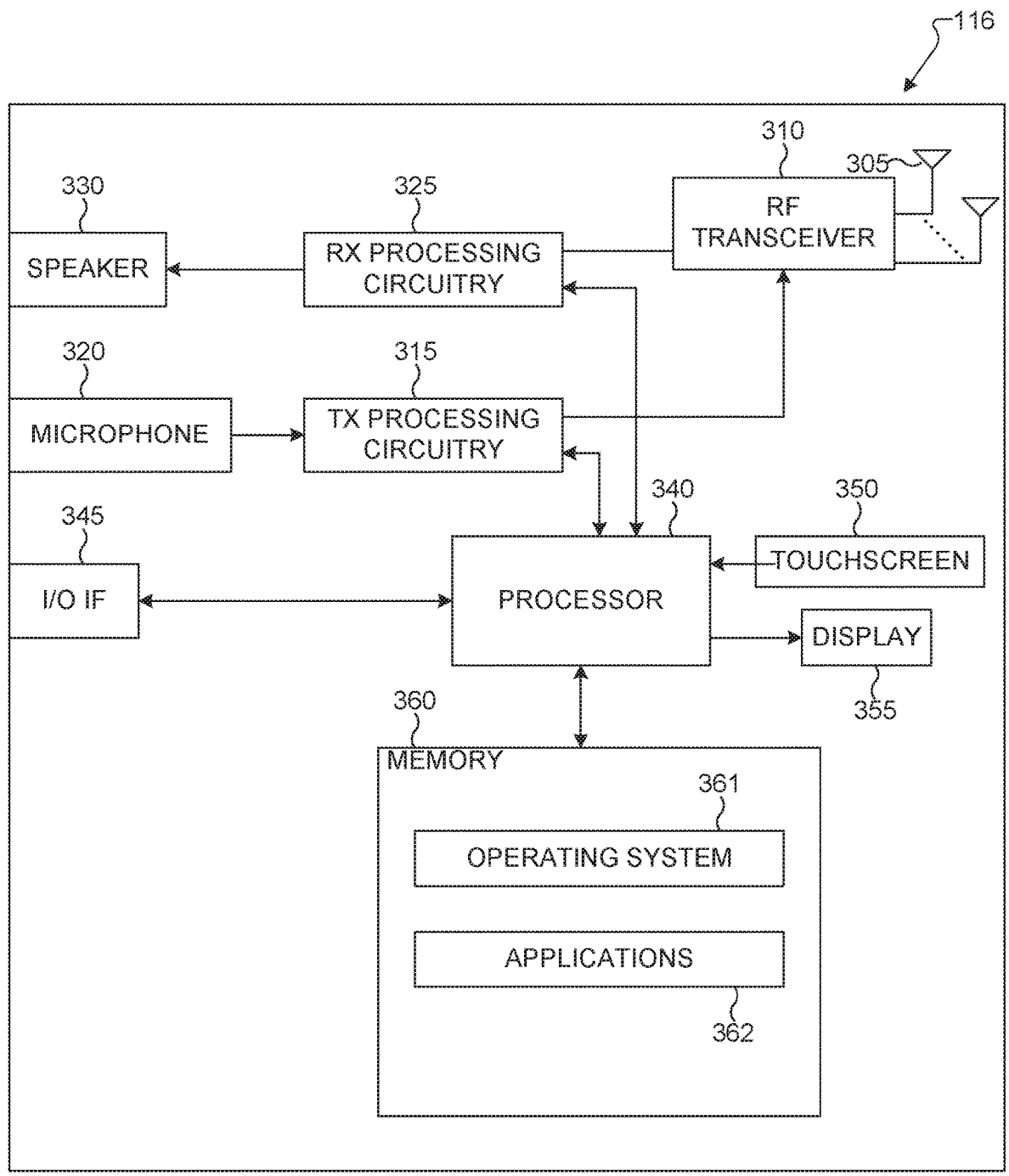
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient discovery signal and channel. In certain embodiments, and one or more of the eNBs 101-103 includes circuitry, programming, or a combination thereof, for efficient discovery signal and channel.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
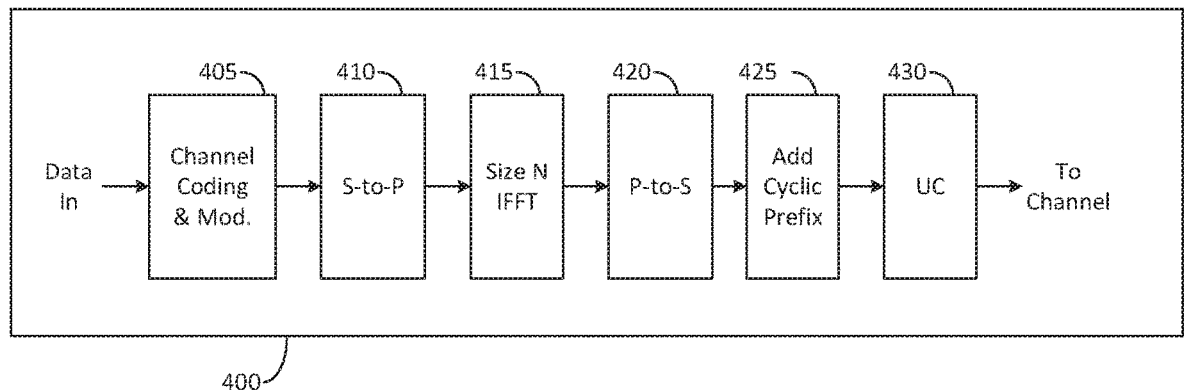
FIG. 4A illustrates a high-level diagram of an orthogonal frequency division multiple access transmit path according to embodiments of the present disclosure.
Figure 4B:
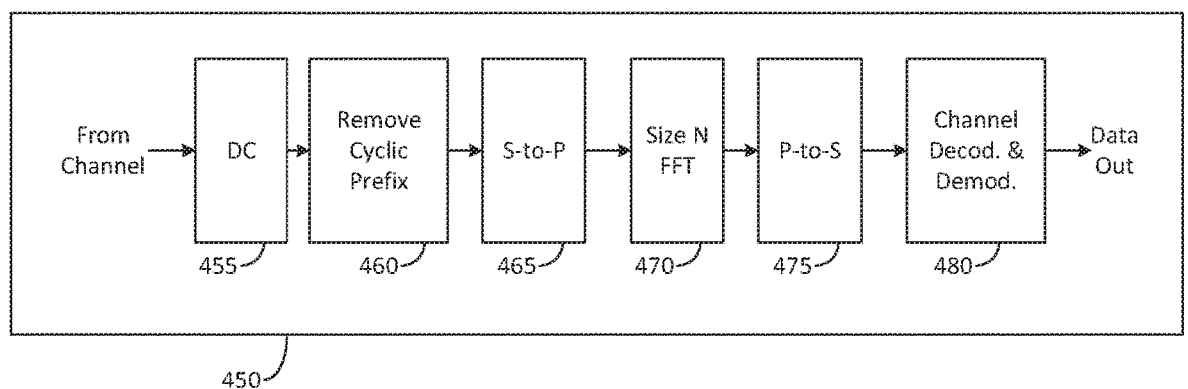
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1) - N_{SRS}$, where $N_{SRS}=1$ if a last subframe symbol is used to transmit SRS and $N_{SRS}=0$ otherwise.

Figure 5:
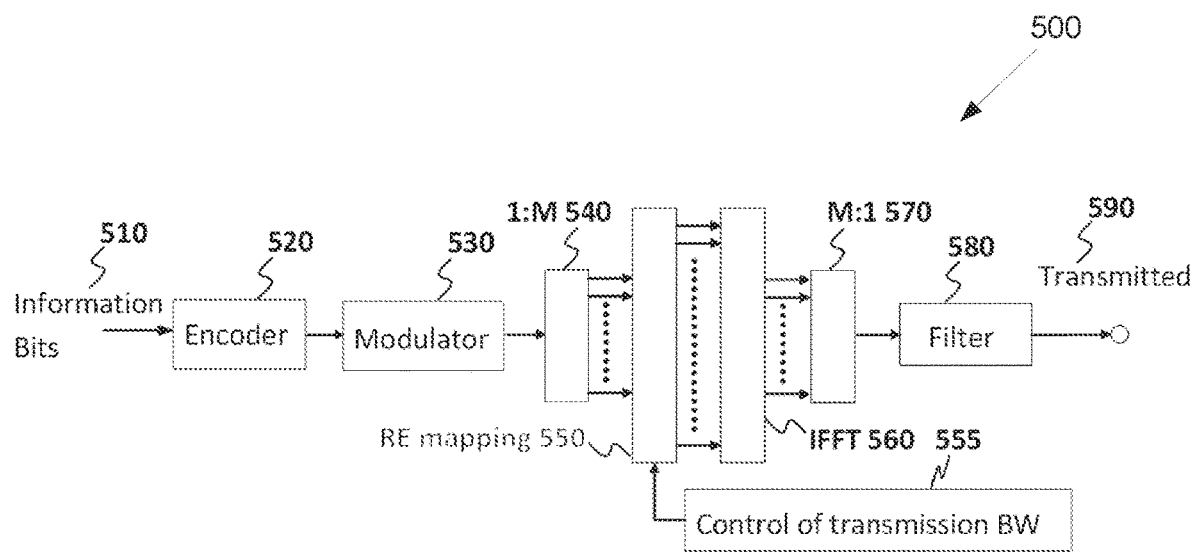
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
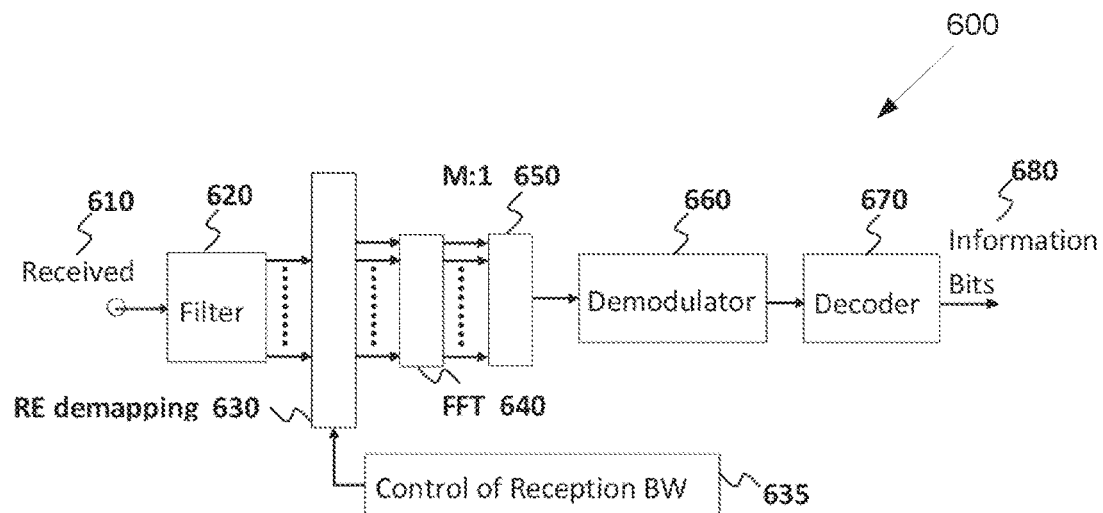
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
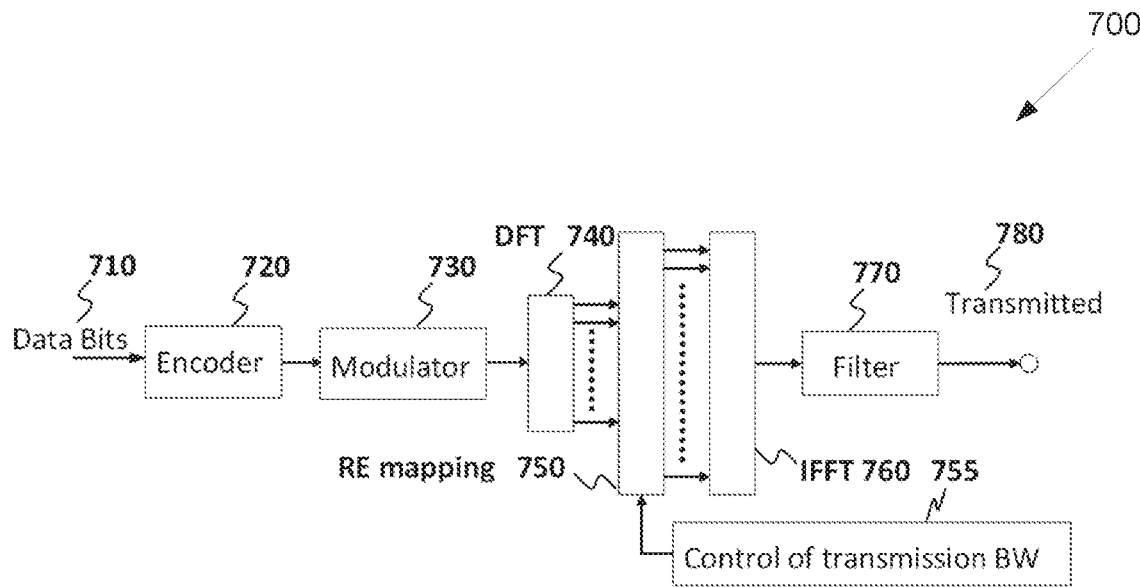
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
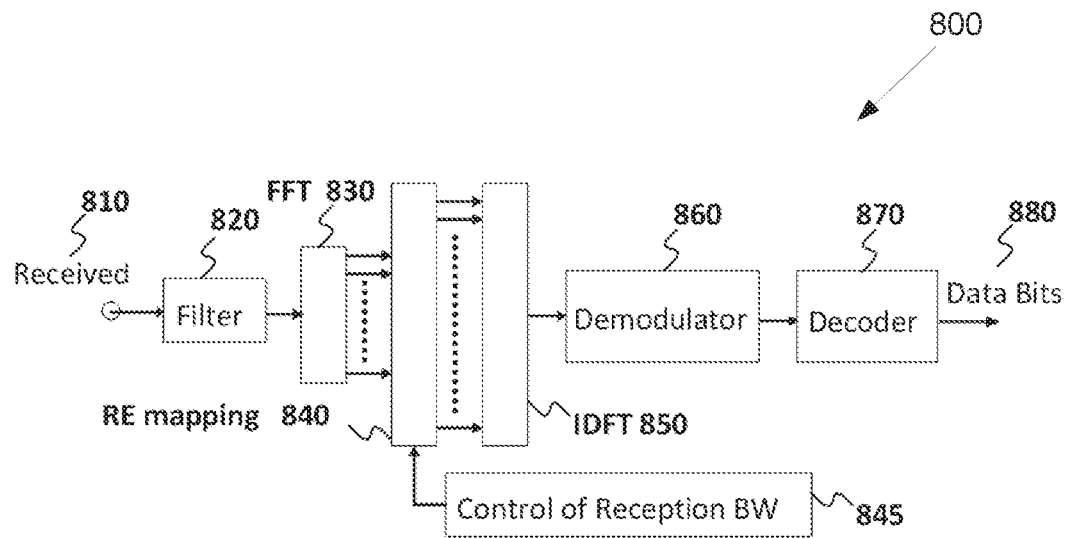
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Power consumption and battery life are very important for terminals in an internet of thing (IoT). In a narrowband IoT (NB-IoT) or an enhanced machine type communication (eMTC) system, the power of terminal devices can be saved by means of configuring a power saving mode (PSM) or an extended discontinuous reception (eDRX) mode. However, a UE is unable to listen paging messages during sleep in the PSM mode or the eDRX mode. In some IoT application scenarios, a UE is required to establish a connection with a network within a certain period of time after receiving a network command. Then the UE that has the requirement cannot be configured with the PSM mode or the eDRX mode that has a relatively long period.

In NB-IoT and an enhanced version of eMTC system, to enable a UE to be paged, and meanwhile to save power, a wake-up or sleep signal/channel is introduced after study and research. The wake-up signal/channel is configured to wake up a UE, i.e., a case where the UE needs to continue to monitor a subsequent MTC physical downlink control channel (MPDCCH) that is used to indicate a paging message. The sleep signal/channel is configured to instruct that a UE may enter into a sleep state, i.e., a case where the UE does not need to monitor a subsequent MPDCCH that is used to indicate a paging message.

In a multi-carrier system, a carrier that transmits a synchronization signal is called an anchor carrier, and in an LTE system, a paging signal is transmitted on an anchor carrier. In an NB-IoT system, a scheme for transmitting paging messages on non-anchor carriers is introduced. In the eMTC system, multiple narrowbands are defined, in which a narrowband has 6 physical resource blocks (PRBs), and the concept of paging narrowband is introduced. In addition, in the eMTC system, a downlink control channel for MTC, MPDCCH, is configured to indicate a paging message, and different UEs may monitor MPDCCHs on different narrowbands. Similarly, in an ongoing 5G new radio (NR) system, there is a situation where the bandwidth of a UE is smaller than a system bandwidth, and in this case, multiple bandwidth parts may be defined for a paging channel. For the case of multi-carrier or narrowbands or partial bandwidths, it is an issue yet to be solved that how to transmit and receive a wake-up or sleep signal.

Figure 9:
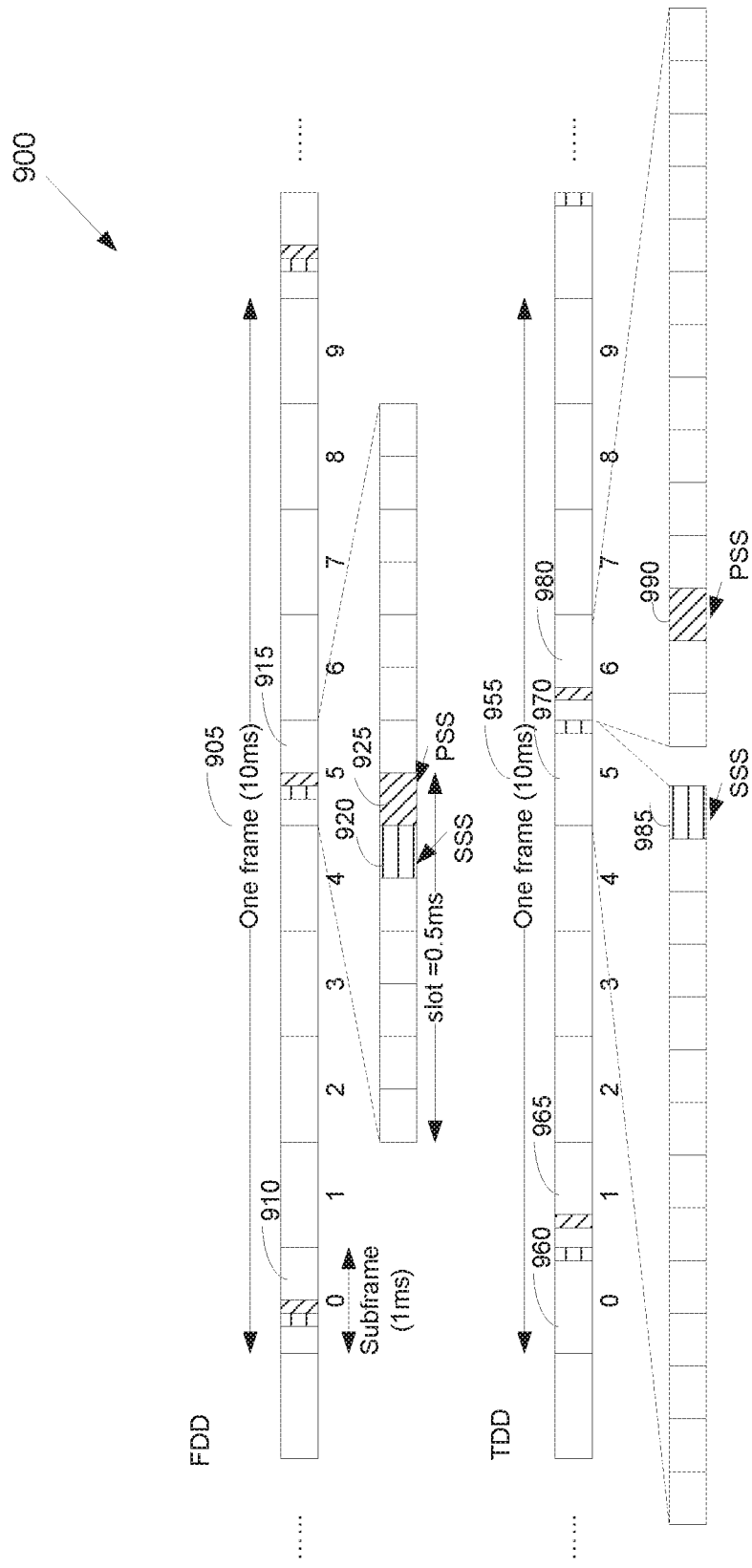
FIG. 9 illustrates an example time domain positions for the mapping of PSS/SSS for FDD and TDD according to embodiments of the present disclosure.

FIG. 9 illustrates an example time domain positions 900 for the mapping of PSS/SSS for FDD and TDD according to embodiments of the present disclosure. The embodiment of the time domain positions 900 illustrated in FIG. 9 is for illustration only. FIG. 9 does not limit the scope of this disclosure to any particular implementation.

Referring to FIG. 9, in case of FDD, in every frame (905), a PSS (925) is transmitted within a last symbol of a first slot of subframes 0 and 5 (910 and 915), wherein a subframe includes two slots. An SSS (920) is transmitted within a second last symbol of a same slot. In case of TDD, in every frame (955), a PSS (990) is transmitted within a third symbol of subframes 1 and 6 (965 and 980), while an (SSS) 985 is transmitted in a last symbol of subframes 0 and 5 (960 and 970). The difference allows for the detection of the duplex scheme on a cell. The resource elements for PSS and SSS are not available for transmission of any other type of DL signals.

In the present disclosure, numerology refers to a set of signal parameters which can include subframe duration, sub-carrier spacing, cyclic prefix length, transmission bandwidth, or any combination of these signal parameters.

For LTE initial access, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier.

Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group.

Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master information block (MIB) which consists of DL and UL system bandwidth information (3 bits), PHICH information (3 bits), and SFN (8 bits). 10 reserved bits (for other uses such as MTC) are added, the MIB payload amounts to 24 bits. After appended with a 16-bit CRC, a rate-1/3 tail-biting convolutional coding, 4× repetitions and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

For NR licensed spectrum, each synchronization and PBCH signal block (SS/PBCH block) compromises of one symbol for NR-PSS, two symbols for NR-PBCH, one symbol for NR-SSS and NR-PBCH, where the four symbols are mapped consecutively and time division multiplexed. NR-SS is a unified design, including the NR-PSS and NR-SSS sequence design, for all supported carrier frequency rages in NR. The transmission bandwidth of NR-PSS and NR-SSS (e.g. 12 RBs) is smaller than the transmission bandwidth of the whole SS/PBCH block (e.g. 20 RBs).

For initial cell selection for NR cell, a UE assumes the default SS burst set periodicity as 20 ms, and for detecting non-standalone NR cell, network provides one SS burst set periodicity information per frequency carrier to UE and information to derive measurement timing/duration if possible. Other than the MIB, the remaining minimum system information (RMSI) is carried by PDSCH with scheduling info carried by the corresponding PDCCH. Similar structure applies to other system information (OSI) and Paging message. The control resource set (CORESET) for receiving common control channels, such as RMSI, OSI, RAR, etc., is required to be configured, and can be transmitted in PBCH.

The present disclosure focuses on the design of discovery signal and channel block (DSCH-block) on NR unlicensed spectrum (note that in this disclosure, unlicensed spectrum also includes shared spectrum), which can be considered as enhancement to discovery signals in LTE for initial cell acquisition as well, including the composition of DSCHDSCH-block, mapping and multiplexing of components within the DSCH-block, and information delivered by DSCH-block. The channel access scheme and mapping of the DSCH-burst-set consisting from DSCH-block(s) to the time/frequency resources are also covered by this disclosure. The terminology of DSCH-block can also be referred to other equivalent terminologies, such as discovery reference signal and channel block, discovery block, discovery reference signal (DRS), initial access block, etc.

For standalone NR unlicensed spectrum (including shared spectrum), due to the uncertainty of channel access, the transmission of the whole initial access block can be cancelled or delayed based on the clear channel assessment (CCA) results in listen-before-talk (LBT). If the initial access block remains the same as NR licensed spectrum, the performance (e.g. detection accuracy and synchronization latency) may degrade for NR unlicensed spectrum. Hence, there is a need for SS/PBCH block enhancement and/or modification on the unlicensed spectrum. For example, the enhancement and/or modification can aim at increasing the channel access opportunity for unlicensed spectrum. For another example, the enhancement and/or modification can aim at improving the one-shot detection accuracy of cell search and/or broadcasting.

The DSCH-block for standalone NR-Unlicensed can comprise of at least one of the following components.

A first component for DSCH-block can be NRU-PSS. Similar to NR-PSS, NRU-PSS can be utilized for time/frequency domain synchronization and carrying part of the cell ID info as well.

In one example, NRU-PSS can be constructed from exactly the same sequence as NR-PSS (i.e., frequency-domain length-127 M-sequence with 3 cyclic shift to represent the cell ID info), and mapped the same way as NR-PSS (i.e., central 12 RBs in the frequency-domain within the DSCH-block bandwidth).

In another example, NRU-PSS sequence can be longer than NR-PSS, when the available number of RBs for DSCH-block on unlicensed is higher than 20 or 24 RBs (e.g. for mmWave unlicensed band with large min carrier BW). In this example, NRU-PSS can be constructed from frequency-domain length-255 M-sequence with 3 cyclic shifts to represent the cell ID info, and mapped to the central 24 RBs in the frequency-domain within the DSCH-block.

A second component for DSCH-block can be NRU-SSS. Similar to NR-SSS, NRU-SSS can be utilized for carrying the remaining part of cell ID info.

In one example, NRU-SSS can be constructed from exactly the same sequence as NR-SSS (i.e., frequency-domain length-127 Gold-sequence with cyclic shifts to represent the cell ID info), and mapped to the REs same as NRU-PSS using the same port (i.e., central 12 RBs in the frequency-domain within the DSCH-block bandwidth).

In another example, NRU-SSS sequence can be longer than NR-SSS, when the available number of RBs for DSCH-block on unlicensed is higher than 20 or 24 RBs (e.g. for mmWave unlicensed band with large min carrier BW). In this example, NRU-SSS can be constructed from frequency-domain length-255 Gold-sequence with cyclic shifts to represent the cell ID info, and mapped to the REs same as NRU-PSS using the same port (i.e., central 24 RBs in the frequency-domain within the DSCH-block bandwidth).

A third component for DSCH-block can be NRU-ePSS. The functionality of NRU-ePSS is to help NRU-PSS with the synchronization. Due to the uncertainty of channel access, the performance of one-shot detection on PSS may be enhanced. If the number of REs for NRU-PSS cannot be increased due to limited BW, one other solution may introduce another at least one symbol for NRU-ePSS.

In one example, the sequence for NRU-ePSS can be mapped to the REs same as NRU-PSS using the same port.

A fourth component for DSCH-block can be NRU-eSSS. The functionality of NRU-eSSS is to help NRU-SSS with the cell determination. Due to the uncertainty of channel access, the performance of one-shot detection on SSS may be enhanced. If the number of REs for NRU-SSS cannot be increased due to limited BW, one other solution may introduce another at least one symbol for NRU-eSSS.

In one example, the sequence for NRU-eSSS can be mapped to the REs same as NRU-SSS using the same port.

In another example, the sequence for NRU-eSSS can be mapped across all symbols for NRU-SSS and NRU-eSSS (equivalent as no NRU-SSS).

A fifth component for DSCH-block can be NRU-PBCH or NRU-ePBCH. The enhancement of PBCH for the unlicensed band is targeting for better one-shot detection performance. Note that the content of PBCH/ePBCH for unlicensed band can be same or different from the one for licensed band.

A sixth component for DSCH-block can be NRU other broadcast channels (including the PDCCH and/or associated PDSCH), wherein the broadcast channels can include at least one of RMSI, OSI, or paging, and may include different one(s) from RMSI, OSI, or paging in different DSCH-blocks.

In one embodiment, a DSCH-block can include both the CORESET containing the PDCCH for configuring the corresponding data and the PDSCH for transmitting the corresponding data in the same slot.

In another embodiment, a DSCH-block can include the CORESET containing the PDCCH for configuring the corresponding data and the PDSCH for transmitting the corresponding data in the different slots (e.g. in two sub-blocks), respectively.

A seventh component for DSCH-block can be NRU-CSI-RS. NRU-CSI-RS can be at least for measurement purpose, and can be multiplexed within DSCH-block to save a separate LBT.

In one embodiment, the NRU-CSI-RS can be configured by higher layer such as RRC, and a UE may not know the configuration in initial cell acquisition.

In another embodiment, the configuration of NRU-CSI-RS is fixed, and a UE knows the fixed configuration in initial cell acquisition and can perform rate matching accordingly.

In yet another embodiment, the configuration of NRU-CSI-RS is indicated in NRU-PBCH (or NRU-ePBCH if supported) within the same DSCH-block, such that a UE knows the configuration after reading NRU-PBCH (or NRU-ePBCH if supported) in initial cell acquisition and can perform rate matching accordingly.

In yet another embodiment, the configuration of NRU-CSI-RS is indicated in DCI carried by PDCCH of RMSI/OSI/Paging within the same DSCH-block, such that UE knows the configuration after reading PDCCH in initial cell acquisition and can perform rate matching accordingly.

The following embodiments of the DSCH-block can be simultaneously supported. For example, some examples in the embodiments can be utilized for DSCH-block transmission within the min carrier BW, if the TX BW of DSCH-block is smaller than the min carrier BW, and some examples in the embodiments can be utilized for DSCH-block transmission exceeding the min carrier BW.

In another example, some examples in the embodiments can be utilized for carrier frequency range lower than 7 GHz (non-mmWave NRU band), and some examples in the embodiments can be utilized for carrier frequency range higher than 7 GHz (mmWave NRU band).

In yet another example, multiple embodiments and/or multiple examples in the embodiments can be supported at the same time, and a configuration such as carried by NRU-PBCH (or NRU-ePBCH if supported) within the DSCH-block can be utilized to indicate to the UE.

In one embodiment (i.e. DSCH-block composition), a DSCH-block can have two or more sub-blocks TDMed, wherein one of the sub-blocks is SS/PBCH block and is confined within a slot in the time domain and confined within the min carrier BW (e.g. 24 RBs) in frequency domain, and each of the remaining sub-block(s) can be one of the RMSI block or OSI block or Paging block and is confined within another slot or multiple slots in time domain and confined within or exceeding the min carrier BW (depending on CORESET BWNRU-PBCH (or NRU-ePBCH if supported), e.g. 24 RBs or larger in SS numerology) in frequency domain. The SS/PBCH block can refer to the design of NR licensed band (e.g. NR SS/PBCH block), with potential enhancement to improve the one-shot detection performance.

The RMSI/OSI/Paging block can be TDMed with the SS/PBCH block (i.e., using multiplexing pattern 1 with group offset O>0) and the time offset between the two blocks can be hard-coded or configurable. In one consideration of this embodiment, RMSI, OSI, and paging can each construct a separate sub-block of DSCH-block, and RMSI, OSI, and paging can have different configuration on the time domain offset.

Figure 10:
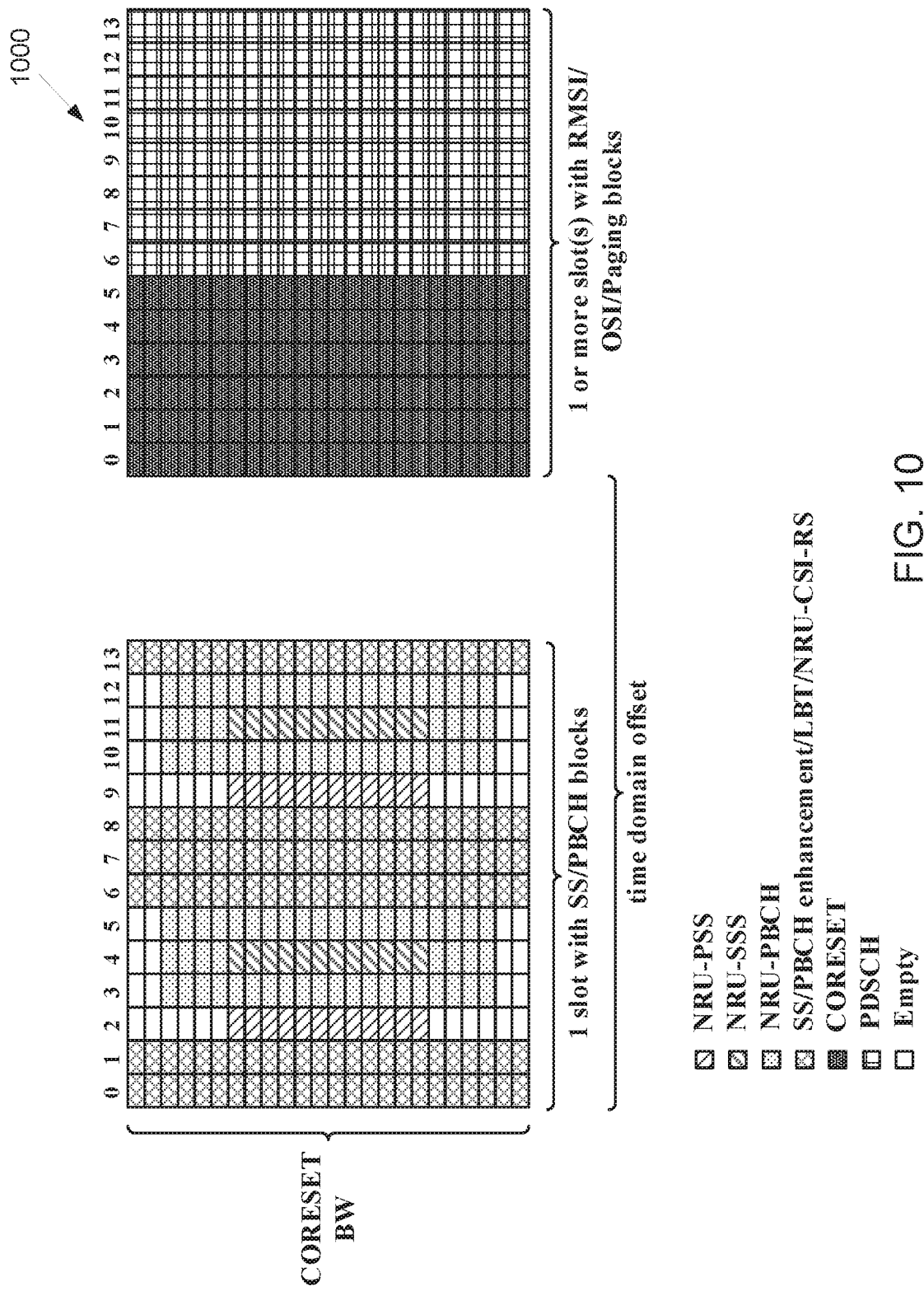
FIG. 10 illustrates an example DSCH block according to embodiments of the present disclosure.

FIG. 10 illustrates an example DSCH block 1000 according to embodiments of the present disclosure. The embodiment of the DSCH block 1000 illustrated in FIG. 10 is for illustration only. FIG. 10 does not limit the scope of this disclosure to any particular implementation.

In one example of the aforementioned embodiment is shown in FIG. 10 for illustration purpose. One slot contains two possible SS/PBCH blocks, where each of the SS/PBCH blocks has 20 RBs TX BW, and another at least one slot contains the RMSI/OSI/Paging block consisting of both the CORESET containing PDCCH and the PDSCH containing RMSI/OSI/Paging data.

In one embodiment, part of or all of the remaining symbols other than SS/PBCHs in the first slot can be utilized for SS/PBCH enhancement (if supported), e.g. for mapping NRU-ePSS/eSSS/ePBCH. For example, for each of the SS block within the slot, at least one symbol is mapped for NRU-ePSS, and/or at least one symbol is mapped for NRU-eSSS, and/or at least one symbol is mapped for NRU-ePBCH.

In one embodiment, part of or all of the remaining symbols other than SS/PBCHs in the first slot can be utilized for performing LBT. For example, the first one or two symbols of the slot can be utilized for performing LBT for the transmission of the two SS/PBCH blocks within the slot.

For another example, one or two symbols before each SS/PBCH block within the slot can be utilized for performing directional LBT for the transmission of the corresponding SS/PBCH block. For yet another example, the last one or two symbols of the slot can be utilized for performing LBT for the transmission of the next slot.

In one embodiment, part of or all of the remaining symbols other than SS/PBCHs in the first slot can be utilized for transmitting configured NRU-CSI-RS (if supported).

In one embodiment, the location of the 20 RBs of SS/PBCH block TX BW can be flexible in term of the relative frequency location within the CORESET RB BW, and can also be not RB aligned with data RB due to floating sync. The actual location of the 20 RBs can be configurable and indicated by the content of NRU-PBCH (or NRU-ePBCH if supported) within the DSCH-block. Note that the SS/PBCH blocks aligned with the central of the CORESET BW in FIG. 10 is only for illustration purpose.

In one embodiment, the mapping pattern of the two SS/PBCH blocks to the slot can be same for all the slots containing SS/PBCH blocks. For one example, the first SS/PBCH block can be mapped to symbol #4 to #7 and the second SS/PBCH block can be mapped to symbol #8 to #11 for normal CP. For another example, the first SS/PBCH block can be mapped to symbol #6 to #9 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for normal CP. For yet another example, the first SS/PBCH block can be mapped to symbol #4 to #7 and the second SS/PBCH block can be mapped to symbol #8 to #11 for extended CP.

In one sub-embodiment, the mapping pattern of the SS/PBCH blocks to the slot is identical for the first half slot (e.g. symbol #0 to #6 for normal CP or symbol #0 to #5 for extended CP) and the second half slot (e.g. symbol #7 to #13 for normal CP or symbol #6 to #11 for extended CP). For one example, the first SS/PBCH block can be mapped to symbol #2 to #5 and the second SS/PBCH block can be mapped to symbol #9 to #12 for normal CP (as shown in FIG. 10). For another example, the first SS/PBCH block can be mapped to symbol #3 to #6 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for extended CP.

In one embodiment, the BW and number of symbols for CORESET in the RMSI/OSI/Paging block can be fixed (e.g. predefined in the spec), such as fixed as 2 symbols or 3 symbols, and with 24 RBs if the SCS of CORESET is 60 kHz.

In one embodiment, the BW and number of symbols for CORESET in the RMSI/OSI/Paging block can be configurable and indicated by the content of NRU-PBCH (or NRU-ePBCH if supported) within the DSCH-block. For one example, the combination of {CORESET BW, number of CORESET symbols} can be configured as one of {24, 1}, {24, 2}, {24, 3}, {48, 1}, {48, 2}, {48, 3}, {96, 1}, {96, 2}, {96, 3}, where 3 symbols of CORESET are considered to improve the coverage. For another example, the combination of {CORESET BW, number of CORESET symbols} can be configured as one of {24, 2}, {24, 3}, where 3 symbols of CORESET are considered to improve the coverage, if the SCS of CORESET is 60 kHz. For yet another example, the combination of {CORESET BW, number of CORESET symbols} can be configured as one of {24, 1}, {24, 2}, {24, 3}, where 3 symbols of CORESET are considered to improve the coverage, if the SCS of CORESET is 60 kHz.

In one embodiment, the time domain offset between the slot containing SS/PBCH blocks and the slot containing RMSI/OSI/Paging blocks can be fixed as or configured as one slot (e.g. SS/PBCH block and associated RMSI/OSI/Paging block are mapped to consecutive slots).

In one embodiment, the time domain offset between the slot containing SS/PBCH blocks and the slot containing RMSI/OSI/Paging blocks can be fixed as or configured as the same as the transmission duration of slots containing SS/PBCH burst set, such that the transmission of RMSI/OSI/Paging burst set starts right after the transmission of SS/PBCH burst set. For one example, the time domain offset can be 1 ms if SS SCS is 30 kHz and maximum number of SS/PBCH blocks within a burst set is 4. For another example, the time domain offset can be 1 ms if SS SCS is 60 kHz and maximum number of SS/PBCH blocks within a burst set is 8. For yet another example, the time domain offset can be 2 ms if SS SCS is 30 kHz and maximum number of SS/PBCH blocks within a burst set is 8. For yet another example, the time domain offset can be 0.5 ms if SS SCS is 60 kHz and maximum number of SS/PBCH blocks within a burst set is 4.

In one embodiment, the time domain offset between the slot containing SS/PBCH blocks and the slot containing RMSI/OSI/Paging blocks can be configured as the same as the transmission duration of slots containing actually transmitted SS/PBCH blocks, such that the transmission of RMSI/OSI/Paging burst set starts right after the transmission of actually transmitted SS/PBCH blocks. For one example, the time domain offset can be configurable from {0.5, 1, 1.5, 2} slots, if the maximum number of SS/PBCH blocks within a burst set is 4. For another example, the time domain offset can be configurable from {0.5, 1, 1.5, 2, 2.5, 3, 3.5, 4} slots, if the maximum number of SS/PBCH blocks within a burst set is 8. For yet another example, the time domain offset can be configurable from {1, 2} slots, if the maximum number of SS/PBCH blocks within a burst set is 4. For yet another example, the time domain offset can be configurable from {1, 2, 3, 4} slots, if the maximum number of SS/PBCH blocks within a burst set is 8.

In one embodiment, the time domain offset can be configurable and indicated by the content of NRU-PBCH (or NRU-ePBCH if supported) within the DSCH-block.

In one embodiment, although not explicitly illustrated, NRU-CSI-RS can be multiplexed within some of or all of the PDSCH RBs and/or empty RBs.

In one embodiment, the SCS of SS/PBCH block (and potential enhancements) can be 60 kHz, wherein the corresponding channel BW is 20 MHz, and CORESET BW is 24 RBs.

In one embodiment, the SCS of RMSI/OSI/Paging blocks (although illustrated as same as the SCS of SS/PBCH block in FIG. 10) can be different from the SCS of SS/PBCH block and the SCS of RMSI/OSI/Paging blocks is indicated in system information such as MIB carried by NR-PBCH in the corresponding SS/PBCH block.

In one embodiment, the two SS/PBCH blocks within the same slot are assumed to be QCLed (e.g. repetitively transmitted). In one sub-embodiment, a single RMSI/OSI/Paging CORESET and single PDSCH are associated (e.g. QCLed) with the two SS/PBCH blocks.

In another sub-embodiment, two sets of RMSI/OSI/Paging CORESET and PDSCH are associated (e.g. QCLed) with the two SS/PBCH blocks, correspondingly, and the two sets of RMSI/OSI/Paging CORESET and PDSCH are also QCLed. For example, any examples in FIGS. 12A to 12E can be applied, wherein the two sets of RMSI/OSI/Paging CORESET and PDSCH are also assumed to be QCLed.

In one embodiment (i.e. DSCH-block composition), a DSCH-block can be confined within a slot, wherein SS/PBCH blocks and RMSI/OSI/Paging blocks are both confined within the slot and within the min carrier BW (e.g. 24 RBs). SS/PBCH block is TDMed with the CORESET of RMSI/OSI/Paging (i.e., using multiplexing Pattern 1 with group offset O=0), and SS/PBCH block can be TDMed or FDMed or hybrid multiplexed with PDSCH of RMSI/OSI/Paging.

Figure 11:
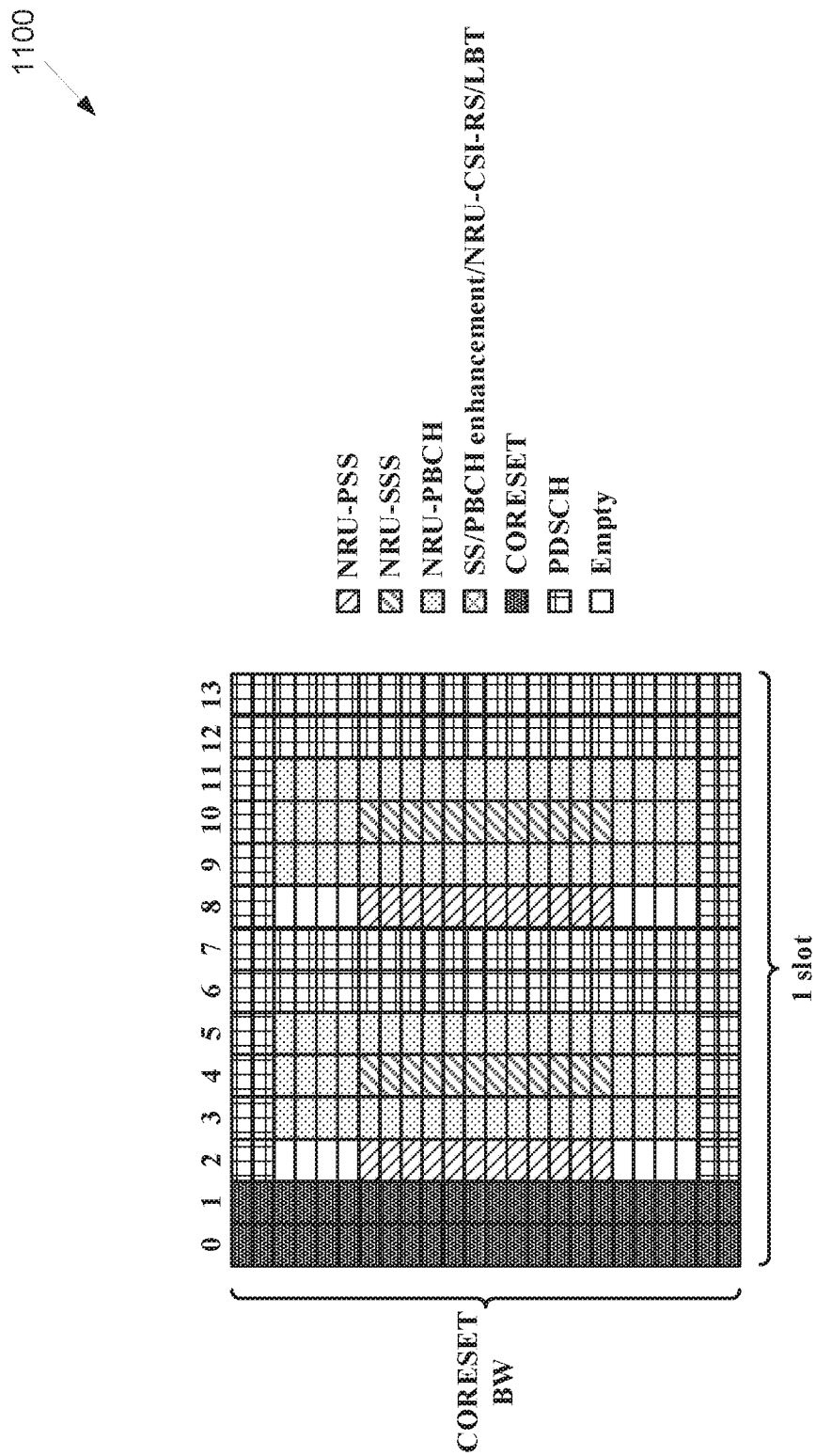
FIG. 11 illustrates another example DSCH block according to embodiments of the present disclosure.

FIG. 11 illustrates another example DSCH block 1100 according to embodiments of the present disclosure. The embodiment of the DSCH block 1100 illustrated in FIG. 11 is for illustration only. FIG. 11 does not limit the scope of this disclosure to any particular implementation.

One example of the embodiment is shown in FIG. 11 for illustration purpose. One slot contains two possible SS/PBCH blocks, where each of the SS/PBCH blocks has 20 RBs TX BW.

In one embodiment, part of or all of the remaining symbols other than SS/PBCH blocks can be utilized for SS/PBCH enhancement (if supported), e.g. for mapping NRU-ePSS/eSSS/ePBCH. For example, for each of the SS block within the slot, at least one symbol is mapped for NRU-ePSS, and/or at least one symbol is mapped for NRU-eSSS, and/or at least one symbol is mapped for NRU-ePBCH.

In one embodiment, part of or all of the remaining symbols other than SS/PBCH blocks can be utilized for performing LBT. For example, the first one or two symbols of the slot can be utilized for performing LBT for the transmission of the two SS/PBCH blocks within the slot. For another example, one or two symbols before each SS/PBCH block within the slot can be utilized for performing directional LBT for the transmission of the corresponding SS/PBCH block. For yet another example, the last one or two symbols of the slot can be utilized for performing LBT for the transmission of the next slot.

In one embodiment, part of or all of the remaining symbols can be utilized for transmitting configured NRU-CSI-RS (if supported).

In one embodiment, the location of the 20 RBs of SS/PBCH block TX BW can be flexible in term of the relative frequency location within the CORESET RB BW, and can also be not RB aligned with data RB due to floating sync. The actual location of the 20 RBs can be configurable and indicated by the content of NRU-PBCH (or NRU-ePBCH if supported) within the DSCH-block. Note that the SS/PBCH blocks aligned with the central of the CORESET BW in FIG. 11 is only for illustration purpose.

In one embodiment, the mapping pattern of the two SS/PBCH blocks to the slot can be same for all the slots containing SS/PBCH blocks. For one example, the first SS/PBCH block can be mapped to symbol #4 to #7 and the second SS/PBCH block can be mapped to symbol #8 to #11 for normal CP. For another example, the first SS/PBCH block can be mapped to symbol #6 to #9 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for normal CP. For yet another example, the first SS/PBCH block can be mapped to symbol #4 to #7 and the second SS/PBCH block can be mapped to symbol #8 to #11 for extended CP.

In one sub-embodiment, the mapping pattern of the SS/PBCH blocks to the slot is identical for the first half slot (e.g. symbol #0 to #6 for normal CP or symbol #0 to #5 for extended CP) and the second half slot (e.g. symbol #7 to #13 for normal CP or symbol #6 to #11 for extended CP). For one example, the first SS/PBCH block can be mapped to symbol #2 to #5 and the second SS/PBCH block can be mapped to symbol #9 to #12 for normal CP. For another example, the first SS/PBCH block can be mapped to symbol #3 to #6 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for extended CP.

In one embodiment, the BW and number of symbols for CORESET in the RMSI/OSI/Paging block can be fixed (e.g. predefined in the spec), such as fixed as 2 symbols or 3 symbols, and with 24 RBs if the SCS of CORESET is 60 kHz.

In one embodiment, the BW and number of symbols for CORESET in the RMSI/OSI/Paging block can be configurable and indicated by the content of NRU-PBCH (or NRU-ePBCH if supported) within the DSCH-block. For example, the combination of {CORESET BW, number of CORESET symbols} can be configured as one of {24, 2}, {24, 3}, where 3 symbols of CORESET are considered to improve the coverage, if the SCS of CORESET is 60 kHz. For another example, the combination of {CORESET BW, number of CORESET symbols} can be configured as one of {24, 1}, {24, 2}, {24, 3}, where 3 symbols of CORESET are considered to improve the coverage, if the SCS of CORESET is 60 kHz.

In one embodiment, although not explicitly illustrated, NRU-CSI-RS can be multiplexed within some of or all of the PDSCH RBs and/or empty RBs.

In one embodiment, the SCS of SS/PBCH block (and potential enhancements) can be 60 kHz, wherein the corresponding channel BW is 20 MHz, and CORESET BW is 24 RBs.

In one embodiment, the SCS of RMSI/OSI/Paging blocks (although illustrated as same as the SCS of SS/PBCH block in the figure) can be different from the SCS of SS/PBCH block and the SCS of RMSI/OSI/Paging blocks is indicated in system information such as MIB carried by NR-PBCH in the corresponding SS/PBCH block.

In one embodiment, the two SS/PBCH blocks within the same slot are assumed to be QCLed (e.g. repetitively transmitted) and a single RMSI/OSI/Paging CORESET and single PDSCH are associated (e.g. QCLed) with the two SS/PBCH blocks. For example, the CORESET of RMSI/OSI/Paging is the first 2 symbols, and PDSCH of RMSI/OSI/Paging is matched to all the other symbols around SS/PBCH block.

In one embodiment, the symbols containing SS/PBCH blocks are not rate matched for PDSCH of RMSI/OSI/Paging (i.e., the remaining 4 RBs in the symbols containing SS/PBCH blocks are not rate matched for PDSCH of RMSI/OSI/Paging), such that PDSCH of RMSI/OSI/Paging is TDMed with SS/PBCH blocks and CORESET of RMSI/OSI/Paging.

In one embodiment, only one SS/PBCH block in a slot, and all the remaining resources can be potentially mapped for CORESET or PDSCH of RMSI/OSI/Paging. In one example, the aforementioned embodiment can be achieved by configuring the indication of actually transmitted SS/PBCH block (e.g. ssb-PositionsInBurst in RMSI and/or ssb-PositionsInBurst in RRC), such that only one SS/PBCH block within a lot is actually transmitted.

In one embodiment (i.e. DSCH-block composition), a DSCH-block can be confined within a slot, wherein SS/PBCH blocks and RMSI/OSI/Paging blocks are both confined within the slot. SS/PBCH block is TDMed with the CORESET of RMSI/OSI/Paging (i.e., using multiplexing Pattern 1 with group offset O=0), and SS/PBCH block can be TDMed or FDMed or hybrid multiplexed with PDSCH of RMSI/OSI/Paging. The total TX BW of DSCH-block can be larger than 24 RBs (e.g. 48 RBs), and can be either confined within the min carrier BW (if the min carrier BW using as initial active DL BWP is large enough, e.g. 20 MHz with 30 kHz SCS), or exceeding the min carrier BW.

Figure 12A:
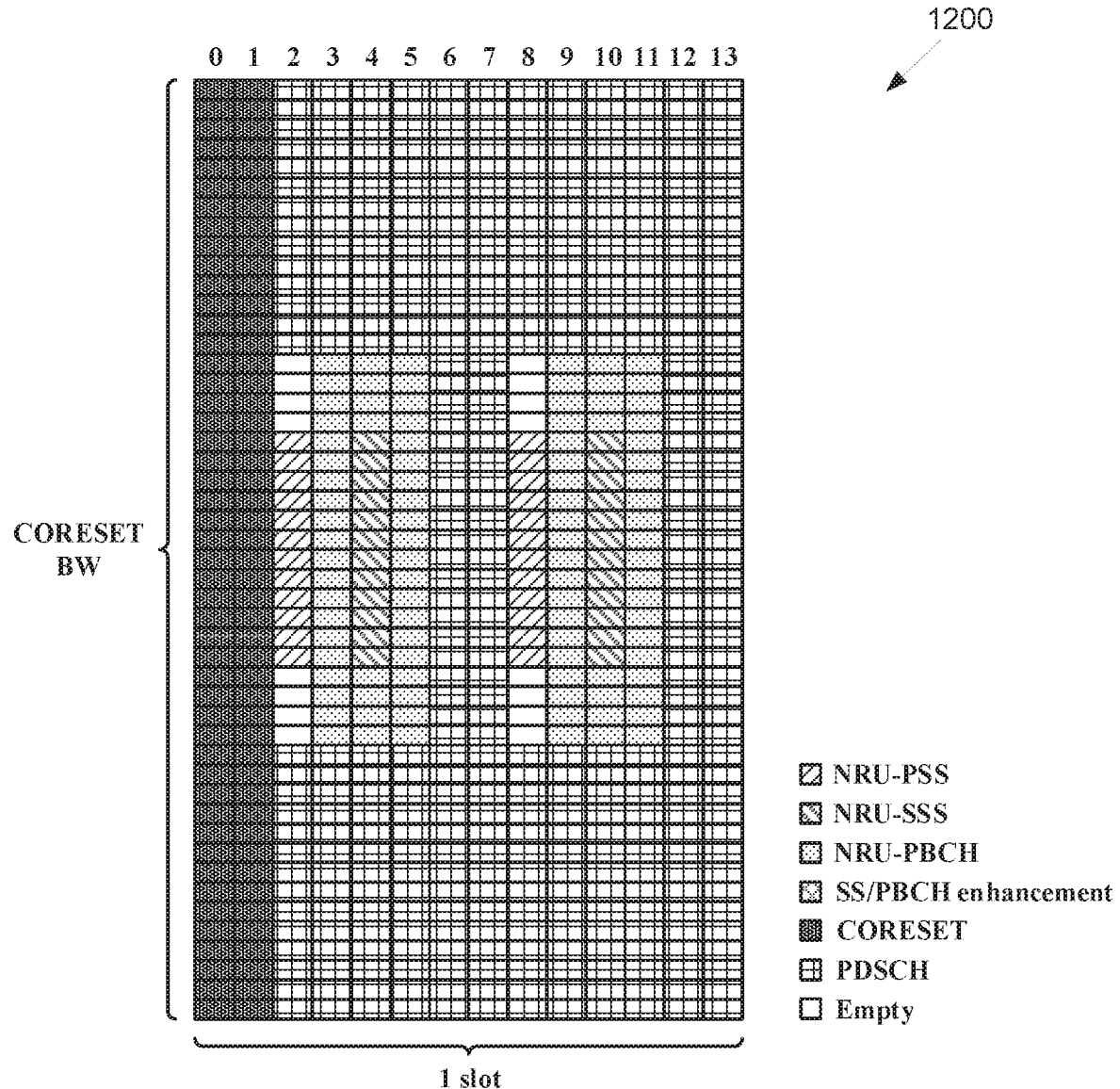
FIG. 12A illustrates yet another example DSCH block according to embodiments of the present disclosure.

FIG. 12A illustrates yet another example DSCH block 1200 according to embodiments of the present disclosure. The embodiment of the DSCH block 1200 illustrated in FIG. 12A is for illustration only. FIG. 12A does not limit the scope of this disclosure to any particular implementation.

Figure 12B:
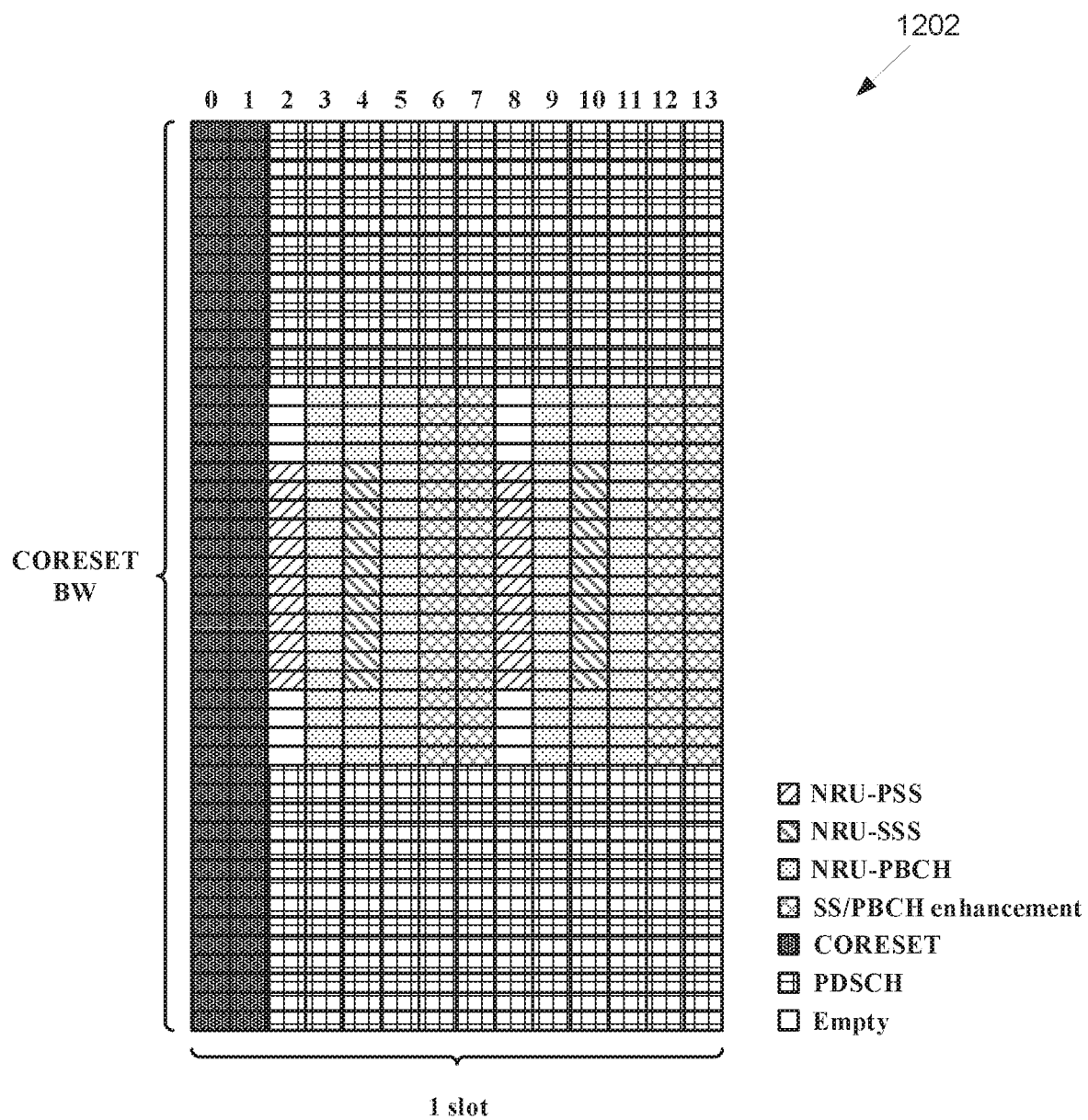
FIG. 12B illustrates yet another example DSCH block according to embodiments of the present disclosure.

FIG. 12B illustrates yet another example DSCH block 1202 according to embodiments of the present disclosure. The embodiment of the DSCH block 1202 illustrated in FIG. 12B is for illustration only. FIG. 12B does not limit the scope of this disclosure to any particular implementation.

Figure 12C:
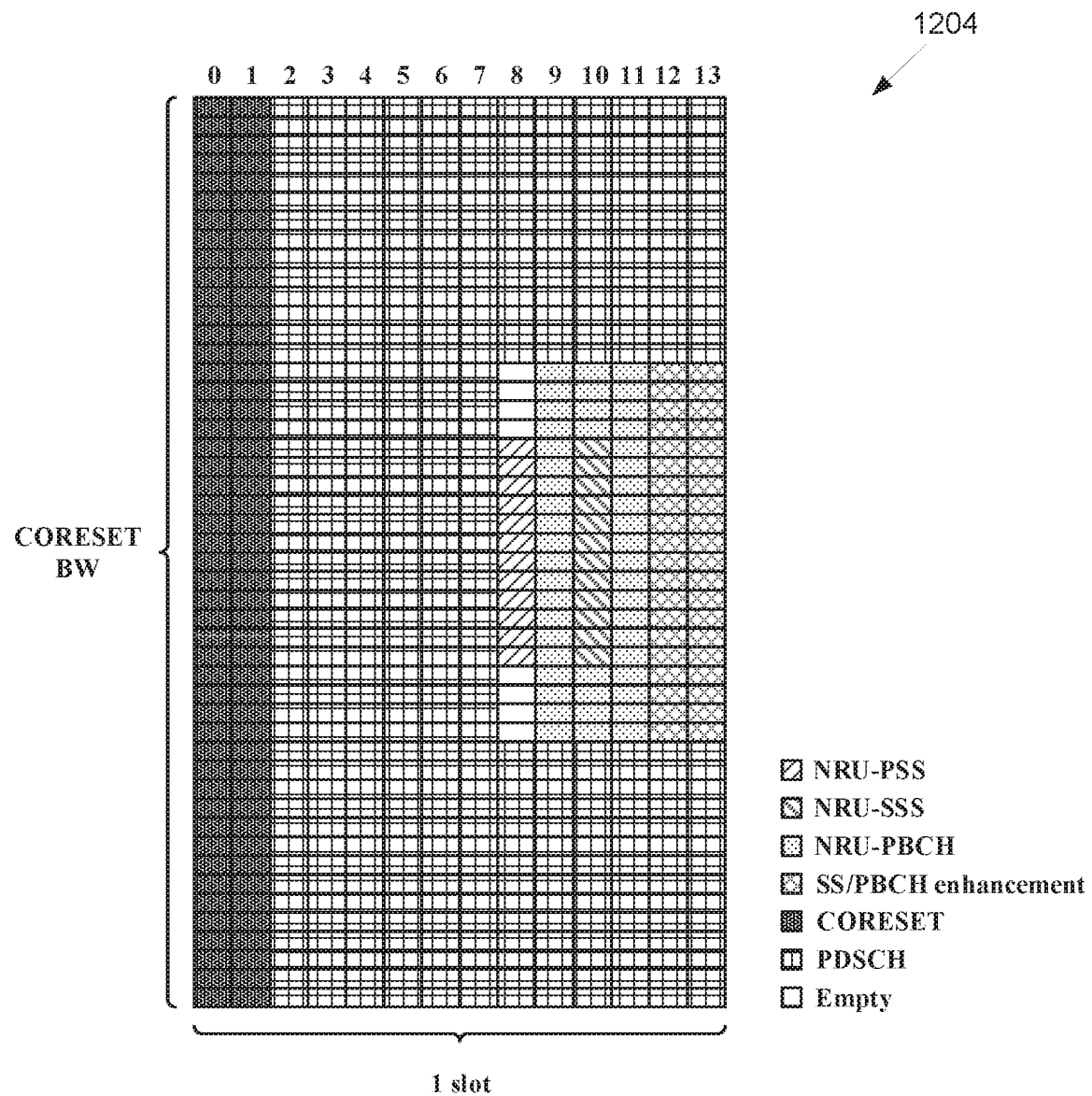
FIG. 12C illustrates yet another example DSCH block according to embodiments of the present disclosure.

FIG. 12C illustrates yet another example DSCH block 1204 according to embodiments of the present disclosure. The embodiment of the DSCH block 1204 illustrated in FIG. 12C is for illustration only. FIG. 12C does not limit the scope of this disclosure to any particular implementation.

Figure 12D:
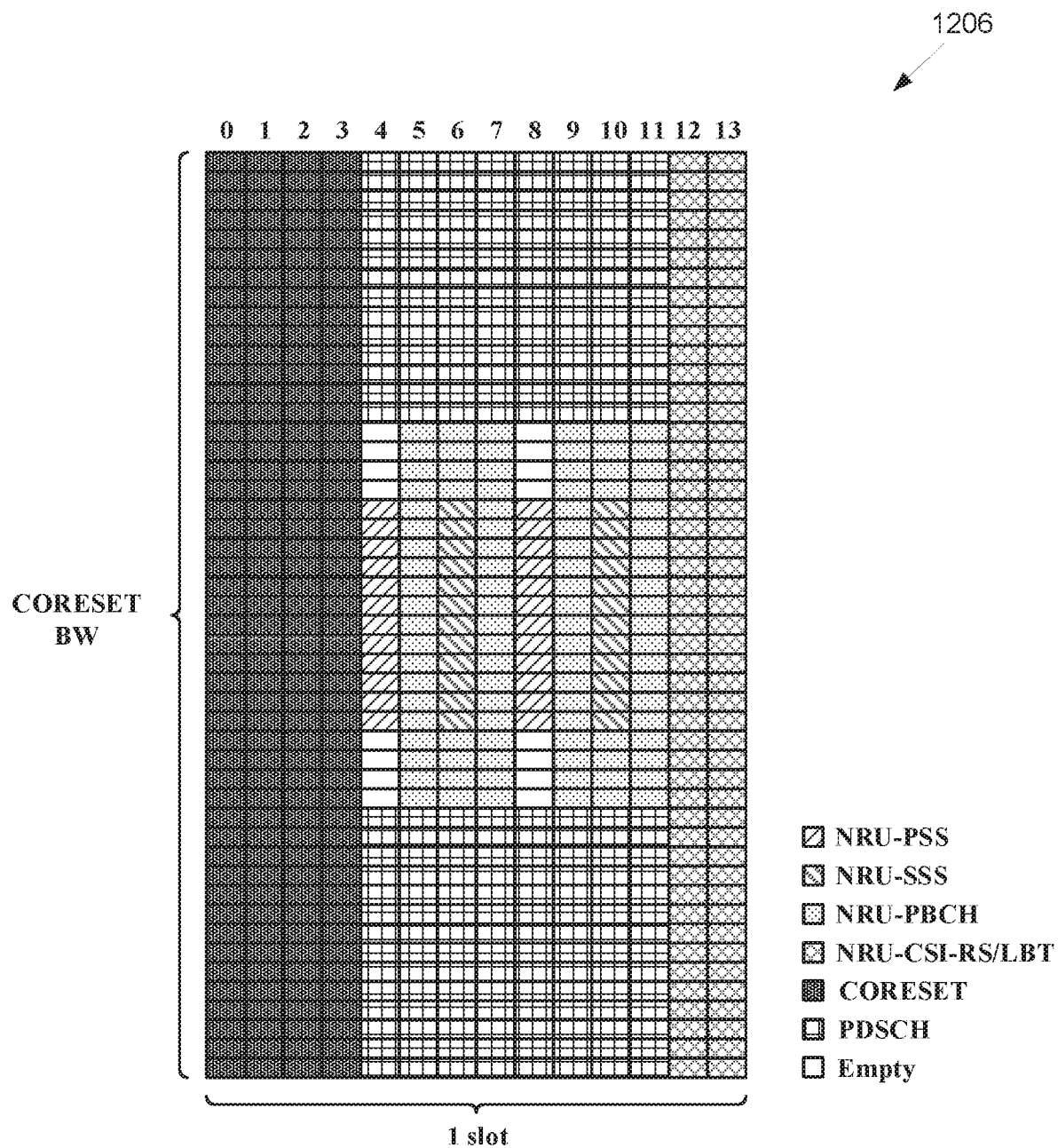
FIG. 12D illustrates yet another example DSCH block according to embodiments of the present disclosure.

FIG. 12D illustrates yet another example DSCH block 1206 according to embodiments of the present disclosure. The embodiment of the DSCH block 1206 illustrated in FIG. 12D is for illustration only. FIG. 12D does not limit the scope of this disclosure to any particular implementation.

Figure 12E:
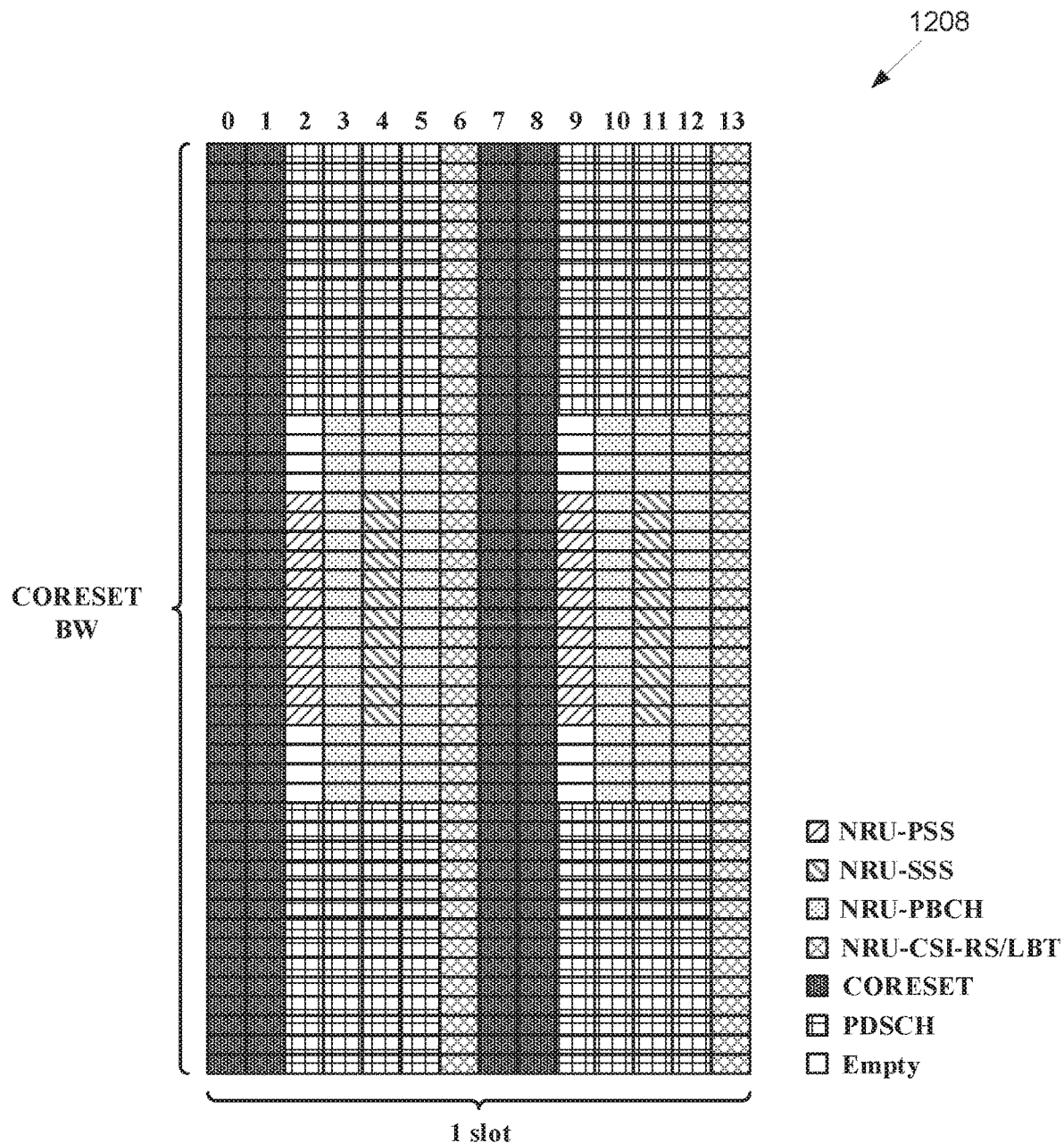
FIG. 12E illustrates yet another example DSCH block according to embodiments of the present disclosure.

FIG. 12E illustrates yet another example DSCH block 1208 according to embodiments of the present disclosure. The embodiment of the DSCH block 1208 illustrated in FIG. 12E is for illustration only. FIG. 12E does not limit the scope of this disclosure to any particular implementation.

One example of this embodiment is shown in FIGS. 12A to 12E for illustration purpose. One slot contains at least one possible SS/PBCH block, where each of the SS/PBCH block(s) has 20 RBs TX BW.

In one embodiment, part of or all of the remaining symbols other than SS/PBCH blocks can be utilized for SS/PBCH enhancement (if supported), e.g. for mapping NRU-ePSS/eSSS/ePBCH. For example, for each of the SS block within the slot, at least one symbol is mapped for NRU-ePSS, and/or at least one symbol is mapped for NRU-eSSS, and/or at least one symbol is mapped for NRU-ePBCH. One example is as shown in FIG. 12B.

In one embodiment, part of or all of the remaining symbols other than SS/PBCH blocks can be utilized for performing LBT. For example, the first one or two symbols of the slot can be utilized for performing LBT for the transmission of the two SS/PBCH blocks within the slot. For another example, one or two symbols before each SS/PBCH block within the slot can be utilized for performing directional LBT for the transmission of the corresponding SS/PBCH block. For yet another example, the last one or two symbols of the slot can be utilized for performing LBT for the transmission of the next slot. One example is as shown in FIGS. 12D and/or 12E.

In one embodiment, part of or all of the remaining symbols can be utilized for transmitting configured NRU-CSI-RS (if supported). One example is as shown in FIGS. 12D and/or 12E.

In one embodiment, the location of the 20 RBs of SS/PBCH block TX BW can be flexible in term of the relative frequency location within the CORESET RB BW, and can also be not RB aligned with data RB due to floating sync. The actual location of the 20 RBs can be configurable and indicated by the content of NRU-PBCH (or NRU-ePBCH if supported) within the DSCH-block. Note that the SS/PBCH blocks aligned with the central of the CORESET BW in FIGS. 12A to 12E is only for illustration purpose.

In one embodiment, the mapping pattern of the two SS/PBCH blocks to the slot can be same for all the slots containing SS/PBCH blocks. For one example, the first SS/PBCH block can be mapped to symbol #4 to #7 and the second SS/PBCH block can be mapped to symbol #8 to #11 for normal CP (as shown in FIG. 12D). For another example, the first SS/PBCH block can be mapped to symbol #6 to #9 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for normal CP (as shown in FIG. 12A).

For yet another example, the first SS/PBCH block can be mapped to symbol #4 to #7 and the second SS/PBCH block can be mapped to symbol #8 to #11 for extended CP. In one sub-embodiment, the mapping pattern of the SS/PBCH blocks to the slot is identical for the first half slot (e.g. symbol #0 to #6 for normal CP or symbol #0 to #5 for extended CP) and the second half slot (e.g. symbol #7 to #13 for normal CP or symbol #6 to #11 for extended CP). For one example, the first SS/PBCH block can be mapped to symbol #2 to #5 and the second SS/PBCH block can be mapped to symbol #9 to #12 for normal CP (as shown in FIG. 12E). For another example, the first SS/PBCH block can be mapped to symbol #3 to #6 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for extended CP.

In one embodiment, the BW and number of symbols for CORESET in the RMSI/OSI/Paging block can be fixed (e.g. predefined in the spec), such as fixed as 1 symbol or 2 symbols or 3 symbols, and with 48 RBs if the SCS of CORESET is 30 kHz.

In one embodiment, the BW and number of symbols for CORESET in the RMSI/OSI/Paging block can be configurable and indicated by the content of NRU-PBCH (or NRU-ePBCH if supported) within the DSCH-block. For one example, the combination of {CORESET BW, number of CORESET symbols} can be configured as one of {48, 1}, {48, 2}, {48, 3}, {96, 1}, {96, 2}, {96, 3}, where 3 symbols of CORESET are considered to improve the coverage. For another example, the combination of {CORESET BW, number of CORESET symbols} can be configured as one of {48, 1}, {48, 2}, {48, 3}, where 3 symbols of CORESET are considered to improve the coverage, if the SCS of CORESET is 30 kHz. For yet another example, the combination of {CORESET BW, number of CORESET symbols} can be configured as one of {48, 1}, {48, 2}, if the SCS of CORESET is 30 kHz.

In one embodiment, although not explicitly illustrated, NRU-CSI-RS can be multiplexed within some of or all of the PDSCH RBs and/or empty RBs.

In one embodiment, the SCS of SS/PBCH block (and potential enhancements) can be 30 kHz, wherein the corresponding channel BW is 20 MHz, and CORESET BW is 48 RBs.

In one embodiment, the SCS of RMSI/OSI/Paging blocks (although illustrated as same as the SCS of SS/PBCH block in the figure) can be different from the SCS of SS/PBCH block and the SCS of RMSI/OSI/Paging blocks is indicated in system information such as MIB carried by NR-PBCH in the corresponding SS/PBCH block.

In one embodiment, PDSCH of RMSI/OSI/Paging is only rate matched to the BW not containing SS/PBCH block. The RBs, in the symbols for PDSCH of RMSI/OSI/Paging only and not containing SS/PBCH block, overlapping with SS/PBCH block (if any) can be used for SS/PBCH enhancement or CSI-RS. One example is as shown in FIG. 12B.

In one embodiment, only one SS/PBCH block in a slot, and all the remaining resources can be potentially mapped for CORESET or PDSCH of RMSI/OSI/Paging. In one example, the aforementioned embodiment can be achieved by configuring the indication of actually transmitted SS/PBCH block (e.g. ssb-PositionsInBurst in RMSI and/or ssb-PositionsInBurst in RRC), such that only one SS/PBCH block within a lot is actually transmitted. One example is as shown in FIG. 12C.

In one embodiment, the two SS/PBCH blocks within the same slot are assumed to be QCLed (e.g. repetitively transmitted) and a single RMSI/OSI/Paging CORESET and single PDSCH are associated (e.g. QCLed) with the two SS/PBCH blocks. For example, the CORESET of RMSI/OSI/Paging is the first 2 symbols, and PDSCH of RMSI/OSI/Paging can be rate matched to all the other symbols around SS/PBCH block.

In one embodiment (i.e. DSCH-block composition), a DSCH-block can be confined within a slot, where SS/PBCH blocks and RMSI/OSI/Paging blocks are both confined within the slot, and SS/PBCH block is FDMed with the CORESET and PDSCH of RMSI/OSI/Paging. The total TX BW of DSCH-block can be depending the gap and CORESET BW, and can be either confined within the min carrier BW (if the min carrier BW is large enough, e.g. 20 MHz with 30 kHz SCS), or exceeding the min carrier BW (e.g. on multiple sub-carriers of 20 MHz).

Figure 13A:
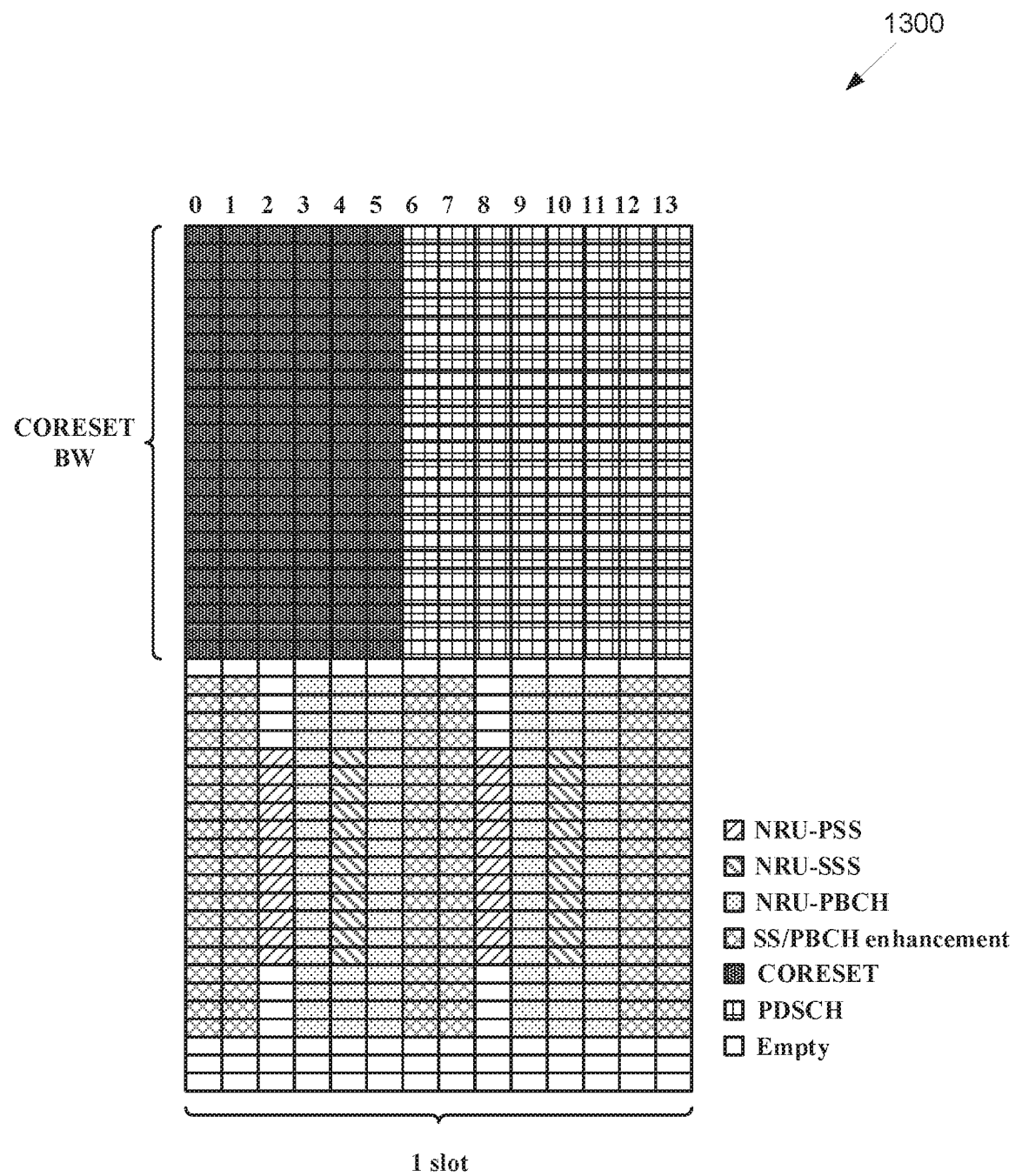
FIG. 13A illustrates yet another example DSCH block according to embodiments of the present disclosure.

FIG. 13A illustrates yet another example DSCH block 1300 according to embodiments of the present disclosure. The embodiment of the DSCH block 1300 illustrated in FIG. 13A is for illustration only. FIG. 13A does not limit the scope of this disclosure to any particular implementation.

Figure 13B:
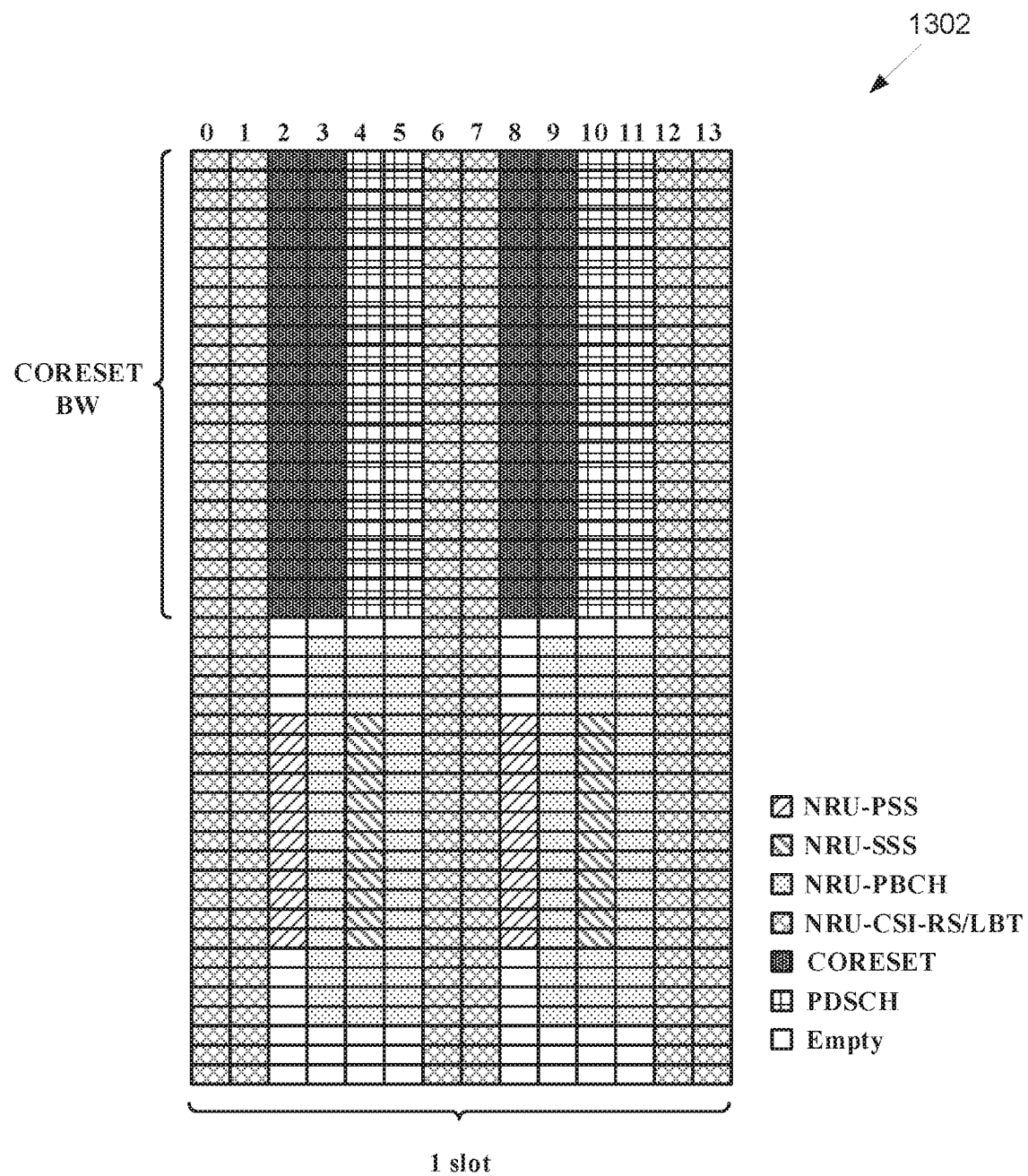
FIG. 13B illustrates yet another example DSCH block according to embodiments of the present disclosure.

FIG. 13B illustrates yet another example DSCH block 1302 according to embodiments of the present disclosure. The embodiment of the DSCH block 1302 illustrated in FIG. 13B is for illustration only. FIG. 13B does not limit the scope of this disclosure to any particular implementation.

One example of the embodiment is shown in FIGS. 13A and 13B for illustration purpose. One slot contains two possible SS/PBCH blocks, where each of the SS/PBCH blocks has 20 RBs TX BW. The FDMed RMSI/OSI/Paging blocks contain both the CORESET containing PDCCH and the PDSCH containing RMSI/OSI/Paging data.

In one embodiment, RBs within the BW of SS/PBCH block and within part of or all of the remaining symbols other than SS/PBCH blocks can be utilized for SS/PBCH enhancement (if supported), e.g. for mapping NRU-ePSS/eSSS/ePBCH. For example, for each of the SS block within the slot, at least one symbol is mapped for NRU-ePSS, and/or at least one symbol is mapped for NRU-eSSS, and/or at least one symbol is mapped for NRU-ePBCH. One example is as shown in FIG. 13A.

In one embodiment, part of or all of the remaining symbols other than SS/PBCH blocks can be utilized for performing LBT. For example, the first one or two symbols of the slot can be utilized for performing LBT for the transmission of the two SS/PBCH blocks within the slot. For another example, one or two symbols before each SS/PBCH block within the slot can be utilized for performing directional LBT for the transmission of the corresponding SS/PBCH block. For yet another example, the last one or two symbols of the slot can be utilized for performing LBT for the transmission of the next slot. One example is as shown in FIG. 13B.

In one embodiment, part of or all of the remaining symbols can be utilized for transmitting configured NRU-CSI-RS (if supported). One example is as shown in FIG. 13B.

In one embodiment, the location of RMSI/OSI/Paging block can be on configured on either side of SS/PBCH blocks, e.g. by the content of NRU-PBCH (or NRU-ePBCH if supported) within the DSCH-block. Also, SS/PBCH block and RMSI/OSI/Paging block can also be not RB aligned due to floating sync, and a gap area not exceeding 1 RB in term of CORESET numerology can be reserved between SS/PBCH blocks and RMSI/OSI/Paging blocks. Besides, one extra RB in term of CORESET numerology may be reserved on each side of the SS/PBCH block if CORESET numerology is different from SS/PBCH numerology.

In one embodiment, the mapping pattern of the two SS/PBCH blocks to the slot can be same for all the slots containing SS/PBCH blocks. For one example, the first SS/PBCH block can be mapped to symbol #4 to #7 and the second SS/PBCH block can be mapped to symbol #8 to #11 for normal CP. For another example, the first SS/PBCH block can be mapped to symbol #6 to #9 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for normal CP. For yet another example, the first SS/PBCH block can be mapped to symbol #4 to #7 and the second SS/PBCH block can be mapped to symbol #8 to #11 for extended CP.

In one sub-embodiment, the mapping pattern of the SS/PBCH blocks to the slot is identical for the first half slot (e.g. symbol #0 to #6 for normal CP or symbol #0 to #5 for extended CP) and the second half slot (e.g. symbol #7 to #13 for normal CP or symbol #6 to #11 for extended CP). For one example, the first SS/PBCH block can be mapped to symbol #2 to #5 and the second SS/PBCH block can be mapped to symbol #9 to #12 for normal CP. For another example, the first SS/PBCH block can be mapped to symbol #3 to #6 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for extended CP.

In one embodiment, the BW and number of symbols for CORESET in the RMSI/OSI/Paging block can be fixed (e.g. predefined in the spec), such as fixed as 2 symbols and with 24 RBs if the SCS of CORESET is 30 kHz.

In one embodiment, the BW and number of symbols for CORESET in the RMSI/OSI/Paging block can be configurable and indicated by the content of NRU-PBCH (or NRU-ePBCH if supported) within the DSCH-block. For example, the combination of {CORESET BW, number of CORESET symbols} can be configured as one of {24, 2}, {48, 2}, {96, 2}. For another example, the combination of {CORESET BW, number of CORESET symbols} can be configured as one of {24, 1}, {24,2}, {24, 3}, {48,1}, {48,2}, {48,3}, {96,1}, {96,2}, {96,3}, where 3 symbols of CORESET are considered to improve the coverage.

In one embodiment, although not explicitly illustrated, NRU-CSI-RS can be multiplexed within some of or all of the PDSCH RBs and/or empty RBs.

In one embodiment, the SCS of SS/PBCH block (and potential enhancements) can be 30 kHz, wherein the corresponding channel BW is 20 MHz, and CORESET BW is 24 RBs.

In one embodiment, the SCS of RMSI/OSI/Paging blocks (although illustrated as same as the SCS of SS/PBCH block in the figure) can be different from the SCS of SS/PBCH block and the SCS of RMSI/OSI/Paging blocks is indicated in system information such as MIB carried by NR-PBCH in the corresponding SS/PBCH block.

In one embodiment, the two SS/PBCH blocks within the same slot are assumed to be QCLed (e.g. repetitively transmitted) and a single RMSI/OSI/Paging CORESET and single PDSCH are associated (e.g. QCLed) with the two SS/PBCH blocks.

In one embodiment, the symbols for CORESET and PDSCH of RMSI/OSI/Paging can be aligned with the ones of SS/PBCH blocks, if SCS of SS/PBCH blocks and SCS of RMSI/OSI/Paging are the same. For example, as illustrated in FIG. 13B, if the number of symbols for SS/PBCH blocks is 4, CORESET and PDSCH of RMSI/OSI/Paging for an associated SS/PBCH block can each have 2 symbols (e.g. multiplexing pattern 3 as in NR specification).

In one embodiment (i.e. DSCH-block composition), a DSCH-block can be confined within a slot and within the min carrier BW, where the only SS/PBCH block and RMSI/OSI/Paging block are both confined within the slot and within the min carrier BW. SS/PBCH block is TDMed with the CORESET of RMSI/OSI/Paging (i.e., using multiplexing Pattern 1 with group offset O=0), and SS/PBCH block can be TDMed or FDMed or hybrid multiplexed with PDSCH of RMSI/OSI/Paging.

Figure 14:
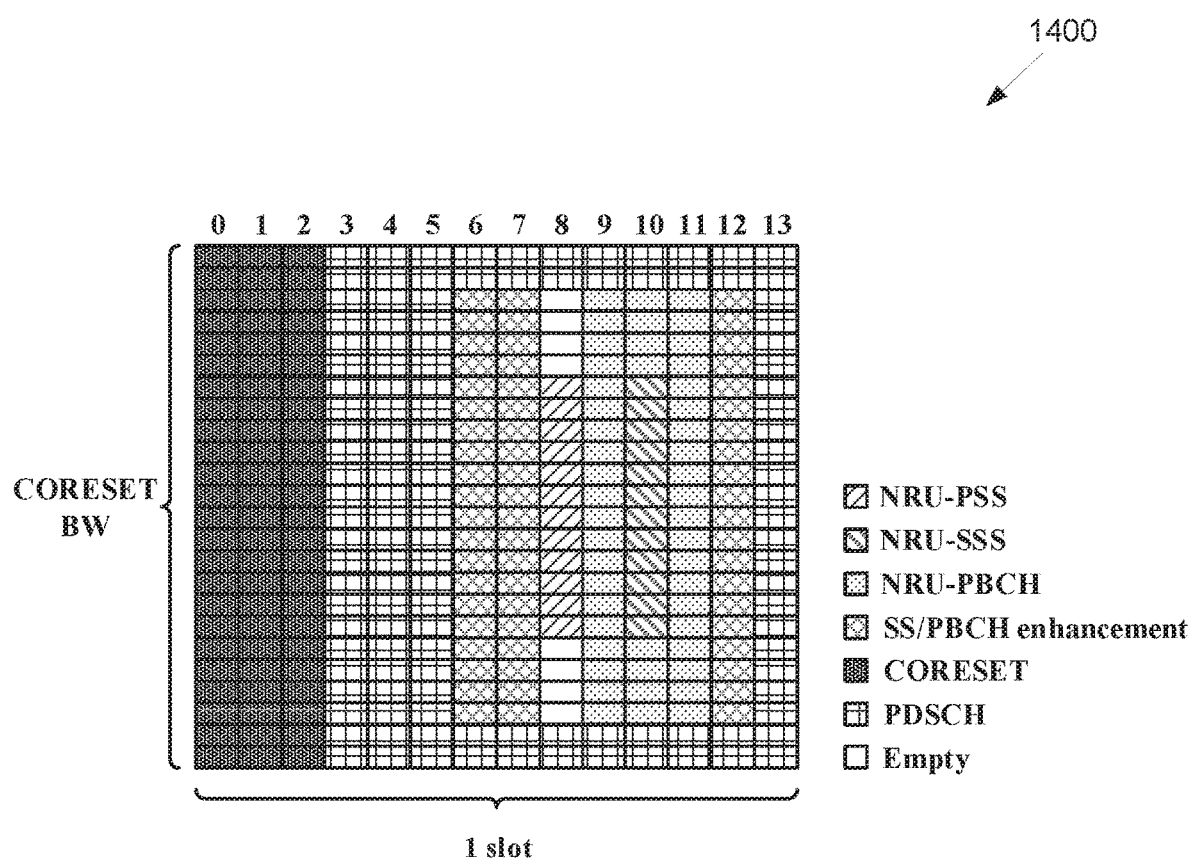
FIG. 14 illustrates yet another example DSCH block according to embodiments of the present disclosure.

FIG. 14 illustrates yet another example DSCH block 1400 according to embodiments of the present disclosure. The embodiment of the DSCH block 1400 illustrated in FIG. 14 is for illustration only. FIG. 14 does not limit the scope of this disclosure to any particular implementation.

One example of this embodiment is shown in FIG. 14 for illustration purpose. One slot contains one possible SS/PBCH block, where the SS/PBCH blocks has 20 RBs TX BW.

In one embodiment, part of or all of the remaining symbols other than SS/PBCH blocks can be utilized for SS/PBCH enhancement (if supported), e.g. for mapping NRU-ePSS/eSSS/ePBCH. For example, for each of the SS block within the slot, at least one symbol is mapped for NRU-ePSS, and/or at least one symbol is mapped for NRU-eSSS, and/or at least one symbol is mapped for NRU-ePBCH.

In one embodiment, part of or all of the remaining symbols other than SS/PBCH blocks can be utilized for performing LBT. For example, the first one or two symbols of the slot can be utilized for performing LBT for the transmission of the two SS/PBCH blocks within the slot. For another example, one or two symbols before each SS/PBCH block within the slot can be utilized for performing directional LBT for the transmission of the corresponding SS/PBCH block. For yet another example, the last one or two symbols of the slot can be utilized for performing LBT for the transmission of the next slot.

In one embodiment, part of or all of the remaining symbols can be utilized for transmitting configured NRU-CSI-RS (if supported).

In one embodiment, the location of the 20 RBs of SS/PBCH block TX BW can be flexible in term of the relative frequency location within the CORESET RB BW, and can also be not RB aligned with data RB due to floating sync. The actual location of the 20 RBs can be configurable and indicated by the content of NRU-PBCH (or NRU-ePBCH if supported) within the DSCH-block. Note that the SS/PBCH blocks aligned with the central of the CORESET BW in FIG. 14 is only for illustration purpose.

In one embodiment, the BW and number of symbols for CORESET in the RMSI/OSI/Paging block can be fixed (e.g. predefined in the spec), such as fixed as 2 symbols or 3 symbols, and with 24 RBs if the SCS of CORESET is 60 kHz.

In one embodiment, the BW and number of symbols for CORESET in the RMSI/OSI/Paging block can be configurable and indicated by the content of NRU-PBCH (or NRU-ePBCH if supported) within the DSCH-block. For example, the combination of {CORESET BW, number of CORESET symbols} can be configured as one of {24, 2}, {24, 3}, where 3 symbols of CORESET are considered to improve the coverage, if the SCS of CORESET is 60 kHz. For another example, the combination of {CORESET BW, number of CORESET symbols} can be configured as one of {24, 1}, {24, 2}, {24, 3}, where 3 symbols of CORESET are considered to improve the coverage, if the SCS of CORESET is 60 kHz.

In one embodiment, although not explicitly illustrated, NRU-CSI-RS can be multiplexed within some of or all of the PDSCH RBs and/or empty RBs.

In one embodiment, the SCS of SS/PBCH block (and potential enhancements) can be 60 kHz, wherein the corresponding channel BW is 20 MHz, and CORESET BW is 24 RBs.

In one embodiment, the SCS of RMSI/OSI/Paging blocks (although illustrated as same as the SCS of SS/PBCH block in the figure) can be different from the SCS of SS/PBCH block and the SCS of RMSI/OSI/Paging blocks is indicated in system information such as MIB carried by NR-PBCH in the corresponding SS/PBCH block.

In one embodiment, the symbols containing SS/PBCH blocks are not rate matched for PDSCH of RMSI/OSI/Paging (i.e., the remaining 4 RBs in the symbols containing SS/PBCH blocks are not rate matched for PDSCH of RMSI/OSI/Paging), such that PDSCH of RMSI/OSI/Paging is TDMed with SS/PBCH blocks and CORESET of RMSI/OSI/Paging.

In one embodiment, this embodiment can be achieved by configuring the indication of actually transmitted SS/PBCH block (e.g. ssb-PositionsInBurst in RMSI and/or ssb-PositionsInBurst in RRC), such that only one SS/PBCH block within a lot is actually transmitted.

In one embodiment (i.e. DSCH-block composition), a DSCH-block can be confined within a mini-slot, where SS/PBCH blocks and RMSI/OSI/Paging blocks are both confined within the mini-slot. SS/PBCH block is TDMed or FDMed with the CORESET of RMSI/OSI/Paging, and SS/PBCH block can be TDMed or FDMed or hybrid multiplexed with PDSCH of RMSI/OSI/Paging.

Figure 15:
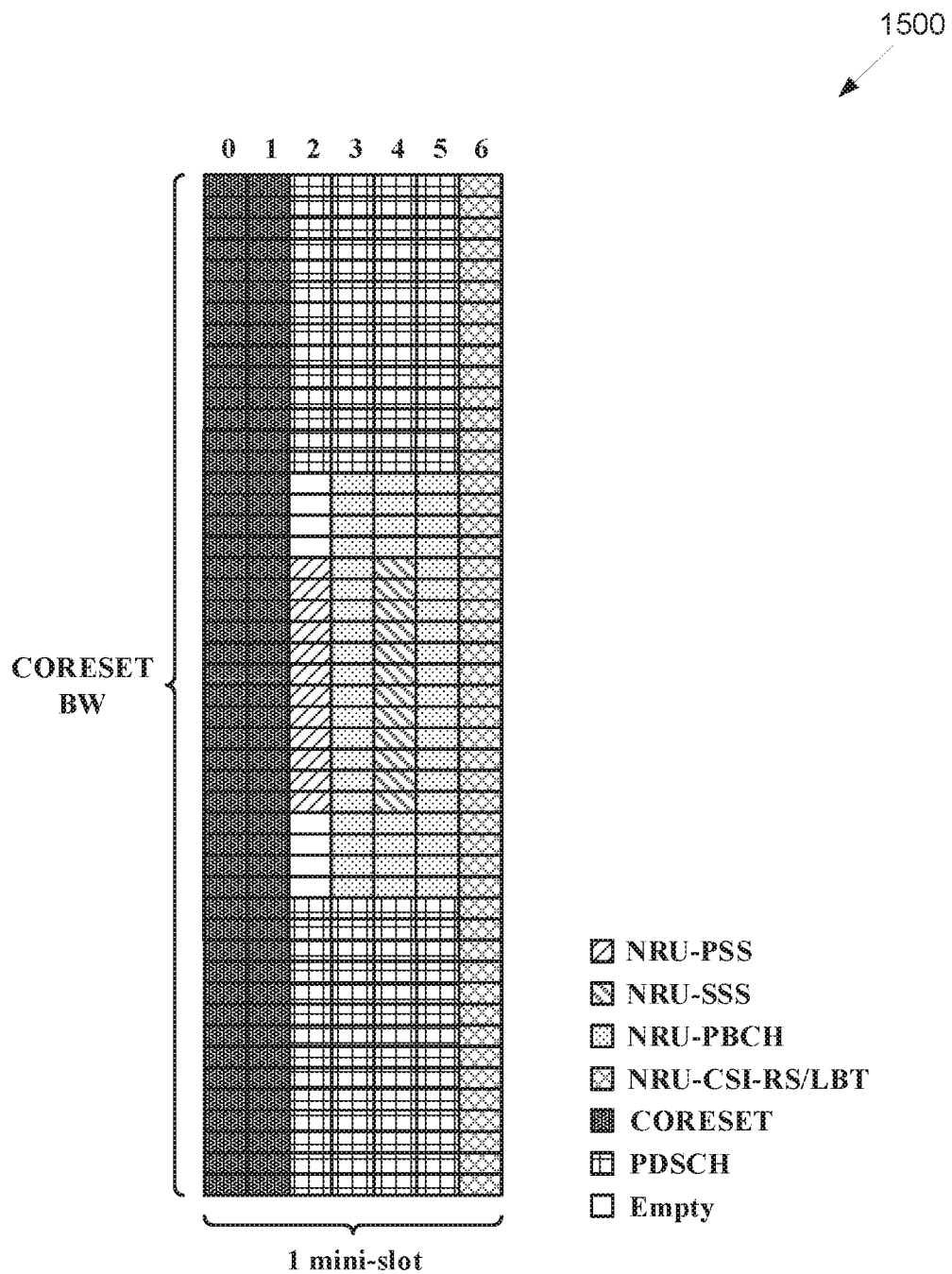
FIG. 15 illustrates yet another example DSCH block according to embodiments of the present disclosure.

FIG. 15 illustrates yet another example DSCH block 1500 according to embodiments of the present disclosure. The embodiment of the DSCH block 1500 illustrated in FIG. 15 is for illustration only. FIG. 15 does not limit the scope of this disclosure to any particular implementation.

One example of this embodiment is shown in FIG. 15 for illustration purpose. One mini-slot contains one DSCH-block. 4 symbols are utilized for SS/PBCH blocks, and part of or all of the remaining symbols, and/or the remaining RBs on both sides of SS/PBCH blocks in the frequency domain, can be utilized for CORESET and PDSCH of RMSI/OSI/Paging.

In one embodiment, part of or all of the remaining symbols other than SS/PBCH blocks can be utilized for SS/PBCH enhancement (if supported), e.g. for mapping NRU-ePSS/eSSS/ePBCH. For example, for each of the SS block within the slot, at least one symbol is mapped for NRU-ePSS, and/or at least one symbol is mapped for NRU-eSSS, and/or at least one symbol is mapped for NRU-ePBCH.

In one embodiment, part of or all of the remaining symbols other than SS/PBCH blocks can be utilized for performing LBT. For example, the first one or two symbols of the slot can be utilized for performing LBT for the transmission of the two SS/PBCH blocks within the slot. For another example, one or two symbols before each SS/PBCH block within the slot can be utilized for performing directional LBT for the transmission of the corresponding SS/PBCH block. For yet another example, the last one or two symbols of the slot can be utilized for performing LBT for the transmission of the next slot.

In one embodiment, part of or all of the remaining symbols can be utilized for transmitting configured NRU-CSI-RS (if supported).

In one embodiment, the location of the 20 RBs of SS/PBCH block TX BW can be flexible in term of the relative frequency location within the CORESET RB BW, and can also be not RB aligned with data RB due to floating sync. The actual location of the 20 RBs can be configurable and indicated by the content of NRU-PBCH (or NRU-ePBCH if supported) within the DSCH-block. Note that the SS/PBCH blocks aligned with the central of the CORESET BW in FIG. 14 is only for illustration purpose.

In one embodiment, the BW and number of symbols for CORESET in the RMSI/OSI/Paging block can be fixed (e.g. predefined in the spec), such as fixed as 2 symbols or 3 symbols, and with 48 RBs if the SCS of CORESET is 30 kHz.

In one embodiment, the BW and number of symbols for CORESET in the RMSI/OSI/Paging block can be configurable and indicated by the content of NRU-PBCH (or NRU-ePBCH if supported) within the DSCH-block. For example, the combination of {CORESET BW, number of CORESET symbols} can be configured as one of {48, 1}, {48, 2}, {48, 3}, where 3 symbols of CORESET are considered to improve the coverage, if the SCS of CORESET is 30 kHz. For another example, the combination of {CORESET BW, number of CORESET symbols} can be configured as one of {48, 1}, {48, 2}, if the SCS of CORESET is 30 kHz.

In one embodiment, although not explicitly illustrated, NRU-CSI-RS can be multiplexed within some of or all of the PDSCH RBs and/or empty RBs.

In one embodiment, the SCS of SS/PBCH block (and potential enhancements) can be 30 kHz, wherein the corresponding channel BW is 20 MHz, and CORESET BW is 48 RBs.

In one embodiment, the SCS of RMSI/OSI/Paging blocks (although illustrated as same as the SCS of SS/PBCH block in the figure) can be different from the SCS of SS/PBCH block and the SCS of RMSI/OSI/Paging blocks is indicated in system information such as MIB carried by NR-PBCH in the corresponding SS/PBCH block.

In one embodiment (i.e. DSCH-block composition), a DSCH-block can have two or more sub-blocks TDMed, wherein one of the sub-blocks is for SS/PBCH block and the CORESET(s) for RMSI/OSI/Paging and is confined within a slot in the time domain and confined within the min carrier BW (e.g. 24 RBs) in frequency domain, and each of the remaining sub-block(s) can be one of the PDSCH of RMSI or OSI or Paging and is confined within another slot or multiple slots in time domain and confined within or exceeding the min carrier BW (depending on CORESET BWNRU-PBCH (or NRU-ePBCH if supported), e.g. 24 RBs or larger in SS numerology) in frequency domain. The SS/PBCH block can refer to the design of NR licensed band (e.g. NR SS/PBCH block), with potential enhancement to improve the one-shot detection performance. The RMSI/OSI/Paging block can be TDMed with the SS/PBCH block (i.e., using multiplexing Pattern 1 with group offset O=0) and the time offset between the two blocks can be hard-coded or configurable. In one consideration of this embodiment, RMSI, OSI, and paging can each construct a separate sub-block of DSCH-block, and RMSI, OSI, and paging can have different configuration on the time domain offset.

Figure 16:
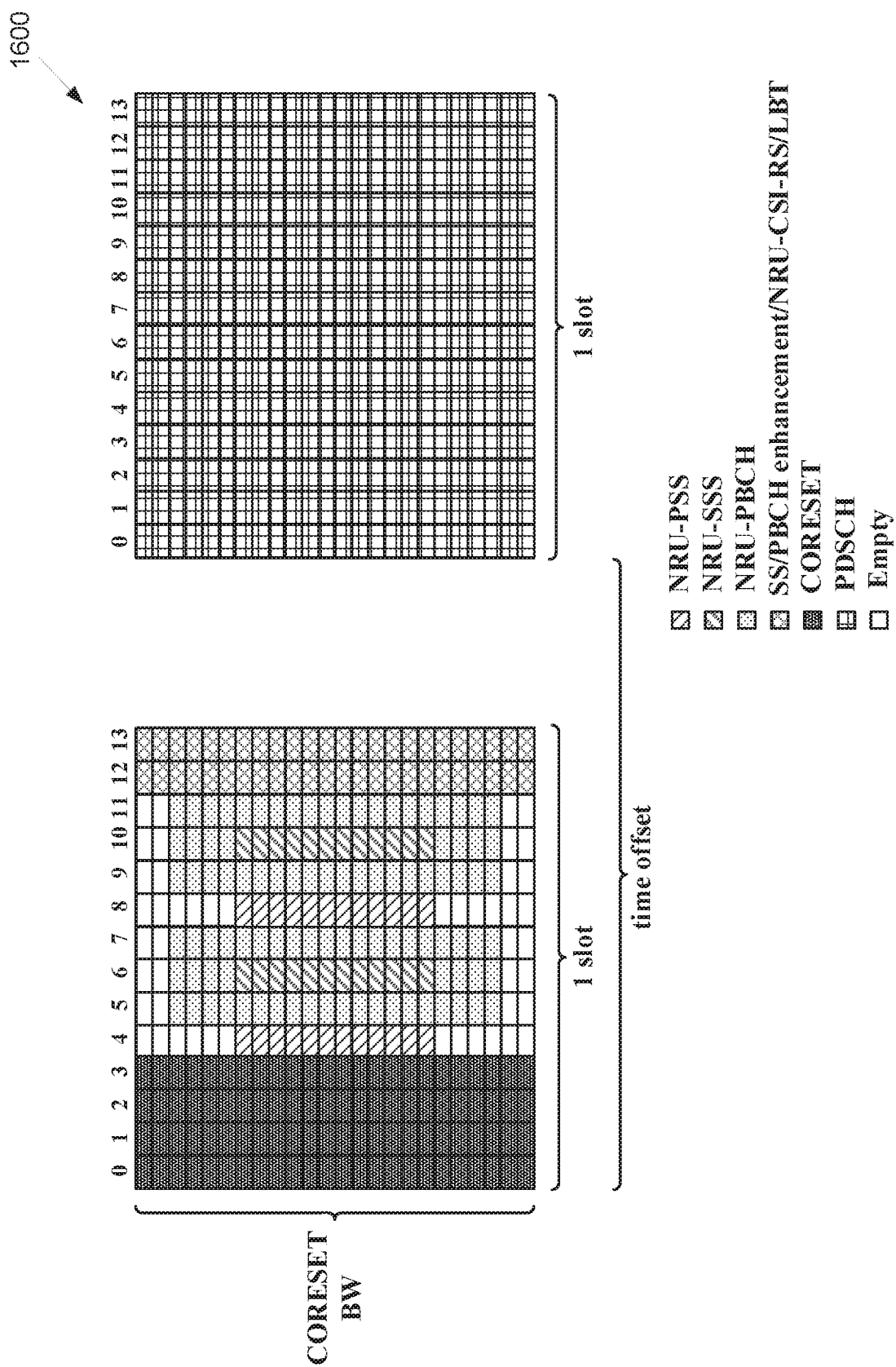
FIG. 16 illustrates yet another example DSCH block according to embodiments of the present disclosure.

FIG. 16 illustrates yet another example DSCH block 1600 according to embodiments of the present disclosure. The embodiment of the DSCH block 1600 illustrated in FIG. 16 is for illustration only. FIG. 16 does not limit the scope of this disclosure to any particular implementation.

One example of this embodiment is shown in FIG. 16 for illustration purpose. One slot contains two possible SS/PBCH blocks, where each of the SS/PBCH blocks has 20 RBs TX BW, and the associated CORESETs of the SS/PBCH blocks, and another at least one slot contains the PDSCHs containing RMSI/OSI/Paging data.

In one embodiment, part of or all of the remaining symbols other than SS/PBCHs in the first slot can be utilized for SS/PBCH enhancement (if supported), e.g. for mapping NRU-ePSS/eSSS/ePBCH. For example, for each of the SS block within the slot, at least one symbol is mapped for NRU-ePSS, and/or at least one symbol is mapped for NRU-eSSS, and/or at least one symbol is mapped for NRU-ePBCH.

In one embodiment, part of or all of the remaining symbols other than SS/PBCHs in the first slot can be utilized for performing LBT. For example, the first one or two symbols of the slot can be utilized for performing LBT for the transmission of the two SS/PBCH blocks within the slot. For another example, one or two symbols before each SS/PBCH block within the slot can be utilized for performing directional LBT for the transmission of the corresponding SS/PBCH block. For yet another example, the last one or two symbols of the slot can be utilized for performing LBT for the transmission of the next slot.

In one embodiment, part of or all of the remaining symbols other than SS/PBCHs in the first slot can be utilized for transmitting configured NRU-CSI-RS (if supported).

In one embodiment, the location of the 20 RBs of SS/PBCH block TX BW can be flexible in term of the relative frequency location within the CORESET RB BW, and can also be not RB aligned with data RB due to floating sync. The actual location of the 20 RBs can be configurable and indicated by the content of NRU-PBCH (or NRU-ePBCH if supported) within the DSCH-block. Note that the SS/PBCH blocks aligned with the central of the CORESET BW in FIG. 16 is only for illustration purpose.

In one embodiment, the mapping pattern of the two SS/PBCH blocks to the slot can be same for all the slots containing SS/PBCH blocks. For one example, the first SS/PBCH block can be mapped to symbol #4 to #7 and the second SS/PBCH block can be mapped to symbol #8 to #11 for normal CP. For another example, the first SS/PBCH block can be mapped to symbol #6 to #9 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for normal CP. For yet another example, the first SS/PBCH block can be mapped to symbol #4 to #7 and the second SS/PBCH block can be mapped to symbol #8 to #11 for extended CP.

In one sub-embodiment, the mapping pattern of the SS/PBCH blocks to the slot is identical for the first half slot (e.g. symbol #0 to #6 for normal CP or symbol #0 to #5 for extended CP) and the second half slot (e.g. symbol #7 to #13 for normal CP or symbol #6 to #11 for extended CP). For one example, the first SS/PBCH block can be mapped to symbol #2 to #5 and the second SS/PBCH block can be mapped to symbol #9 to #12 for normal CP. For another example, the first SS/PBCH block can be mapped to symbol #3 to #6 and the second SS/PBCH block can be mapped to symbol #10 to #13 for normal CP. For yet another example, the first SS/PBCH block can be mapped to symbol #2 to #5 and the second SS/PBCH block can be mapped to symbol #8 to #11 for extended CP.

In one embodiment, the BW and number of symbols for CORESET in the RMSI/OSI/Paging block can be fixed (e.g. predefined in the spec), such as fixed as 2 symbols or 3 symbols, and with 24 RBs if the SCS of CORESET is 60 kHz.

In one embodiment, the BW and number of symbols for CORESET in the RMSI/OSI/Paging block can be configurable and indicated by the content of NRU-PBCH (or NRU-ePBCH if supported) within the DSCH-block. For one example, the combination of {CORESET BW, number of CORESET symbols} can be configured as one of {24, 1}, {24, 2}, {24, 3}, {48, 1}, {48,2}, {48,3}, {96,1}, {96,2}, {96,3}, where 3 symbols of CORESET are considered to improve the coverage. For another example, the combination of {CORESET BW, number of CORESET symbols} can be configured as one of {24, 2}, {24, 3}, where 3 symbols of CORESET are considered to improve the coverage, if the SCS of CORESET is 60 kHz. For yet another example, the combination of {CORESET BW, number of CORESET symbols} can be configured as one of {24, 1}, {24, 2}, {24, 3}, where 3 symbols of CORESET are considered to improve the coverage, if the SCS of CORESET is 60 kHz.

In one embodiment, the time domain offset between the slot containing SS/PBCH blocks and CORESETs and the slot containing PDSCHs of RMSI/OSI/Paging can be fixed as or configured as one slot (e.g. the slot difference in time-domain resource allocation of DCI carried by the PDCCH in the CORESET is 1 slot).

In one embodiment, the time domain offset between the slot containing SS/PBCH blocks and CORESETs and the slot containing PDSCHs of RMSI/OSI/Paging can be fixed as or configured as the same as the transmission duration of slots containing SS/PBCH burst set, such that the transmission of PDSCHs of RMSI/OSI/Paging starts right after the transmission of SS/PBCH burst set and CORESETs. For one example, the time domain offset can be 1 ms if SS SCS is 30 kHz and maximum number of SS/PBCH blocks within a burst set is 4. For another example, the time domain offset can be 1 ms if SS SCS is 60 kHz and maximum number of SS/PBCH blocks within a burst set is 8. For yet another example, the time domain offset can be 2 ms if SS SCS is 30 kHz and maximum number of SS/PBCH blocks within a burst set is 8. For yet another example, the time domain offset can be 0.5 ms if SS SCS is 60 kHz and maximum number of SS/PBCH blocks within a burst set is 4.

In one embodiment, the time domain offset between the slot containing SS/PBCH blocks and the CORESETs and the slot containing PDSCHs of the RMSI/OSI/Paging can be configured as the same as the transmission duration of slots containing actually transmitted SS/PBCH blocks, such that the transmission of PDSCHs of RMSI/OSI/Paging starts right after the transmission of actually transmitted SS/PBCH blocks. For one example, the time domain offset can be configurable from {0.5, 1, 1.5, 2} slots, if the maximum number of SS/PBCH blocks within a burst set is 4. For another example, the time domain offset can be configurable from {0.5, 1, 1.5, 2, 2.5, 3, 3.5, 4} slots, if the maximum number of SS/PBCH blocks within a burst set is 8. For yet another example, the time domain offset can be configurable from {1, 2} slots, if the maximum number of SS/PBCH blocks within a burst set is 4. For yet another example, the time domain offset can be configurable from {1, 2, 3, 4} slots, if the maximum number of SS/PBCH blocks within a burst set is 8.

In one embodiment, the time domain offset can be configurable and indicated by the content of NRU-PBCH (or NRU-ePBCH if supported) within the DSCH-block.

In one embodiment, although not explicitly illustrated, NRU-CSI-RS can be multiplexed within some of or all of the PDSCH RBs and/or empty RBs.

In one embodiment, the SCS of SS/PBCH block (and potential enhancements) can be 60 kHz, wherein the corresponding channel BW is 20 MHz, and CORESET BW is 24 RBs.

In one embodiment, the SCS of RMSI/OSI/Paging blocks (although illustrated as same as the SCS of SS/PBCH block in the figure) can be different from the SCS of SS/PBCH block and the SCS of RMSI/OSI/Paging blocks is indicated in system information such as MIB carried by NR-PBCH in the corresponding SS/PBCH block.

In one embodiment, the two SS/PBCH blocks within the same slot are assumed to be QCLed (e.g. repetitively transmitted) and a single RMSI/OSI/Paging CORESET and single PDSCH are associated (e.g. QCLed) with the two SS/PBCH blocks.

The DSCH-burst set can be constructed by at least one DSCH-block. In one example, the DSCH-block(s) within the DSCH-burst set can be contiguous without time-domain gap, if a single LBT is supported for the whole DSCH-burst set. In another example, the DSCH-block(s) with the DSCH-burst set can be with potentially small time-domain gaps to allow performing LBT, if LBT for each DSCH-block is supported.

At least one of the following embodiments can be supported for a given unlicensed carrier frequency range.

In one embodiment, for a given carrier frequency range, a UE assumes all the DSCH-blocks within the DSCH-burst set are QCLed with respect to average gain, QCL-TypeA, and QCL-TypeD properties, when applicable (e.g. repetitions using the same single beam), and UE can perform combining of the same signal/channels within the DSCH-blocks and/or cross the DSCH-burst sets. The UE assumes that bits in both ssb-PositionsInBurst in RMSI and ssb- PositionsInBurst in RRC are configured as 1 (i.e., the DSCH-blocks are all actually transmitted).

In one embodiment, for a given carrier frequency range, a UE assumes the DSCH-blocks with the same SS/PBCH block index across the DSCH-burst set are QCLed with respect to average gain, QCL-TypeA, and QCL-TypeD properties, when applicable, and the UE can perform combining of the same signal/channels cross the DSCH-burst sets.

In one example, the UE assumes that bits in both ssb-PositionsInBurst in RMSI and ssb-PositionsInBurst in RRC are configured as 1 (i.e., the DSCH-blocks are all actually transmitted).

In one embodiment, for a given carrier frequency range, UE assumes the DSCH-blocks within the DSCH-burst set can be divided into groups, wherein the DSCH-blocks within the same group are QCLed with respect to average gain, QCL-TypeA, and QCL-TypeD properties, when applicable (e.g. repetitions using the same single beam), and UE can perform combining of the same signal/channels within the DSCH-blocks in the same group and/or cross the groups of different DSCH-burst sets. The UE assumes that bits corresponding to the same group in both ssb-PositionsInBurst in RMSI and ssb-PositionsInBurst in RRC are configured as 1 or 0 at the same time (i.e., the DSCH-blocks within the group are all actually transmitted or not transmitted). For example, the group size can be 2, e.g. the SS/PBCH blocks in the same slot are QCLed. For another example, the group size can be 4 is SCS of SS/PBCH block is 30 kHz, e.g. the SS/PBCH blocks subject to the same one-shot LBT (i.e., within 1 ms COT) are QCLed.

A DSCH-burst-set transmission is carried by physical downlink channels, e.g. SCH, PBCH, PDCCH, and PDSCH. LBT may be required before the downlink transmission, at least for some carrier frequency range of the NR unlicensed band. Due to LBT, the channel access opportunity may not be guaranteed. To enhance the channel access opportunity, the DSCH-burst-set transmission on the unlicensed band can be confined within a transmission opportunity window (denoted as DSCH-window), where the configuration of the DSCH-window can be either hard-coded in spec or configurable in a signaling, for different use cases. The configuration of DSCH-window, which is also named as DSCH transmission timing configuration (DTTC), wherein the DSCH-burst-set transmission is confined, may at least contain one of the window periodicity, window size, and window starting offset within the periodicity.

One DTTC can be associated with at least one bitmap or group-bitmap for indicating the transmission of SS/PBCH blocks within the DTTC. LBT can be performed before the transmission of DSCH-burst-set, and the transmitter may have multiple starting locations, led by LBTs, within the DSCH-window to start the transmission of DSCH-burst-set. If the LBT before one of the starting locations is determined as busy, the transmitter can still perform LBT in a later possible location for LBT, and has further opportunity within the DSCH-window for DSCH-burst-set transmission.

In one embodiment, a DTTC can be separately configured from DSCH measurement timing configuration (DMTC) (wherein DMTC is basically for measurement purpose) such that DTTC is at least for the rate matching purpose on the serving cell(s). In one consideration, the DTTC can be used for radio link monitoring purpose on the serving cell(s) as well.

In one sub-embodiment, at least one DTTC can be supported for a serving cell, wherein one of the DTTCs is set as default and hard coded at least for initial cell acquisition purpose.

In one example, the periodicity of the DSCH-window in the default DTTC is the same as the default periodicity of SS/PBCH blocks if not configured by higher layer, e.g. 20 ms.

In another example, the duration of the DSCH-window in the default DTTC is a half frame, same as the time duration to confine a SS/PBCH burst set in NR. In this example, the content of PBCH can maintain the same within the default DSCH-window.

In yet another example, the offset of the DSCH-window within the periodicity in the default DTTC can be one from 0, 5, 10, 15 ms, wherein the information can be inferred from the SFN and half frame indicator delivered by PBCH content (or together with DMRS of PBCH for below 3 GHz carrier frequency range).

In another sub-embodiment, other than the default DTTC, there can be at least one extra DTTC which is configurable by a high layer signaling, such as at least for rate matching purpose after initial cell acquisition. In one consideration, the DTTC can be used for radio link monitoring purpose on the serving cell(s) as well.

The following embodiments can be applied to both single-beam and multiple-beam operations (e.g. there is no distinguish of single-beam and multiple-beam operation and it is up to implementation), wherein one DSCH-burst set can be constructed by a single DSCH-block or multiple repetitions (e.g. L) of DSCH-blocks (wherein the SS/PBCH block index of the DSCH-blocks can be different) for single-beam operation, and one DSCH-burst set can be constructed by at most L DSCH-blocks, and L is determined separately for a particular carrier frequency range.

Figure 17:
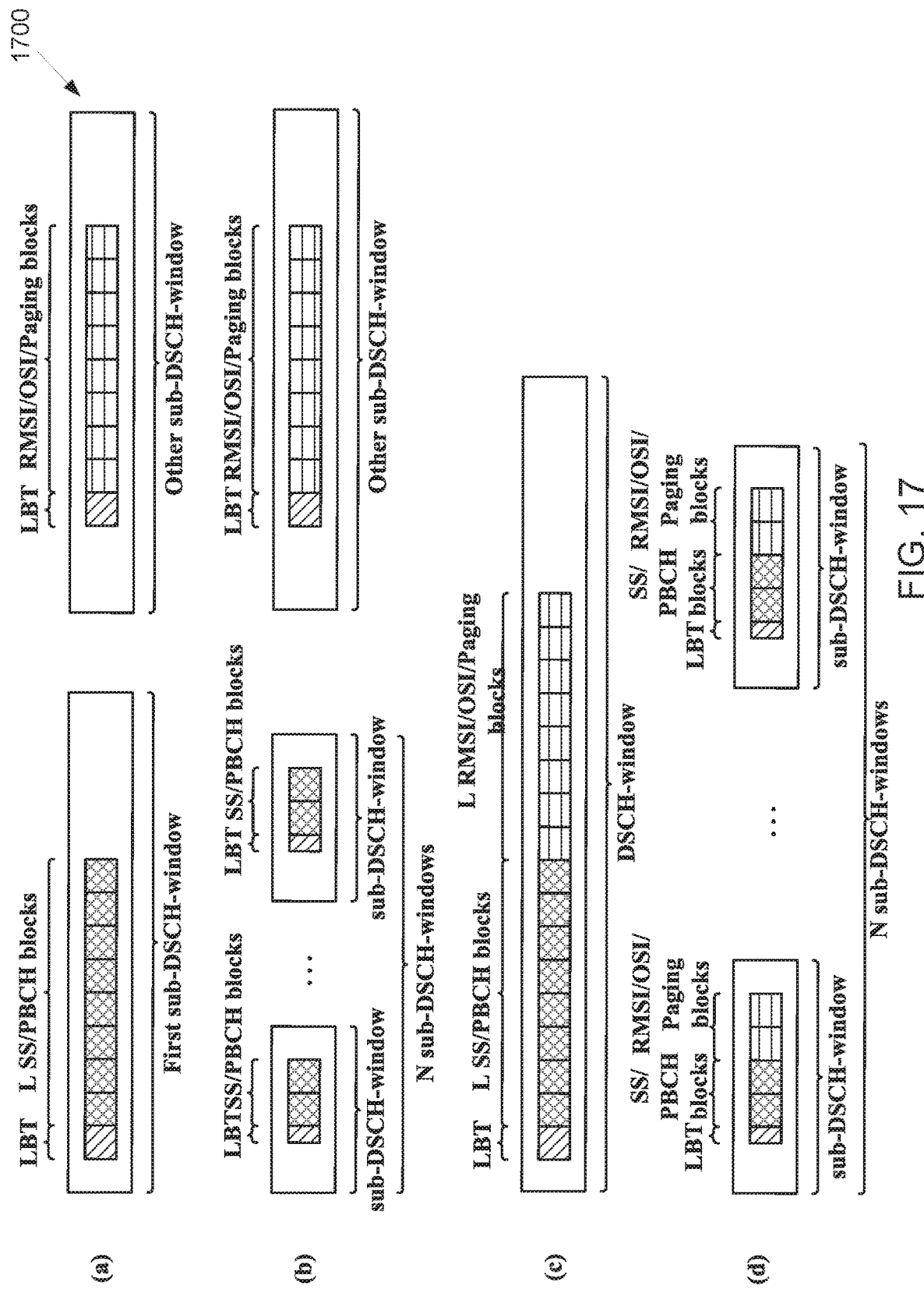
FIG. 17 illustrates an example transmission of DSCH-blocks according to embodiments of the present disclosure.

In one embodiment, one or more examples in FIG. 17 can be supported simultaneously by configuring the time domain offset between the SS/PBCH blocks and RMSI/OSI/Paging blocks.

In one embodiment, it is assumed a scenario where the DSCH-block has multiple sub-blocks in time domain, and the time domain offset of the sub-blocks is non-zero. For example, the applicable scenarios include DSCH-block Composition Embodiment 1 (e.g. SS/PBCH blocks and CORESET of RMSI/OSI/Paging are multiplexed using Pattern 1 with group offset O>0, and the time domain resource allocation of PDSCH of RMSI/OSI/Paging is within the same slot as the corresponding PDCCH of RMSI/OSI/Paging) and DSCH-block composition (e.g. SS/PBCH blocks and CORESET of RMSI/OSI/Paging are multiplexed using pattern 1 with group offset O=0, and the time domain resource allocation of PDSCH of RMSI/OSI/Paging is not within the same slot as the corresponding PDCCH of RMSI/OSI/Paging) in the previous part of this disclosure.

FIG. 17 illustrates an example transmission of DSCH-blocks 1700 according to embodiments of the present disclosure. The embodiment of the transmission of DSCH-blocks 1700 illustrated in FIG. 17 is for illustration only. FIG. 17 does not limit the scope of this disclosure to any particular implementation.

In one embodiment, the transmission of a burst of each sub-block within the DSCH block can be confined within a separate sub-DSCH-window. For one example, as shown in FIG. 17, for DSCH-block composition, the transmission of SS/PBCH blocks can use a separate sub-DSCH-window other than the sub-DSCH-window(s) for the transmission of RMSI/OSI/Paging. For another example, for DSCH-block composition, the transmission of SS/PBCH blocks and CORESETs of RMSI/OSI/Paging can use a separate sub-DSCH-window other than the sub-DSCH-window(s) for the transmission of the PDSCHs of RMSI/OSI/Paging.

In one embodiment, the LBT associated to the transmission of the first sub-DSCH-blocks containing SS/PBCH blocks in the first sub-DSCH-window can be using a matched one with the transmission duration of the first sub-DSCH-blocks containing SS/PBCH blocks, subject to regulation at the same time (e.g. Cat2 LBT can be utilized only for time-domain overhead equal to or smaller than 5%). In one example, the transmission duration of the first sub-DSCH-blocks containing SS/PBCH blocks can be determined as the duration of slots containing the potentially transmitted L SS/PBCH blocks, where L is the maximum number of SS/PBCH blocks within a burst set. In another example, the transmission duration of the first sub-DSCH-blocks containing SS/PBCH blocks can be determined as the duration of slots containing the actually transmitted SS/PBCH blocks within the sub-DSCH-window, wherein the indication of actually transmission can be in ssb-PositionsInBurst in RMSI and/or ssb-PositionsInBurst in RRC.

For instance, when regulation for Cat2 LBT is satisfied (e.g. time-domain overhead equal to or smaller than 5%), and the transmission duration of SS/PBCH blocks can be limited within 1 ms, one-shot LBT (e.g. Cat2 LBT in LAA) can be utilized before the transmission of the first sub-DSCH-blocks containing SS/PBCH blocks; otherwise (e.g. time-domain overhead larger than 5%), if the transmission duration of SS/PBCH blocks can be limited within 2 ms, up to Cat4 LBT with channel access priority class 1 (e.g. Cat4 LBT with p=1 in LAA) can be utilized before the transmission of the first sub-DSCH-blocks containing SS/PBCH blocks; if the transmission duration of SS/PBCH blocks can be limited within 3 ms, up to Cat4 LBT with channel access priority class 2 (e.g. Cat4 LBT with p=2 in LAA) can be utilized before the transmission of the first sub-DSCH-blocks containing SS/PBCH blocks; if the transmission duration of SS/PBCH blocks can be limited within 8 ms, up to Cat4 LBT with channel access priority class 3 or 4 (e.g. Cat4 LBT with p=3 or 4 in LAA) can be utilized before the transmission of the first sub-DSCH-blocks containing SS/PBCH blocks.

In one embodiment, the LBT associated to the transmission of the other sub-DSCH-blocks containing RMSI/OSI/Paging can be using a matched one with the transmission duration of the sub-DSCH-blocks. For example, the transmission duration of the sub-DSCH-blocks containing RMSI/OSI/Paging can be determined as the duration of slots containing the RMSI/OSI/Paging corresponding to the actually transmitted SS/PBCH blocks within the first sub-DSCH-window, wherein the indication of actually transmission can be in ssb-PositionsInBurst in RMSI and/or ssb-PositionsInBurst in RRC.

Figure 18:
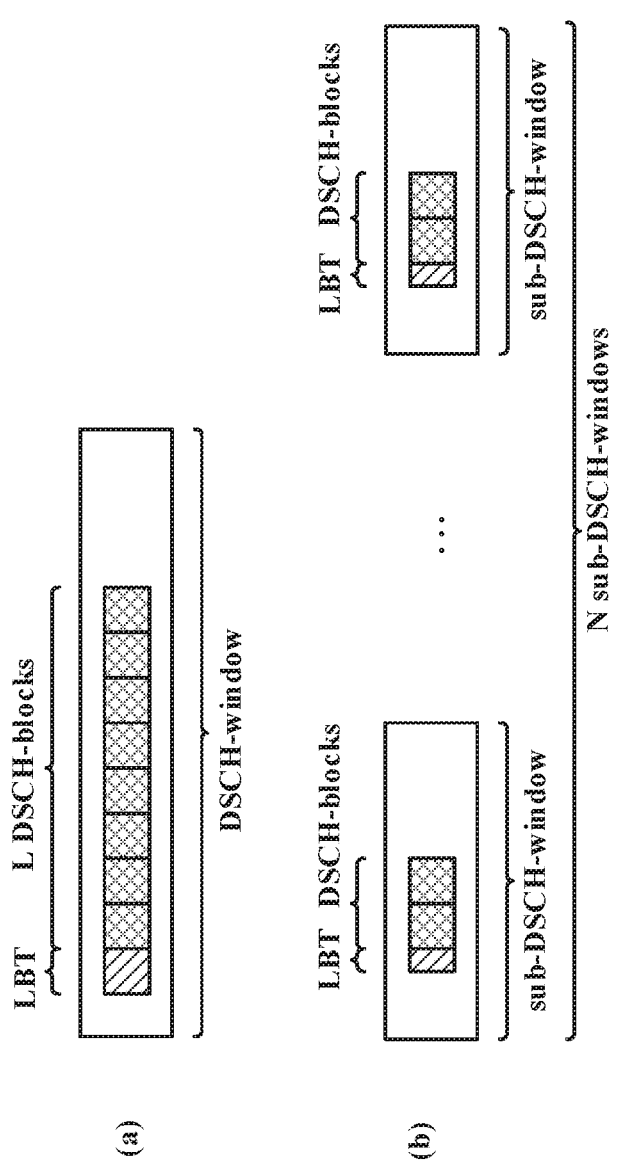
FIG. 18 illustrates another example transmission of DSCH-blocks according to embodiments of the present disclosure.

FIG. 18 illustrates another example transmission of DSCH-blocks 1800 according to embodiments of the present disclosure. The embodiment of the transmission of DSCH-blocks 1800 illustrated in FIG. 18 is for illustration only. FIG. 18 does not limit the scope of this disclosure to any particular implementation.

In one embodiment, the transmission of a first sub-DSCH-blocks containing SS/PBCH blocks can use N separate sub-DSCH-windows, and the transmission of other sub-DSCH-blocks can use other separate sub-DSCH-windows. For one example, as shown in FIG. 18, for DSCH-block Composition Embodiment 1, the transmission of SS/PBCH blocks can use N separate sub-DSCH-windows other than the sub-DSCH-window(s) for the transmission of RMSI/OSI/Paging. For another example, for DSCH-block composition, the transmission of SS/PBCH blocks and CORESETs of RMSI/OSI/Paging can use N separate sub-DSCH-window other than the sub-DSCH-window(s) for the transmission of the PDSCHs of RMSI/OSI/Paging.

In one embodiment, the LBT associated to the transmission of the sub-DSCH-blocks containing part of the SS/PBCH blocks in each sub-DSCH-window can be using a matched one with the transmission duration of the sub-DSCH-blocks containing part of the SS/PBCH blocks, subject to regulation at the same time (e.g. Cat2 LBT can be utilized only for time-domain overhead equal to or smaller than 5%).

In one example, the transmission duration of the sub-DSCH-blocks containing SS/PBCH blocks can be determined as the duration of slots containing the potentially transmitted SS/PBCH blocks within the sub-DSCH-window.

In another example, the transmission duration of the sub-DSCH-blocks containing SS/PBCH blocks can be determined as the duration of slots containing the actually transmitted SS/PBCH blocks within the sub-DSCH-window, wherein the indication of actually transmission can be in ssb-PositionsInBurst in RMSI and/or ssb-PositionsInBurst in RRC.

For instance, when regulation for Cat2 LBT is satisfied (e.g. time-domain overhead equal to or smaller than 5%), and the transmission duration of SS/PBCH blocks can be limited within 1 ms, one-shot LBT (e.g. Cat2 LBT in LAA) can be utilized before the transmission of the first sub-DSCH-blocks containing SS/PBCH blocks; otherwise (e.g. time-domain overhead larger than 5%), if the transmission duration of SS/PBCH blocks can be limited within 2 ms, up to Cat4 LBT with channel access priority class 1 (e.g. Cat4 LBT with p=1 in LAA) can be utilized before the transmission of the first sub-DSCH-blocks containing SS/PBCH blocks; if the transmission duration of SS/PBCH blocks can be limited within 3 ms, up to Cat4 LBT with channel access priority class 2 (e.g. Cat4 LBT with p=2 in LAA) can be utilized before the transmission of the first sub-DSCH-blocks containing SS/PBCH blocks; if the transmission duration of SS/PBCH blocks can be limited within 8 ms, up to Cat4 LBT with channel access priority class 3 or 4 (e.g. Cat4 LBT with p=3 or 4 in LAA) can be utilized before the transmission of the first sub-DSCH-blocks containing SS/PBCH blocks.

In one embodiment, the LBT associated to the transmission of the other sub-DSCH-blocks containing RMSI/OSI/Paging can be using a matched one with the transmission duration of the sub-DSCH-blocks. For example, the transmission duration of the sub-DSCH-blocks containing RMSI/OSI/Paging can be determined as the duration of slots containing the RMSI/OSI/Paging corresponding to the actually transmitted SS/PBCH blocks within the first sub-DSCH-window, wherein the indication of actually transmission can be in ssb-PositionsInBurst in RMSI and/or ssb-PositionsInBurst in RRC.

In one example, the gNB can configure the LBT and corresponding transmission duration, such that the transmission of SS/PBCH blocks can be confined within a configurable number of sub-DSCH-windows (i.e., N is configurable).

In another example, the gNB can configure the LBT and corresponding transmission duration, such that the transmission of SS/PBCH blocks can be confined within a configurable number of sub-DSCH-windows (i.e., N is configurable), and the length of each sub-DSCH-window is also configurable In one embodiment, the transmission of all the sub-DSCH-blocks can be confined within a single DSCH-window. For one example, as shown in FIG. 18, for DSCH-block composition, the group offset O can be configured as the same as the transmission duration of SS/PBCH blocks in the same DSCH-window, such that the transmission of RMSI/OSI/Paging can start right after the end of transmission of SS/PBCH blocks in the same DSCH-window, and transmission of all the sub-DSCH-blocks can be confined within the same DSCH-window. For another example, for DSCH-block composition, the group offset O can be configured as the same as the transmission duration of SS/PBCH blocks and CORESETs of RMSI/OSI/Paging in the same DSCH-window, such that the transmission of PDSCHs of RMSI/OSI/Paging can start right after the end of transmission of SS/PBCH blocks and CORESETs of RMSI/OSI/Paging in the same DSCH-window, and transmission of all the sub-DSCH-blocks can be confined within the same DSCH-window.

In one embodiment, the LBT associated to the transmission of all the DSCH-blocks can be using a matched one with the transmission duration of all the DSCH-blocks, subject to regulation at the same time (e.g. Cat2 LBT can be utilized only for time-domain overhead equal to or smaller than 5%).

In one example, the transmission duration of all the DSCH-blocks can be determined as the duration of slots containing the potentially transmitted L SS/PBCH blocks as well as the associated RMSI/OSI/Paging, where L is the maximum number of SS/PBCH blocks within a burst set. In another example, the transmission duration of all the DSCH-blocks can be determined as the duration of slots containing the actually transmitted SS/PBCH blocks as well as the associated RMSI/OSI/Paging, wherein the indication of actually transmission can be in ssb-PositionsInBurst in RMSI and/or ssb-PositionsInBurst in RRC.

For instance, when regulation for Cat2 LBT is satisfied (e.g. time-domain overhead equal to or smaller than 5%), and the transmission duration of all the DSCH-blocks can be limited within 1 ms, one-shot LBT (e.g. Cat2 LBT in LAA) can be utilized before the transmission of all the DSCH-blocks; otherwise (e.g. time-domain overhead larger than 5%), if the transmission duration of all the DSCH-blocks can be limited within 2 ms, up to Cat4 LBT with channel access priority class 1 (e.g. Cat4 LBT with p=1 in LAA) can be utilized before the transmission of all the DSCH-blocks, if the transmission duration of all the DSCH-blocks can be limited within 3 ms, up to Cat4 LBT with channel access priority class 2 (e.g. Cat4 LBT with p=2 in LAA) can be utilized before the transmission of all the DSCH-blocks; if the transmission duration of all the DSCH-blocks can be limited within 8 ms, up to Cat4 LBT with channel access priority class 3 or 4 (e.g. Cat4 LBT with p=3 or 4 in LAA) can be utilized before the transmission of all the DSCH-blocks.

In one embodiment, the transmission of DSCH-blocks can be confined within N sub-DSCH-windows. For one example, as shown in FIG. 18, for DSCH-block composition, the group offset O can be configured as the same as the transmission duration of SS/PBCH blocks in the same sub-DSCH-window, such that the transmission of RMSI/OSI/Paging can start right after the end of transmission of SS/PBCH blocks in the same sub-DSCH-window. For another example, for DSCH-block composition, the group offset O can be configured as the same as the transmission duration of SS/PBCH blocks and CORESETs of RMSI/OSI/Paging in the same sub-DSCH-window, such that the transmission of PDSCHs of RMSI/OSI/Paging can start right after the end of transmission of SS/PBCH blocks and CORESETs of RMSI/OSI/Paging in the same sub-DSCH-window.

In one embodiment, the LBT associated to the transmission of the DSCH-blocks can be using a matched one with the transmission duration of the DSCH-blocks within a sub-DSCH-window, subject to regulation at the same time (e.g. Cat2 LBT can be utilized only for time-domain overhead equal to or smaller than 5%).

In one example, the transmission duration of the DSCH-blocks within a sub-DSCH-window can be determined as the duration of slots containing the potentially transmitted SS/PBCH blocks as well as the associated RMSI/OSI/Paging within the sub-DSCH-window. In another example, the transmission duration of the DSCH-blocks within a sub-DSCH-window can be determined as the duration of slots containing the actually transmitted SS/PBCH blocks as well as the associated RMSI/OSI/Paging within the sub-DSCH-window, wherein the indication of actually transmission can be in ssb-PositionsInBurst in RMSI and/or ssb-PositionsInBurst in RRC.

For instance, when regulation for Cat2 LBT is satisfied (e.g. time-domain overhead equal to or smaller than 5%), and the transmission duration of the DSCH-blocks within a sub-DSCH-window can be limited within 1 ms, one-shot LBT (e.g. Cat2 LBT in LAA) can be utilized before the transmission of the DSCH-blocks; otherwise (e.g. time-domain overhead larger than 5%), if the transmission duration of the DSCH-blocks within a sub-DSCH-window can be limited within 2 ms, LBT with channel access priority class 1 (e.g. Cat4 LBT with p=1 in LAA) can be utilized before the transmission of the DSCH-blocks; if the transmission duration of the DSCH-blocks within a sub-DSCH-window can be limited within 3 ms, up to Cat4 LBT with channel access priority class 2 (e.g. Cat4 LBT with p=2 in LAA) can be utilized before the transmission of the DSCH-blocks; if the transmission duration of the DSCH-blocks within a sub-DSCH-window can be limited within 8 ms, LBT with channel access priority class 3 or 4 (e.g. Cat4 LBT with p=3 or 4 in LAA) can be utilized before the transmission of the DSCH-blocks.

In one example, the gNB can configure the LBT and corresponding transmission duration, such that the transmission of SS/PBCH blocks can be confined within a configurable number of sub-DSCH-windows (i.e., N is configurable).

In another example, the gNB can configure the LBT and corresponding transmission duration, such that the transmission of SS/PBCH blocks can be confined within a configurable number of sub-DSCH-windows (i.e., N is configurable), and the length of each sub-DSCH-window is also configurable.

In one embodiment, it is assumed a scenario where the a DSCH-block has single block in time domain. For example, the applicable scenarios include DSCH-block composition (e.g. SS/PBCH blocks and CORESET of RMSI/OSI/Paging are multiplexed using Pattern 1 with group offset O=0, and the time domain resource allocation of PDSCH of RMSI/OSI/Paging is within the same slot as the corresponding PDCCH of RMSI/OSI/Paging), DSCH-block composition (e.g. SS/PBCH blocks and CORESET of RMSI/OSI/Paging are multiplexed using Pattern 2 or Pattern 3), and DSCH-block composition (e.g. SS/PBCH blocks and CORESET/

PDSCH of RMSI/OSI/Paging are multiplexed within the same mini-slot), in the aforementioned embodiments.

Figure 19A:
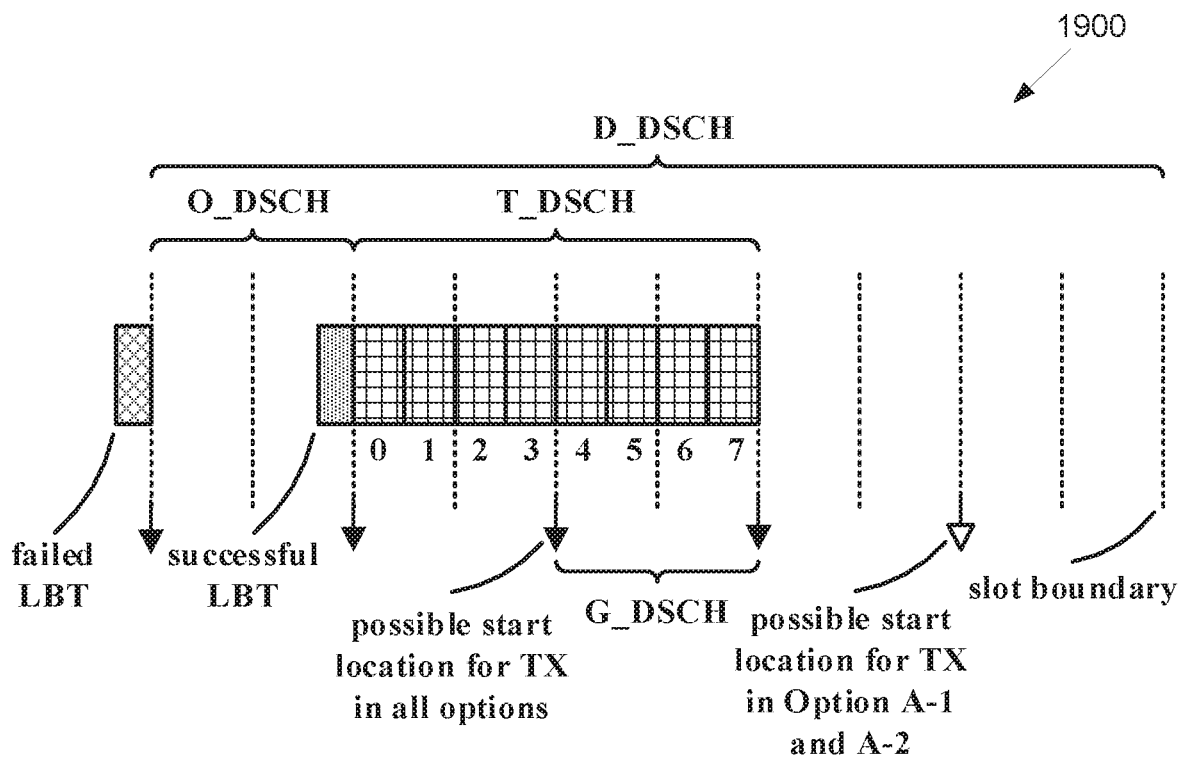
FIG. 19A illustrates an example transmission of DSCH-blocks subject to LBT according to embodiments of the present disclosure.

FIG. 19A illustrates an example transmission of DSCH-blocks subject to LBT 1900 according to embodiments of the present disclosure. The embodiment of the transmission of DSCH-block subject to LBT 1900 illustrated in FIG. 19A is for illustration only. FIG. 19A does not limit the scope of this disclosure to any particular implementation.

Figure 19B:
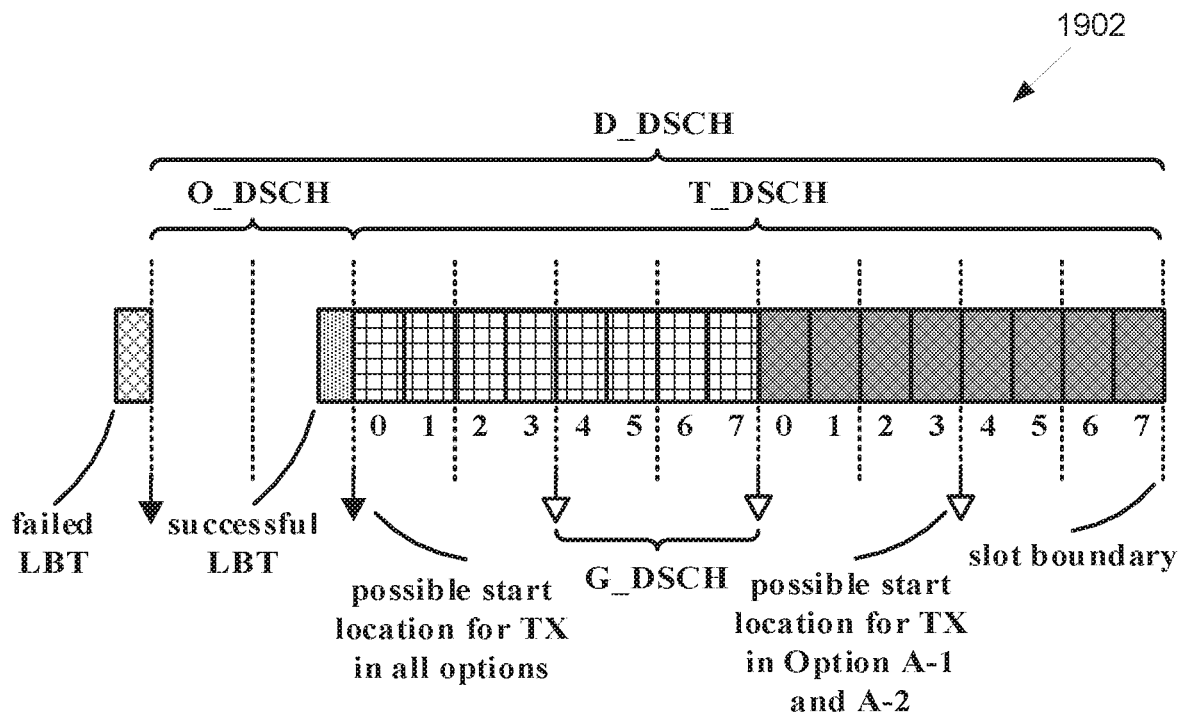
FIG. 19B illustrates another example transmission of DSCH-blocks subject to LBT according to embodiments of the present disclosure.

FIG. 19B illustrates another example transmission of DSCH-blocks subject to LBT 1902 according to embodiments of the present disclosure. The embodiment of the transmission of DSCH-blocks subject to LBT 1902 illustrated in FIG. 19B is for illustration only. FIG. 19B does not limit the scope of this disclosure to any particular implementation.

In one embodiment, the transmission of all the sub-DSCH-blocks can be confined within a single DSCH-window. For one example, an illustration of the example is shown in FIG. 19A.

In one embodiment, the LBT associated to the transmission of all the DSCH-blocks can be using a matched one with the transmission duration of all the DSCH-blocks, subject to regulation at the same time (e.g. Cat2 LBT can be utilized only for time-domain overhead equal to or smaller than 5%)

In one example, the transmission duration of all the DSCH-blocks can be determined as the duration of slots containing the potentially transmitted L SS/PBCH blocks as well as the associated RMSI/OSI/Paging, where L is the maximum number of SS/PBCH blocks within a burst set. In another example, the transmission duration of all the DSCH-blocks can be determined as the duration of slots containing the actually transmitted SS/PBCH blocks as well as the associated RMSI/OSI/Paging, wherein the indication of actually transmission can be in ssb-PositionsInBurst in RMSI and/or ssb-PositionsInBurst in RRC.

For instance, when regulation for Cat2 LBT is satisfied (e.g. time-domain overhead equal to or smaller than 5%), and if the transmission duration of all the DSCH-blocks can be limited within 1 ms, one-shot LBT (e.g. Cat2 LBT in LAA) can be utilized before the transmission of all the DSCH-blocks; otherwise (e.g. time-domain overhead larger than 5%), if the transmission duration of all the DSCH-blocks can be limited within 2 ms, up to Cat4 LBT with channel access priority class 1 (e.g. Cat4 LBT with p=1 in LAA) can be utilized before the transmission of all the DSCH-blocks; if the transmission duration of all the DSCH-blocks can be limited within 3 ms, up to Cat4 LBT with channel access priority class 2 (e.g. Cat4 LBT with p=2 in LAA) can be utilized before the transmission of all the DSCH-blocks; if the transmission duration of all the DSCH-blocks can be limited within 8 ms, up to Cat4 LBT with channel access priority class 3 or 4 (e.g. Cat4 LBT with p=3 or 4 in LAA) can be utilized before the transmission of all the DSCH-blocks.

In one embodiment, the transmission of DSCH-blocks can be confined within N sub-DSCH-windows. For one example, an illustration of the example is shown in FIG. 19B.

In one embodiment, the LBT associated to the transmission of the DSCH-blocks within a sub-DSCH-window can be using a matched one with the transmission duration of the DSCH-blocks within the sub-DSCH-window, subject to regulation at the same time (e.g. Cat2 LBT can be utilized only for time-domain overhead equal to or smaller than 5%).

In one example, the transmission duration of the DSCH-blocks within a sub-DSCH-window can be determined as the duration of slots containing the potentially transmitted SS/PBCH blocks as well as the associated RMSI/OSI/Paging within the sub-DSCH-window. In another example, the transmission duration of the DSCH-blocks within a sub-DSCH-window can be determined as the duration of slots containing the actually transmitted SS/PBCH blocks as well as the associated RMSI/OSI/Paging within the sub-DSCH-window, wherein the indication of actually transmission can be in ssb-PositionsInBurst in RMSI and/or ssb-PositionsInBurst in RRC.

For instance, when regulation for Cat2 LBT is satisfied (e.g. time-domain overhead equal to or smaller than 5%), and if the transmission duration of the DSCH-blocks within a sub-DSCH-window can be limited within 1 ms, one-shot LBT (e.g. Cat2 LBT in LAA) can be utilized before the transmission of the DSCH-blocks; otherwise (e.g. time-domain overhead larger than 5%), if the transmission duration of the DSCH-blocks within a sub-DSCH-window can be limited within 2 ms, up to Cat4 LBT with channel access priority class 1 (e.g. Cat4 LBT with p=1 in LAA) can be utilized before the transmission of the DSCH-blocks; if the transmission duration of the DSCH-blocks within a sub-DSCH-window can be limited within 3 ms, up to Cat4 LBT with channel access priority class 2 (e.g. Cat4 LBT with p=2 in LAA) can be utilized before the transmission of the DSCH-blocks, if the transmission duration of the DSCH-blocks within a sub-DSCH-window can be limited within 8 ms, up to Cat4 LBT with channel access priority class 3 or 4 (e.g. Cat4 LBT with p=3 or 4 in LAA) can be utilized before the transmission of the DSCH-blocks.

In one embodiment, the gNB can configure the LBT and corresponding transmission duration, such that the transmission of SS/PBCH blocks can be confined within a configurable number of sub-DSCH-windows (i.e., N is configurable).

In another example, the gNB can configure the LBT and corresponding transmission duration, such that the transmission of SS/PBCH blocks can be confined within a configurable number of sub-DSCH-windows (i.e., N is configurable), and the length of each sub-DSCH-window is also configurable.

The DSCH-burst-set transmission can be initialized by an associated LBT, and the failure of LBT can cause delay and/or truncation to the DSCH-burst set transmission. Options for the transmission of the DSCH-burst-set or part of the DSCH-burst-set confined in the DSCH-window are defined. For example, the transmission options focus on K DSCH-blocks, where K is no larger than L and K equals L if all possible DSCH-blocks are considered in a DSCH-window.

Denote the transmission duration of DSCH-burst set or part of the DSCH-burst set is confined in the DSCH-window or sub-DSCH-window (e.g. K DSCH-blocks) as T_DSCH. Denote the granularity for the possible starting location of the transmission of K DSCH-blocks as G_DSCH, wherein there can be multiple possible opportunities for the starting location of the transmission of the K DSCH-blocks within the DSCH-window or sub-DSCH-window (such as whether the transmission starts or not can be subject to LBT), and the interval among the opportunities is denoted as G_DSCH. Denote the duration of the DSCH-window or sub-DSCH-window as D_DSCH (note that in one example, the possible location of LBT can be outside the DSCH-window or sub-DSCH-window). Denote the offset between the start of the actual transmission of K DSCH-blocks and the starting location of the DSCH-window or sub-DSCH-window as O_DSCH, wherein the start of the actual transmission of K DSCH-blocks may be aligned with one of the predefined starting locations within the DSCH-window or sub-DSCH-window.

At least one of the following options on DSCH-burst-set transmission to address the LBT impact can be assumed at the UE side. Note that multiple options can be supported at the same time, e.g. different option can be adopted for a given carrier frequency range, or the options can be configured by higher layer.

In one embodiment of A, a UE assumes the transmission of the K DSCH-blocks are delayed by O_DSCH from the starting of the DSCH-window or the sub-DSCH-window containing the K DSCH-blocks due to LBT, and the DSCH-blocks are ordered from 0 to K−1 in an increasing order in time domain. Upon reception of the DSCH-block, the UE can determine the SS/PBCH block index from the DSCH-block (e.g. DMRS and potentially PBCH content). If O_DSCH is signaled to UE by DSCH-block (e.g. in RMSI if RMSI is multiplexed within the DSCH-block or in PBCH content or in DMRS of PBCH or in synchronization signals), the UE can use the SS/PBCH block index together with O_DSCH to infer the timing information such as the half frame boundary. The UE can assume that the SS/PBCH blocks with same SS/PBCH block index (e.g. across burst set) are QCLed.

In one sub-embodiment of A (i.e., Option A-1), O_DSCH can be chosen as all possible values with interval G_DSCH within the DSCH-window or the sub-DSCH-window containing the K DSCH-blocks, such that O_DSCH+T_DSCH>D_DSCH is possible for some of the O_DSCH values (i.e., the DSCH-blocks supposed to be transmitted can exceed the ending of DSCH-window or sub-DSCH-window), and the UE assumes the DSCH-blocks exceeding the end of the DSCH-window or sub-DSCH-window are not transmitted (i.e., the DSCH-blocks supposed to be transmitted outside the DSCH-window or sub-DSCH-window are truncated).

In another sub-embodiment of A (i.e., Option A-2), O_DSCH can be chosen as all possible values with interval G_DSCH within the DSCH-window or the sub-DSCH-window containing the K DSCH-blocks, such that O_DSCH+T_DSCH>D_DSCH is possible for some of the O_DSCH values (i.e., the DSCH-blocks supposed to be transmitted can exceed the ending of DSCH-window or sub-DSCH-window), and a UE assumes the DSCH-blocks exceeding the end of the DSCH-window or sub-DSCH-window are still transmitted (i.e., the DSCH-blocks supposed to be transmitted outside the DSCH-window or sub-DSCH-window are actually transmitted outside the DSCH-window or sub-DSCH-window).

In yet another sub-embodiment of A (i.e., Option A-3), O_DSCH can be chosen as all possible values with interval G_DSCH within the DSCH-window or sub-DSCH-window with the restriction that O_DSCH+T_DSCH≤D_DSCH (i.e., the DSCH-blocks supposed to be transmitted cannot exceed the DSCH-window or sub-DSCH-window). For example, the last predefined starting location within the DSCH-window or sub-DSCH-window is given by D_DSCH−T_DSCH from the starting of the DSCH-window or sub-DSCH-window.

In one example, when the embodiment A is utilized or configured, O_DSCH can be indicated to the UE for determining the timing information such as half frame boundary using signal(s)/channel(s) in the DSCH-block, and O_DSCH can be indicated in the granularity of G_DSCH. In one example, the number of bits required to indicate O_DSCH can be determined by $\lceil \log 2(\min(D\_DSCH, 5 \text{ ms})/G\_DSCH)\rceil$ for sub-embodiment of A-1 and sub-embodiment of A-2, and the number of bits required to indicate O_DSCH can be determined by $\lceil \log 2(\min(D\_DSCH-T\_DSCH+G\_DSCH, 5 \text{ ms})/G\_DSCH)\rceil$ for sub-embodiment of A-3.

FIG. 19A illustrates an example for Option A with D_DSCH=5 ms (e.g. half frame), T_DSCH=2 ms with 8 DSCH-blocks transmitted, and G_DSCH=1 ms (e.g. 2 slots in SS SCS of 30 kHz). In FIG. 19A, 4 possible start locations for the transmission of DSCH-blocks are defined for Option A-3, and 5 possible start locations for the transmission of DSCH-blocks are defined for Option A-1 and Option A-2. A UE assumes the DSCH-blocks are in the order of {0, 1, 2, 3, 4, 5, 6, 7} with a starting offset as O_DSCH comparing to the start of the DSCH-window or sub-DSCH-window (e.g. half frame).

In another example of Option A, when a DSCH-block contains multiple sub-blocks (e.g. DSCH-block Composition aforementioned embodiments) and the sub-blocks are transmitted in the same DSCH-window or sub-DSCH-window, all the sub-blocks are shifted together due to the LBT in the same DSCH-window or sub-DSCH-window in Option A. FIG. 19B gives an illustration of this example with 2 sub-blocks.

In one embodiment of Option B, a UE assumes the transmission of the K DSCH-blocks are delayed by O_DSCH from the starting of the DSCH-window or sub-DSCH-window due to LBT, and the SS/PBCH block index of the starting DSCH-block, i.e., S_DSCH, depends on O_DSCH (i.e., may not always be 0 to K−1 in an increasing order in time domain) and the DSCH-blocks with SS/PBCH block index 0 to S_DSCH-1 (if S_DSCH is not 0) are wrapped around to the end of the K-S_DSCH DSCH-blocks. Upon reception of the DSCH-block, UE can determine the SS/PBCH block index from the DSCH-block (e.g. DMRS and potentially PBCH content). If O_DSCH is signaled to UE by DSCH-block (e.g. in RMSI if RMSI is multiplexed within the DSCH-block or in PBCH content or in DMRS of PBCH or in synchronization signals), UE can use the SS/PBCH block index together with O_DSCH to infer the timing information such as the half frame boundary. UE can assume that the SS/PBCH blocks with same SS/PBCH block index (e.g. across burst set) are QCLed.

In one embodiment, the relationship between S_DSCH and O_DSCH can be determined as follows: within D_DSCH, there is a predefined SS/PBCH block index sequence which consists of 0 to K−1 repeated and periodically wrapped around, wherein this sequence can be determined by a module of K from the potential SS/PBCH block location indices within the D_DSCH, e.g. 0, 1, . . . K−1, 0, 1, . . . , K−1, . . . , wherein the length of the sequence corresponds to the maximum possible DSCH-blocks can fit within the DSCH-window or sub-DSCH-window. For instance, the mapping between possible SS/PBCH block location within the DSCH-window i_Location and SS/PBCH block index i_SSB is given by i_SSB=i_Location mod K. S_DSCH is the first value in the sequence that exceeding the timing location corresponding to the offset O_DSCH.

In one example, for a sub7 GHz unlicensed band, assuming the maximum number of SS/PBCH blocks is 8 (e.g. 1 ms has 4 DSCH-blocks using 30 kHz SS SCS), and the interval between the neighboring starting location of transmission is G_DSCH=2 ms, and offset to actual starting location of transmission is O_DSCH ms, then S_DSCH=0 always (no wrap-around), and the DSCH-blocks are with SS/PBCH block indices in the order of {0, 1, 2, 3, 4, 5, 6, 7} always.

In another example, for a sub7 GHz unlicensed band, assuming the maximum number of SS/PBCH blocks is 4 (e.g. 1 ms has 4 DSCH-blocks using 30 kHz SS SCS), and the interval between the neighboring starting location of transmission is G_DSCH=1 ms, and offset to actual starting location of transmission is O_DSCH ms, then S_DSCH=0, and the DSCH-blocks are with SS/PBCH block indices in the order of {0, 1, 2, 3}.

In yet another example, for a sub7 GHz unlicensed band, assuming the maximum number of SS/PBCH blocks is 8 (e.g. 1 ms has 4 DSCH-blocks using 30 kHz SS SCS), and the interval between the neighboring starting location of transmission is G_DSCH=1 ms, and offset to actual starting location of transmission is O_DSCH ms, then S_DSCH=4* (O_DSCH mod 2), and the DSCH-blocks are with SS/PBCH block indices in the order of {0, 1, 2, 3, 4, 5, 6, 7} if O_DSCH mod 2=0 and {4, 5, 6, 7, 0, 1, 2, 3} if O_DSCH mod 2=1.

In yet another example, for a sub7 GHz unlicensed band, assuming the maximum number of SS/PBCH blocks is 4 (e.g. 1 ms has 4 DSCH-blocks using 30 kHz SS SCS), and the interval between the neighboring starting location of transmission is G_DSCH=1 slot (e.g. 0.5 ms if using 30 kHz SCS), and offset to actual starting location of transmission is O_DSCH slot, then S_DSCH=2*(O_DSCH mod 2), and the DSCH-blocks are with SS/PBCH block indices in the order of {0, 1, 2, 3} if O_DSCH mod 2=0 and {2, 3, 0, 1} if O_DSCH mod 2=1.

In yet another example, for a sub7 GHz unlicensed band, assuming the maximum number of SS/PBCH blocks is 8 (e.g. 1 ms has 4 DSCH-blocks using 30 kHz SS SCS), and the interval between the neighboring starting location of transmission is G_DSCH=1 slot (e.g. 0.5 ms if using 30 kHz SCS), and offset to actual starting location of transmission is O_DSCH slot, then S_DSCH=2*(O_DSCH mod 4), and the DSCH-blocks are with SS/PBCH block indices in the order of {0, 1, 2, 3, 4, 5, 6, 7} if O_DSCH mod 4=0, and {2, 3, 4, 5, 6, 7, 0, 1} if O_DSCH mod 4=1, and {4, 5, 6, 7, 0, 1, 2, 3} if O_DSCH mod 4=2, and {6, 7, 0, 1, 2, 3, 4, 5} if O_DSCH mod 4=3.

In yet another example, for a sub7 GHz unlicensed band, assuming the maximum number of SS/PBCH blocks is 4 (e.g. 1 ms has 4 DSCH-blocks using 30 kHz SS SCS), and the interval between the neighboring starting location of transmission is G_DSCH=0.5 slot (e.g. 1 DSCH-block), and offset to actual starting location of transmission is O_DSCH slot, then S_DSCH=O_DSCH mod 4, and the DSCH-blocks are with SS/PBCH block indices in the order of {0, 1, 2, 3} if O_DSCH mod 4=0, and {1, 2, 3, 0} if O_DSCH mod 4=1, and {2, 3, 0, 1} if O_DSCH mod 4=2, and {3, 0, 1, 2} if O_DSCH mod 4=3.

In yet another, for a sub7 GHz unlicensed band, assuming the maximum number of SS/PBCH blocks is 8 (e.g. 1 ms has 4 DSCH-blocks using 30 kHz SS SCS), and the interval between the neighboring starting location of transmission is G_DSCH=0.5 slot (e.g. 1 DSCH-block), and offset to actual starting location of transmission is O_DSCH slot, then S_DSCH=O_DSCH mod 8, and the DSCH-blocks are with SS/PBCH block indices in the order of {0, 1, 2, 3, 4, 5, 6, 7} if O_DSCH mod 8=0, and {1, 2, 3, 4, 5, 6, 7, 1} if O_DSCH mod 8=1, and {2, 3, 4, 5, 6, 7, 0, 1} if O_DSCH mod 8=2, and {3, 4, 5, 6, 7, 0, 1, 2} if O_DSCH mod 8=3, and {4, 5, 6, 7, 0, 1, 2, 3} if O_DSCH mod 8=4, and {5, 6, 7, 0, 1, 2, 3, 4} if O_DSCH mod 8=5, and {6, 7, 0, 1, 2, 3, 4, 5} if O_DSCH mod 8=6, and {7, 0, 1, 2, 3, 4, 5, 6} if O_DSCH mod 8=7.

In one sub-embodiment of Option B (i.e., Option B-1), O_DSCH can be chosen as all possible values with interval G_DSCH within the DSCH-window or sub-DSCH-window such that O_DSCH+T_DSCH>D_DSCH is possible for some of the values (i.e., the DSCH-blocks supposed to be transmitted can exceed the DSCH-window or sub-DSCH-window), and a UE assumes the DSCH-blocks exceeding the end of the DSCH-window or sub-DSCH-window are not transmitted (i.e., the DSCH-blocks supposed to be transmitted outside the DSCH-window or sub-DSCH-window are truncated).

In another sub-embodiment of Option B (i.e., Option B-2), O_DSCH can be chosen as all possible values with interval G_DSCH within the DSCH-window or sub-DSCH-window such that O_DSCH+T_DSCH>D_DSCH is possible for some of the values (i.e., the DSCH-blocks supposed to be transmitted can exceed the DSCH-window or sub-DSCH-window), and a UE assumes the DSCH-blocks exceeding the end of the DSCH-window or sub-DSCH-window are still transmitted (i.e., the DSCH-blocks supposed to be transmitted outside the DSCH-window are transmitted outside the DSCH-window or sub-DSCH-window).

In yet another sub-embodiment of Option B (i.e., Option B-3), O_DSCH can be chosen as all possible values with interval G_DSCH within the DSCH-window or sub-DSCH-window with the restriction that O_DSCH+T_DSCH≤D_DSCH (i.e., the DSCH-blocks supposed to be transmitted cannot exceed the DSCH-window or sub-DSCH-window). For example, the last predefined starting location within the DSCH-window or sub-DSCH-window is given by D_DSCH−T_DSCH from the starting of the DSCH-window or sub-DSCH-window.

Figure 20A:
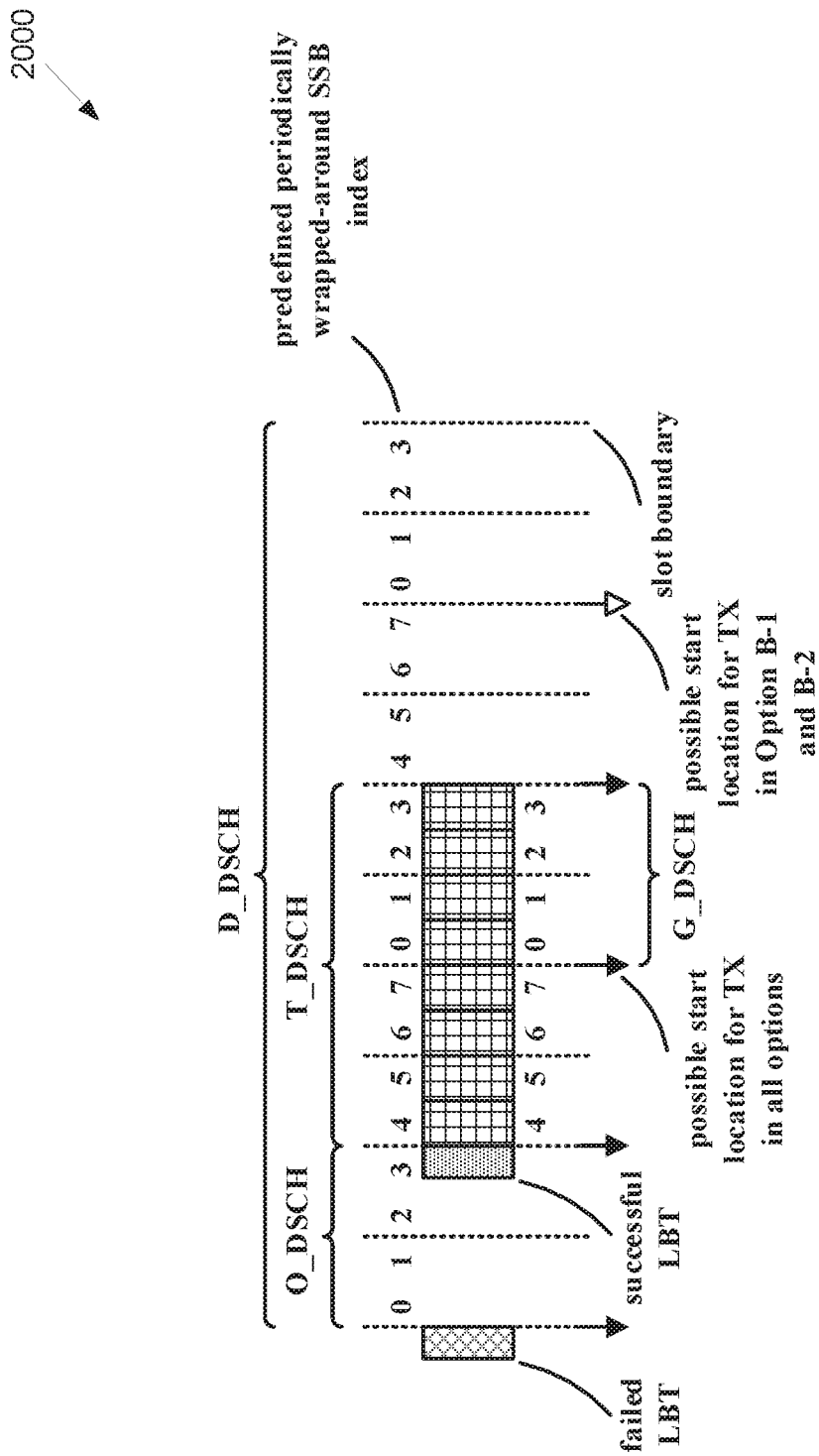
FIG. 20A illustrates yet another example transmission of DSCH-blocks subject to LBT according to embodiments of the present disclosure.

FIG. 20A illustrates yet another example transmission of DSCH-blocks subject to LBT 2000 according to embodiments of the present disclosure. The embodiment of the transmission of DSCH-blocks subject to LBT 2000 illustrated in FIG. 20A is for illustration only. FIG. 20A does not limit the scope of this disclosure to any particular implementation.

Figure 20B:
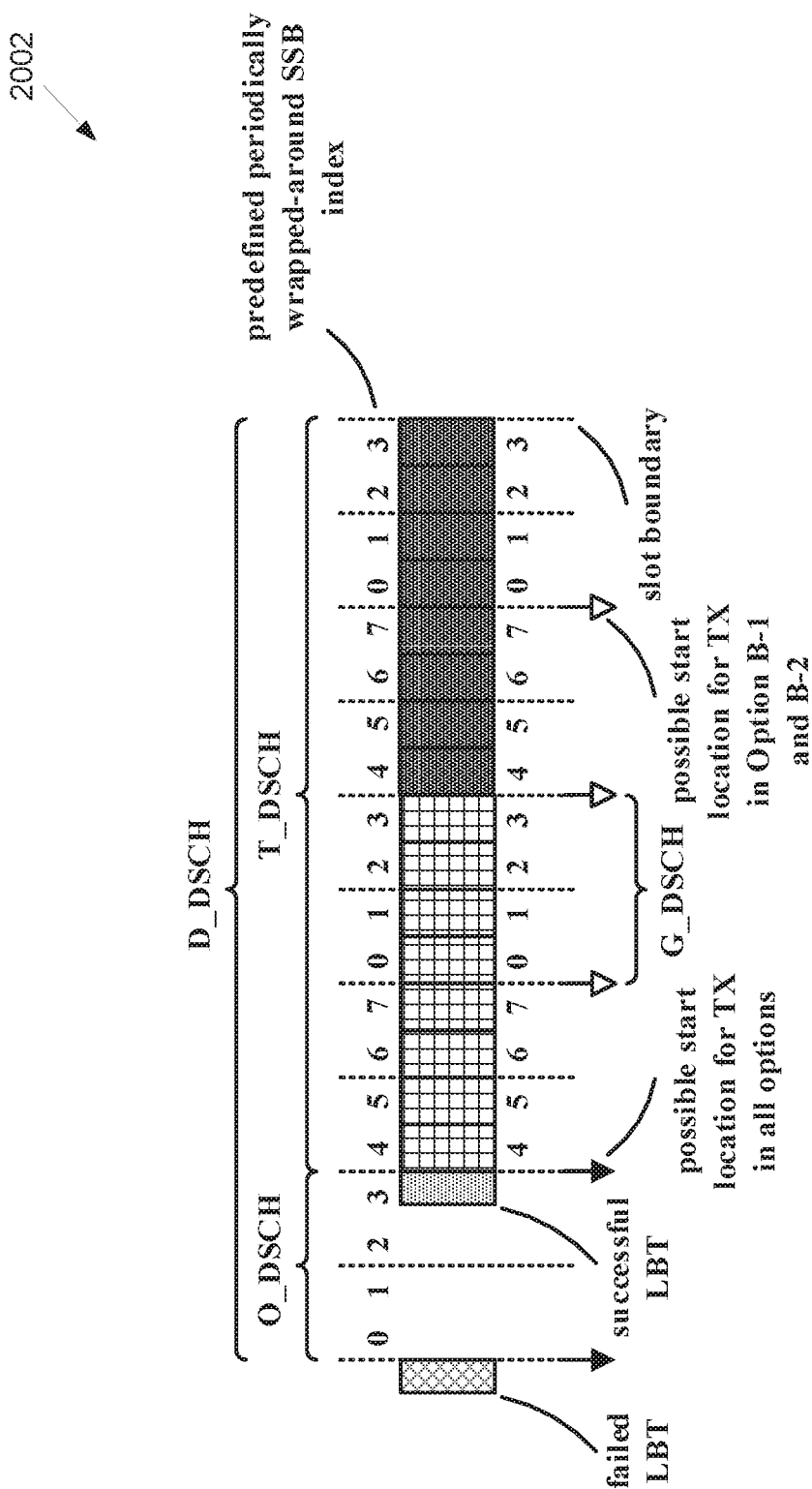
FIG. 20B illustrates yet another example transmission of DSCH-blocks subject to LBT according to embodiments of the present disclosure.

FIG. 20B illustrates yet another example transmission of DSCH-blocks subject to LBT2002 according to embodiments of the present disclosure. The embodiment of the transmission of DSCH-blocks subject to LBT 2002 illustrated in FIG. 20B is for illustration only. FIG. 20B does not limit the scope of this disclosure to any particular implementation.

FIG. 20A illustrates an example for Option B with D_DSCH=5 ms (e.g. half frame), T_DSCH=2 ms with 8 DSCH-blocks transmitted, and G_DSCH=1 ms (e.g. 2 slots in SS SCS of 30 kHz). In FIG. 20B, 4 possible start locations for the transmission of DSCH-blocks are defined for Option B-3, and 5 possible start locations for the transmission of DSCH-blocks are defined for Option B-1 and Option B-2. A UE assumes the DSCH-blocks are in the order of {0, 1, 2, 3, 4, 5, 6, 7} with a starting offset as O_DSCH comparing to the start of the DSCH-window or sub-DSCH-window (e.g. half frame), if O_DSCH is 0, or 2 ms; and in the order of {4, 5, 6, 7, 0, 1, 2, 3} with a starting offset as O_DSCH comparing to the start of the DSCH-window (e.g. half frame), if O_DSCH is 1, or 3 ms.

In one example, when Option B is utilized or configured, O_DSCH can be indicated to the UE for determining the timing of half frame using signal(s)/channel(s) in the DSCH-block, and O_DSCH can be indicated in the granularity of T_DSCH. In one example, the number of bits required to indicate O_DSCH can be determined by ⌈log 2(min(D-

_DSCH, 5 ms)/T_DSCH)⌉ for Option B-1 and Option B-2, and the number of bits required to indicate O_DSCH can be determined by ⌈log 2(min(D_DSCH−T_DSCH+G_DSCH, 5 ms)/T_DSCH)⌉ for Option B-3. In another example, the number of bits required to indicate O_DSCH can be determined by ⌈log 2(D_DSCH/T_DSCH)⌉ for Option B-1 and Option B-2, and the number of bits required to indicate O_DSCH can be determined by ⌈log 2((D_DSCH−T_DSCH+G_DSCH)/T_DSCH)⌉ for Option B-3.

In another example of Option B, when a DSCH-block contains multiple sub-blocks (e.g. DSCH-block composition aforementioned embodiments) and the sub-blocks are transmitted in the same DSCH-window or sub-DSCH-window, the sub-blocks are periodically wrapped-around using the same pattern in the same DSCH-window or sub-DSCH-window, such that the timing offset between sub-DSCH-blocks corresponding to the same SS/PBCH block index (e.g. assumed as QCLed) keeps the same. FIG. 20B gives an illustration of this example with 2 sub-blocks.

In one embodiment of Option C, a UE assumes the transmission of the K DSCH-blocks are delayed by O_DSCH from the starting of the DSCH-window or sub-DSCH-window due to LBT, and the SS/PBCH block index of the starting DSCH-block, i.e., S_DSCH, depends on O_DSCH (i.e., may not always be 0 to K−1 in an increasing order in time domain) and SS/PBCH block index of the DSCH-blocks is S_DSCH to S_DSCH+K−1. Upon reception of the DSCH-block, UE can determine the SS/PBCH block index as well as half frame boundary from the DSCH-block (e.g. DMRS and potentially PBCH content), e.g. even without knowing O_DSCH (O_DSCH may not be needed to be indicated).

In one example, the relationship between S_DSCH and O_DSCH can be determined as follows: within D_DSCH, there is a default SS/PBCH block index sequence 0, 1, . . . , wherein the length of the sequence corresponds to the maximum possible DSCH-blocks can fit within the min of DSCH-window and 5 ms. S_DSCH is the first value in the sequence that exceeding the offset O_DSCH.

In one sub-embodiment of Option C (i.e., Option C-1), O_DSCH can be chosen as all possible values with interval G_DSCH within the DSCH-window or sub-DSCH-window such that O_DSCH+T_DSCH>D_DSCH is possible for some of the values (i.e., the DSCH-blocks supposed to be transmitted can exceed the DSCH-window or sub-DSCH-window), and UE assumes the DSCH-blocks exceeding the end of the DSCH-window are not transmitted (i.e., the DSCH-blocks supposed to be transmitted outside the DSCH-window or sub-DSCH-window are truncated).

In another sub-embodiment of Option C (i.e., Option C-2), O_DSCH can be chosen as all possible values with interval G_DSCH within the DSCH-window or sub-DSCH-window such that O_DSCH+T_DSCH>D_DSCH is possible for some of the values (i.e., the DSCH-blocks supposed to be transmitted can exceed the DSCH-window or sub-DSCH-window), and UE assumes the DSCH-blocks exceeding the end of the DSCH-window are still transmitted (i.e., the DSCH-blocks supposed to be transmitted outside the DSCH-window are transmitted outside the DSCH-window or sub-DSCH-window).

In yet another sub-embodiment of Option C (i.e., Option C-3), O_DSCH can be chosen as all possible values with interval G_DSCH within the DSCH-window or sub-DSCH-window with the restriction that O_DSCH+T_DSCH≤D_DSCH (i.e., the DSCH-blocks supposed to be transmitted cannot exceed the DSCH-window or sub-DSCH-window). For example, the last predefined starting location within the DSCH-window is given by D_DSCH−T_DSCH from the starting of the DSCH-window or sub-DSCH-window.

Figure 21A:
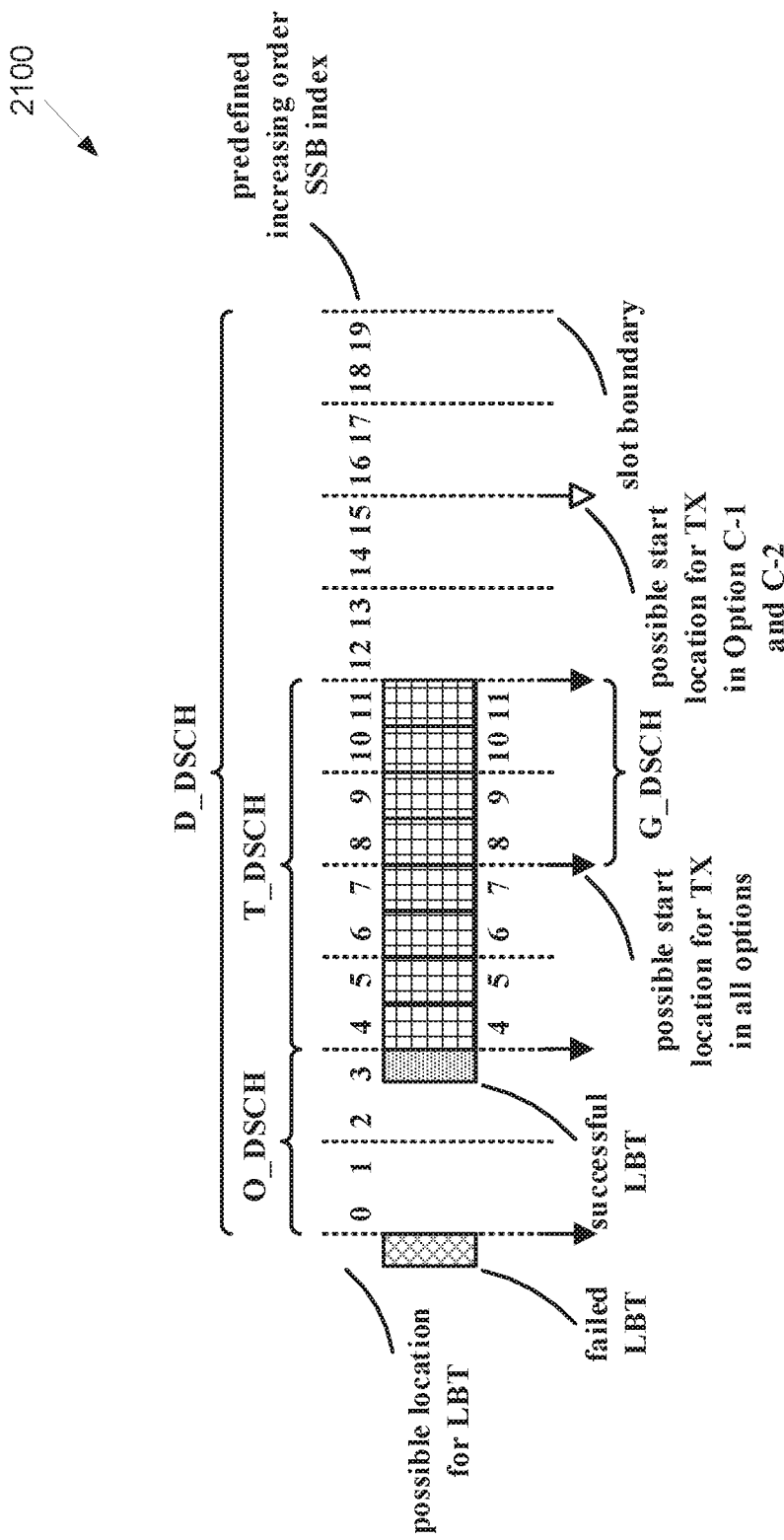
FIG. 21A illustrates yet another example transmission of DSCH-blocks subject to LBT according to embodiments of the present disclosure.

FIG. 21A illustrates yet another example transmission of DSCH-blocks subject to LBT 2100 according to embodiments of the present disclosure. The embodiment of the transmission of DSCH-blocks subject to LBT 2100 illustrated in FIG. 21A is for illustration only. FIG. 21A does not limit the scope of this disclosure to any particular implementation.

Figure 21B:
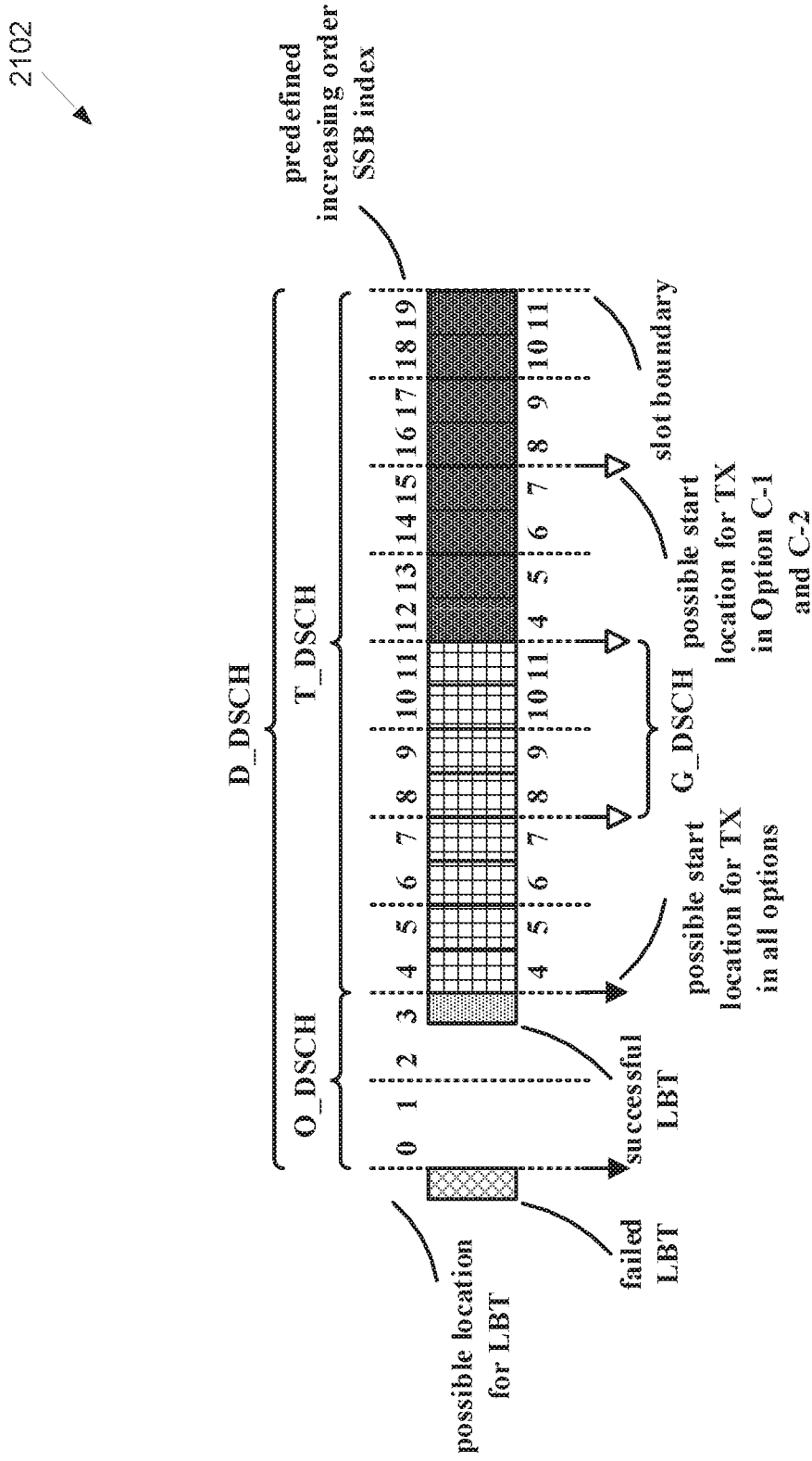
FIG. 21B illustrates yet another example transmission of DSCH-blocks subject to LBT according to embodiments of the present disclosure.

FIG. 21B illustrates yet another example transmission of DSCH-blocks subject to LBT 2102 according to embodiments of the present disclosure. The embodiment of the transmission of DSCH-blocks subject to LBT 2102 illustrated in FIG. 21B is for illustration only. FIG. 21B does not limit the scope of this disclosure to any particular implementation.

In one example of Option C is illustrated in FIG. 21A. In another example of Option C, when a DSCH-block contains multiple sub-blocks (e.g. DSCH-block composition aforementioned embodiments) and the sub-blocks are transmitted in the same DSCH-window or sub-DSCH-window, the QCLed sub-blocks are using SS/PBCH block index the in the same DSCH-window or sub-DSCH-window, such that the timing offset between sub-DSCH-blocks corresponding to the same SS/PBCH block index (e.g. assumed as QCLed) keeps the same. FIG. 21B gives an illustration of this example with 2 sub-blocks.

In one embodiment, for any of the above three options, if D_DSCH>O_DSCH+T_DSCH (e.g. there can still be slots left after the transmission of DSCH-blocks), the UE can assume the remaining slots can be transmitted for other signal/channels within the DSCH-window or sub-DSCH-window.

In one example, the UE can assume the DSCH-blocks can be further repeated within the DSCH-window or sub-DSCH-window until the end of the DSCH-window. In one example, the repeated DSCH-blocks can use different SS/PBCH block indices. In another example, the repeated DSCH-blocks can use the same SS/PBCH block indices, but indicate a different offset O_DSCH, where O_DSCH corresponds to the starting location of the repeated DSCH-blocks.

In another example, the UE can assume other broadcast information is transmitted within the DSCH-window or sub-DSCH-window, wherein the broadcast information can be at least one of RMSI, OSI, or paging.

In another embodiment, the same transmission option can be applied to the RMSI-blocks, OSI-blocks, paging-blocks, if any of them are transmitted separately from the SS/PBCH blocks.

For one example, RMSI transmission can have a separate transmission window configuration with periodicity, duration and offset, and the transmission delay and potentially wrapping around can be similar to the options for DSCH-blocks. For another example, broadcast OSI transmission can have a separate transmission window configuration with periodicity, duration and offset, and the transmission delay and potentially wrapping around can be similar to the options for DSCH-blocks.

For yet another example, paging transmission can have a separate transmission window configuration with periodicity, duration and offset, and the transmission delay and potentially wrapping around can be similar to the options for DSCH-blocks.

For NR licensed band, information delivered by SS/PBCH block and RMSI/OSI/Paging includes the time/frequency synchronization, cell ID, symbol timing info, and system information. For NRU, the basic functionality of DSCH-block maintains the same as licensed band, and the particular content of the information and/or delivery method can be same or different from licensed band.

In one embodiment, the number of cell ID for NRU remains the same as the one for NR licensed spectrum, then same number of PSS and SSS sequences can be utilized for NRU. In another embodiment, the number of cell ID for NRU is smaller than the one for NR licensed spectrum (e.g. 504 cell ID as in LTE), then the number of SSS sequences can be smaller than the one for licensed spectrum (e.g. choosing a subset from the SSS sequences and using them for NRU). In yet another embodiment, the number of cell ID for NRU is larger than the one for NR licensed spectrum (e.g. due to an even denser deployment), then the number of PSS and SSS sequences can remain the same, and the remaining cell ID info is carried by NRU-eSSS and/or NRU-PBCH, or the number of SSS sequences increases to carry all the remaining cell ID info other than PSS.

In yet another embodiment, for NR licensed band, SS block index is carried by DMRS of PBCH for <6 GHz and jointly carried by DMRS and content of PBCH for >6 GHz. For NRU, the maximum number of DSCH-block index (same meaning as SS block index for licensed band) can be same or different than the licensed band. For example, for NRU with around 60 GHz carrier frequency ranges, the maximum number of DSCH-block index can be larger than 64.

In one example, the DSCH-block index is carried fully by DMRS of PBCH, since the interference from neighboring cell may not be as strong as the licensed band such that DMRS can be capable of carrying more number of hypotheses.

In another example, the number of DSCH-block indices in DMRS of PBCH maintains the same, and the remaining ones (no matter more or less) are carried by the content of NRU-PBCH.

In yet another embodiment, in NR licensed spectrum, 1 bit in NR-PBCH content is utilized to indicate the numerology of RMSI, OSI, and Paging. E.g. for <6 GHz bands, either 15 kHz or 30 kHz, and for >6 GHz bands, either 60 kHz or 120 kHz. For NRU, the candidate values for the numerology of RMSI/OSI/Paging can be same or different from the licensed band.

In one example, the same configuration is used for NRU. In another embodiment, still 1 bit is utilized to indicate the RMSI/OSI/Paging numerology, but can refer to different values for carrier frequency ranges. E.g. for carrier frequency range A, either 15 kHz or 30 kHz; for carrier frequency range B, either 30 kHz or 60 kHz; for carrier frequency range C, either 60 kHz or 120 kHz; for carrier frequency range D, either 120 kHz or 240 kHz; for carrier frequency range E, either 240 kHz or 480 kHz.

In another example, more than 1 bit is utilized to indicate the RMSI/OSI/Paging numerology. E.g. for <6 GHz NRU bands, either 15 kHz or 30 kHz or 60 kHz; for >6 GHz NRU bands, either 60 kHz or 120 kHz or 240 kHz or 480 kHz.

In yet another embodiment, in NR licensed spectrum, the RB-level frequency offset between CORESET and SS/PBCH block is jointly coded with CORESET BW, number of CORESET symbols, and multiplexing pattern, for each combination of SS and CORESET numerologies. For NRU, if the numerology of SS and/or CORESET is different from licensed band, new configuration table is required for the new combination of SS and CORESET numerologies. The configurations within each table can also be different from licensed band, even the same combination of SS and CORESET numerologies is considered, since the supported CORESET BW, number of symbols, and multiplexing pattern can be different for NRU, and the particular values of the offset can also be different since the min CH BW and sync raster for NRU can be different from licensed band.

For one example, if for a NR unlicensed band, the min CH BW=20 MHz, and SS SCS is determined as 30 kHz. For this band, the SS raster can be defined as 10080 kHz (28 RBs in SS SCS which is an integer multiple of 4 RBs), and the CORESET BW may satisfy the OCB requirement, e.g. initial DL BWP is approximately the CH BW. The analysis of the required RB offset for Pattern 1 is as follow. In one embodiment, only same SCS of SS and RMSI is supported (e.g. both of them are 30 kHz), and one example is shown in TABLE 1. In another embodiment, both same and mixed SCS of SS and RMSI are supported, and one example is shown in TABLE 1 and TABLE 2.

For RMSI SCS=15 kHz, if carrier BW is 20 MHz, which is 51 RBs in SS SCS and 106 in RMSI SCS, and RMSI CORESET BW is 96 RBs, and CH_BW−CORESET BW+1=11 RBs in RMSI SCS, so ⌈SS raster/(CH_BW−CORESET BW+1)⌉=6, i.e., 6 configurations are sufficient to configure the RB-level frequency offset between the edges of SS block and RMSI CORESET, and the possible values can be 0, 11, 22, 33, 44, 55 RBs in term of the RMSI CORESET numerology.

For RMSI SCS=30 kHz, if carrier BW is 20 MHz, which is 51 RBs in SS SCS and RMSI SCS, and RMSI CORESET BW is 48 RBs, and CH_BW−CORESET BW+1=4 RBs in RMSI SCS, so ⌈SS raster/(CH_BW−CORESET BW+1)⌉=7, i.e., 7 configurations are sufficient to configure the RB-level frequency offset between the edges of SS block and RMSI CORESET, and the possible values can be 2, 6, 10, 14, 18, 22, 26 RBs in term of the RMSI CORESET numerology.

TABLE 1

Set of resource blocks and slot symbols of control resource set for Type0-PDCCH search space when {SS/PBCH block, PDCCH} subcarrier spacing is {30, 30} kHz for 5 GHz

| Configuration Index | Multiplexing Pattern | CORESET BW in RB | Number of Symbols for CORESET | Frequency Offset in RB of RMSI CORESET numerology |
|---|---|---|---|---|
| 1 | Pattern 1 | 48 | 1 | 2 |
| 2 | Pattern 1 | 48 | 1 | 6 |
| 3 | Pattern 1 | 48 | 1 | 10 |
| 4 | Pattern 1 | 48 | 1 | 14 |
| 5 | Pattern 1 | 48 | 1 | 18 |
| 6 | Pattern 1 | 48 | 1 | 22 |
| 7 | Pattern 1 | 48 | 1 | 26 |
| 8 | Pattern 1 | 48 | 2 | 2 |
| 9 | Pattern 1 | 48 | 2 | 6 |
| 10 | Pattern 1 | 48 | 2 | 10 |
| 11 | Pattern 1 | 48 | 2 | 14 |
| 12 | Pattern 1 | 48 | 2 | 18 |
| 13 | Pattern 1 | 48 | 2 | 22 |
| 14 | Pattern 1 | 48 | 2 | 26 |
| 15 | Reserved | | | |
| 16 | Reserved | | | |

TABLE 2

Set of resource blocks and slot symbols of control resource set for Type0-PDCCH search space when {SS/PBCH block, PDCCH} subcarrier spacing is {30, 15} kHz for 5 GHz and 6 GHz unlicensed bands

| Configuration Index | Multiplexing Pattern | CORESET BW in RB | Number of Symbols for CORESET | Frequency Offset in RB of RMSI CORESET numerology ΔF2 |
|---|---|---|---|---|
| 1 | Pattern 1 | 96 | 1 | 0 |
| 2 | Pattern 1 | 96 | 1 | 11 |
| 3 | Pattern 1 | 96 | 1 | 22 |
| 4 | Pattern 1 | 96 | 1 | 33 |
| 5 | Pattern 1 | 96 | 1 | 44 |
| 6 | Pattern 1 | 96 | 1 | 55 |
| 7 | Pattern 1 | 96 | 2 | 0 |
| 8 | Pattern 1 | 96 | 2 | 11 |
| 9 | Pattern 1 | 96 | 2 | 22 |
| 10 | Pattern 1 | 96 | 2 | 33 |
| 11 | Pattern 1 | 96 | 2 | 44 |
| 12 | Pattern 1 | 96 | 2 | 55 |
| 13 | Reserved | | | |
| 14 | Reserved | | | |
| 15 | Reserved | | | |
| 16 | Reserved | | | |

For another example, if for a NR unlicensed band, the min CH_BW=20 MHz, and SS SCS is determined as 30 kHz. For this band, the SS raster can be defined as 8640 kHz (24 RBs in SS SCS which is an integer multiple of 4 RBs), and the CORESET BW may satisfy the OCB requirement, e.g. initial DL BWP is approximately the CH_BW. The analysis of the required RB offset for Pattern 1 is as follow. In one embodiment, only same SCS of SS and RMSI is supported (e.g. both of them are 30 kHz), and one example is shown in TABLE 3. In another embodiment, both same and mixed SCS of SS and RMSI are supported, and one example is shown in TABLE 3 and TABLE 4.

For RMSI SCS=15 kHz, if carrier BW is 20 MHz, which is 51 RBs in SS SCS and 106 in RMSI SCS, and RMSI CORESET BW is 96 RBs, and CH_BW−CORESET BW+1=11 RBs in RMSI SCS, so ⌈SS raster/(CH_BW−CORESET BW+1)⌉=5, i.e., 5 configurations are sufficient to configure the RB-level frequency offset between the edges of SS block and RMSI CORESET, and the possible values can be 6, 17, 28, 39, 50 RBs in term of the RMSI CORESET numerology.

For RMSI SCS=30 kHz, if carrier BW is 20 MHz, which is 51 RBs in SS SCS and RMSI SCS, and RMSI CORESET BW is 48 RBs, and CH_BW−CORESET BW+1=4 RBs in RMSI SCS, so ⌈SS raster/(CH_BW−CORESET BW+1)⌉=6, i.e., 6 configurations are sufficient to configure the RB-level frequency offset between the edges of SS block and RMSI CORESET, and the possible values can be 4, 8, 12, 16, 20, 24 RBs in term of the RMSI CORESET numerology.

TABLE 3

Set of resource blocks and slot symbols of control resource set for Type0-PDCCH search space when {SS/PBCH block, PDCCH} subcarrier spacing is {30, 30} kHz for 5 GHz and 6 GHz unlicensed bands

| Configuration Index | Multiplexing Pattern | CORESET BW in RB | Number of Symbols for CORESET | Frequency Offset in RB of RMSI CORESET numerology |
|---|---|---|---|---|
| 1 | Pattern 1 | 48 | 1 | 4 |
| 2 | Pattern 1 | 48 | 1 | 8 |
| 3 | Pattern 1 | 48 | 1 | 12 |
| 4 | Pattern 1 | 48 | 1 | 16 |
| 5 | Pattern 1 | 48 | 1 | 20 |
| 6 | Pattern 1 | 48 | 1 | 24 |
| 7 | Pattern 1 | 48 | 2 | 4 |
| 8 | Pattern 1 | 48 | 2 | 8 |
| 9 | Pattern 1 | 48 | 2 | 12 |
| 10 | Pattern 1 | 48 | 2 | 16 |
| 11 | Pattern 1 | 48 | 2 | 20 |
| 12 | Pattern 1 | 48 | 2 | 24 |
| 13 | Reserved | | | |
| 14 | Reserved | | | |
| 15 | Reserved | | | |
| 16 | Reserved | | | |

| Configuration Index | Multiplexing Pattern | CORESET BW in RB | Number of Symbols for CORESET | Frequency Offset in RB of RMSI CORESET numerology ΔF2 |
|---|---|---|---|---|
| 1 | Pattern 1 | 96 | 1 | 6 |
| 2 | Pattern 1 | 96 | 1 | 17 |
| 3 | Pattern 1 | 96 | 1 | 28 |
| 4 | Pattern 1 | 96 | 1 | 39 |
| 5 | Pattern 1 | 96 | 1 | 50 |
| 6 | Pattern 1 | 96 | 2 | 6 |
| 7 | Pattern 1 | 96 | 2 | 17 |
| 8 | Pattern 1 | 96 | 2 | 28 |
| 9 | Pattern 1 | 96 | 2 | 39 |
| 10 | Pattern 1 | 96 | 2 | 50 |
| 11 | Pattern 1 | 96 | 3 | 6 |
| 12 | Pattern 1 | 96 | 3 | 17 |
| 13 | Pattern 1 | 96 | 3 | 28 |
| 14 | Pattern 1 | 96 | 3 | 39 |
| 15 | Pattern 1 | 96 | 3 | 50 |
| 16 | Reserved | | | |

TABLE 4

Set of resource blocks and slot symbols of control resource set for Type0-PDCCH search space when {SS/PBCH block, PDCC} subcarrier spacing is {30, 15} kHz for 5 GHz and 6 GHz unlicensed bands

| Configuration Index | Multiplexing Pattern | CORESET BW in RB | Number of Symbols for CORESET | Frequency Offset in RB of RMSI CORESET numerology ΔF2 |
|---|---|---|---|---|
| 1 | Pattern 1 | 96 | 1 | 6 |
| 2 | Pattern 1 | 96 | 1 | 17 |
| 3 | Pattern 1 | 96 | 1 | 28 |
| 4 | Pattern 1 | 96 | 1 | 39 |
| 5 | Pattern 1 | 96 | 1 | 50 |
| 6 | Pattern 1 | 96 | 2 | 6 |
| 7 | Pattern 1 | 96 | 2 | 17 |
| 8 | Pattern 1 | 96 | 2 | 28 |
| 9 | Pattern 1 | 96 | 2 | 39 |
| 10 | Pattern 1 | 96 | 2 | 50 |
| 11 | Pattern 1 | 96 | 3 | 6 |
| 12 | Pattern 1 | 96 | 3 | 17 |
| 13 | Pattern 1 | 96 | 3 | 28 |
| 14 | Pattern 1 | 96 | 3 | 39 |
| 15 | Pattern 1 | 96 | 3 | 50 |
| 16 | Reserved | | | |

In yet another embodiment, in NR licensed spectrum, the time-domain configuration of common search spaces in the CORESET is indicated using 4 bits in PBCH content. For NRU, due to LBT, the starting timing of the search spaces can be undetermined.

In one example, the time offset in the time-domain configuration of common search spaces for RMSI/OSI/Paging is 0 ms, e.g. the CORESET and PDSCH of RMSI/OSI/Paging are always confined within the same slot as SS/PBCH block.

In another example, the time offset in the time-domain configuration of common search spaces for RMSI/OSI/Paging is defined as the timing offset between the start of two configured windows for SS/PBCH block and RMSI/OSI/Paging, respectively. In one sub-embodiment, the time offset can be configurable among {0, X, 5, 5+X} ms, wherein X is the transmission duration of SS/PBCH blocks.

In yet another example, the time offset in the time-domain configuration of common search spaces for RMSI/OSI/Paging is defined as the timing offset between the start of actually transmitted instances for SS/PBCH block and RMSI/OSI/Paging, respectively. For example, can be configurable among {0.5, 1} ms if the SCS of SS/PBCH block is 30 kHz and L=4. For another example, can be configurable among {0.5, 1, 1.5, 2} ms if the SCS of SS/PBCH block is 30 kHz and L=8. For yet another example, can be configurable among {0.25, 0.5} ms if the SCS of SS/PBCH block is 60 kHz and L=4. For yet another example, can be configurable among {0.25, 0.5, 0.75, 1} ms if the SCS of SS/PBCH block is 60 kHz and L=8.

In yet another example, can be configurable among {0.25, 0.5, 0.75, 1, 1.25, 1.5, 1.75, 2} ms if the SCS of SS/PBCH block is 30 kHz and L=8. For yet another example, can be configurable among {0.125, 0.25, 0.375, 0.5, 0.6125, 0.75, 0.875, 1} ms if the SCS of SS/PBCH block is 60 kHz and L=8.

Note that combination of the aforementioned embodiments can be supported.

In yet another embodiment, there can be an indication of whether a CSI-RS resource is configured and/or how the CSI-RS resource is configured in a DSCH-block.

In one example, the indication can be in the PBCH content. In another example, the indication can be in the DCI carried by the PDCCH of RMSI/OSI/Paging if multiplexed in the DSCH-block.

The configuration of the DSCH-window can contain at least one of the window periodicity, window duration (e.g. D_DSCH), and possibly window offset depending on the transmission option.

In one embodiment, the window periodicity and window duration can be configured using at least one of the following embodiments/examples.

In one example, there is one set of predefined/default window periodicity and window duration assumed at the UE for initial cell search, and the window periodicity and/or window duration can be reconfigured after reception of the DSCH-block. For example, a UE assumes default window periodicity as 20 ms and default window duration as 5 ms, and the reconfigured window periodicity/duration can be indicated in RMSI content.

In another example, there is one set of predefined/default window periodicity and window duration assumed at the UE for initial cell search, and the window periodicity and/or window duration can be reconfigured in RRC. For example, a UE assumes default window periodicity as 20 ms and default window duration as 5 ms, and the reconfigured window periodicity/duration can be indicated in RRC.

In yet another example, there is one set of predefined/default window periodicity and window duration assumed at the UE and no reconfiguration of the window periodicity and window duration. For example, UE always assumes the window periodicity as 20 ms and window duration as 5 ms.

In yet another embodiment, due to the uncertainty of the channel access for NRU, the start of the SS/PBCH block burst set may not be always at the beginning of every 5 ms as in the licensed spectrum. Although the symbol timing info within a slot/mini-slot can be obtained by fixing the multiplexing pattern in the slot/mini-slot, one may not know the timing of slot/mini-slot (or equivalently the actual transmission starting timing).

In one example, it is beneficial to obtain the offset information without reading the content of PBCH or RMSI/OSI/Paging if multiplexed in the DSCH-block, such that UE can determine the half frame timing information without channel decoding.

For one example, the offset information can be indicated in enhanced PSS/SSS (if supported). For another example, the offset information can be indicated in the DMRS sequence of PBCH. For instance, the indication of O_DSCH can be combined with the SS/PBCH block index or DSCH-block index to be delivered by the initial condition of DMRS sequence.

For yet another example, the offset information can be indicated in the DMRS sequence of enhanced PBCH (if supported). For instance, if there can be extra REs mapped for DMRS comparing to licensed spectrum, the indication of O_DSCH can be combined with the SS/PBCH block index or DSCH-block index to be delivered by the initial condition of DMRS sequence of enhanced PBCH, or to be delivered by the initial condition of a separate DMRS sequence for the extra REs.

For yet another example, the offset information can be indicated in the mapping pattern of DMRS sequence. For instance, the combination of different RE locations in PBCH symbols can be used to indicate the offset information.

For yet another example, the offset information can be indicated in the mapping order of DMRS sequence in the time and/or frequency domain.

For yet another example, the offset information can be indicated in the mapping pattern of DMRS sequence. For instance, the combination of different RE locations in PBCH symbols can be used to indicate the offset information.

For yet another example, the offset information can be indicated in the mapping order of SSS sequence in the frequency domain, such as using low-to-high or high-to-low mapping order to indicate 1 bit.

For yet another example, the offset information can be indicated in the mapping order of SSS and eSSS sequence in the frequency domain, such as using different mapping order SSS and eSSS to indicate 1 bit.

In another example, the offset information can be indicated or partially indicated in channels in DSCH-block which requires channel decoding (either polar decoding or LDPC decoding) to acquire the information, such as if the signals other than of PBCH or RMSI PDCCH/PDSCH cannot be sufficient to indicate the offset.

For one example, the offset information or part of the offset information can be signaled by PBCH. For instance, reserved bit(s) or bit(s) that can be saved for NRU can be used for indicating the offset. In one consideration, the bits carrying offset information in PBCH content may not be scrambled in the first-level of PBCH scrambling (e.g. the scrambling performed before attaching CRC).

For another example, the offset information or part of the offset information can be signaled by PDCCH of RMSI. For instance, reserved bit(s) or bit(s)/field(s) that can be saved for NRU in the DCI format can be used for indicating the offset.

For yet another example, the offset information can be signaled by PDSCH of RMSI.

In yet another example, since the offset information is common for all DSCH-blocks within a DSCH-window, it can be signaled/indicated outside of the DSCH-blocks and using other signal/channels in the same DSCH-window.

For one example, if wake-up-signal or preamble is supported, the offset can be signaled/indicated by wake-up-signal or preamble in the same DSCH-window.

In yet another embodiment, each of RMSI/OSI/paging can be transmitted using a separate window, and RMSI/OSI/paging's configuration can follow similar design principle to DSCH-window.

For one example, when RMSI is transmitted using a separate window other than the one configured by DTTC, the configuration of RMSI-window (e.g. RMSI transmission timing configuration, short for RTTC) can contain at least one of a window periodicity, a window duration, and a window offset.

In one example, there is one set of predefined/default window periodicity and window duration of RMSI transmission assumed at the UE for initial access, and the window periodicity and/or window duration can be reconfigured after reception of the RMSI. For example, UE assumes default window periodicity as 20 ms and default window duration as 5 ms, and the reconfigured window periodicity/duration can be indicated in RMSI content.

In another example, there is one set of predefined/default window periodicity and window duration of RMSI transmission assumed at the UE for initial access, and the window periodicity and/or window duration can be reconfigured after RRC connection. For example, UE assumes default window periodicity as 20 ms and default window duration as 5 ms, and the reconfigured window periodicity/duration can be indicated in RRC.

In yet another example, there is one set of predefined/default window periodicity and window duration of RMSI transmission assumed at the UE and no reconfiguration of the window periodicity and window duration. For example, a UE always assumes the window periodicity as 20 ms and window duration as 5 ms.

In one example, there can be a timing offset between the start of RMSI transmission and window boundary within a RMSI-window due to LBT.

In one example, the offset information can be signaled by PDCCH of RMSI. For instance, reserved bit(s) or bit(s)/field(s) that can be saved for NRU in the DCI format can be used for indicating the offset.

In another example, offset information can be signaled by PDSCH of RMSI.

In yet another example, the offset information can be signaled/indicated outside of the RMSI-blocks. For instance, if wake-up-signal or preamble is supported, the offset can be signaled/indicated by wake-up-signal or preamble.

In another example, when broadcast OSI is transmitted using a separate window other than the one configured by DTTC, the configuration of OSI-window (e.g. OSI transmission timing configuration, short for OTTC) can contain at least one of a window periodicity, a window duration, and a window offset.

In one example, there is one set of predefined/default window periodicity and window duration of OSI transmission assumed at the UE for initial access, and the window periodicity and/or window duration can be reconfigured after reception of the OSI. For example, a UE assumes default window periodicity as 20 ms and default window duration as 5 ms, and the reconfigured window periodicity/duration can be indicated in RMSI or OSI content.

In another example, there is one set of predefined/default window periodicity and window duration of OSI transmission assumed at the UE for initial access, and the window periodicity and/or window duration can be reconfigured after RRC connection. For example, UE assumes default window periodicity as 20 ms and default window duration as 5 ms, and the reconfigured window periodicity/duration can be indicated in RRC.

In yet another example, there is one set of predefined/default window periodicity and window duration of OSI transmission assumed at the UE and no reconfiguration of the window periodicity and window duration. For example, a UE always assumes the window periodicity as 20 ms and window duration as 5 ms.

In one example, there can be a timing offset between the start of OSI transmission and window boundary within a OSI-window due to LBT.

In one example, the offset information can be signaled by PDCCH of OSI. For instance, reserved bit(s) or bit(s)/field(s) that can be saved for NRU in the DCI format can be used for indicating the offset.

In another example, offset information can be signaled by PDSCH of OSI.

In yet another example, the offset information can be signaled/indicated outside of the OSI-blocks. For instance, if wake-up-signal or preamble is supported, the offset can be signaled/indicated by wake-up-signal or preamble.

For yet another example, when paging is transmitted using a separate window other than the one configured by DTTC, the configuration of Paging-window (e.g. paging transmission timing configuration, short for PTTC) can contain at least one of a window periodicity, a window duration, and a window offset.

In one example, there is one set of predefined/default window periodicity and window duration of paging transmission assumed at the UE for initial access, and the window periodicity and/or window duration can be reconfigured after reception of paging. For example, a UE assumes default window periodicity as 20 ms and default window duration as 5 ms, and the reconfigured window periodicity/duration can be indicated in RMSI or OSI content.

In another example, there is one set of predefined/default window periodicity and window duration of paging transmission assumed at the UE for initial access, and the window periodicity and/or window duration can be reconfigured after RRC connection. For example, UE assumes default window periodicity as 20 ms and default window duration as 5 ms, and the reconfigured window periodicity/duration can be indicated in RRC.

In yet another example, there is one set of predefined/default window periodicity and window duration of paging transmission assumed at the UE and no reconfiguration of the window periodicity and window duration. For example, UE always assumes the window periodicity as 20 ms and window duration as 5 ms.

In example, there can be a timing offset between the start of Paging transmission and window boundary within a Paging-window due to LBT.

In one example, the offset information can be signaled by PDCCH of paging. For instance, reserved bit(s) or bit(s)/field(s) that can be saved for NRU in the DCI format can be used for indicating the offset.

In another example, offset information can be signaled by PDSCH of paging.

In yet another example, the offset information can be signaled/indicated outside of the paging-blocks. For instance, if wake-up-signal or preamble is supported, the offset can be signaled/indicated by wake-up-signal or preamble.

In yet another embodiment, the windows configured by at least one of DTTC, RTTC, OTTC, or PTTC can overlap. A UE can assume reception of all the corresponding SS/PBCH blocks, or RMSI, or OSI, or Paging, in the overlapped window, if SS/PBCH blocks, or RMSI, or OSI, or Paging is configured in the overlapped window.

In yet another embodiment, there is an indication of actually transmitted SS/PBCH blocks. In one example, for NR-U, the SS/PBCH blocks correspond to the indication of actually transmitted SS/PBCH blocks may be consecutive. For example, for the indication of actually transmitted SS/PBCH block in RMSI (e.g. ssb-PositionsInBurst in RMSI), the indication is expressed in a bitmap with length same as the maximum number of SS/PBCH blocks, then the "1" in the bitmap, indicating the corresponding SS/PBCH block is transmitted, may be consecutive. For another example, for the indication of actually transmitted SS/PBCH block in RRC (e.g. ssb-PositionsInBurst in RRC), the indication is expressed in a bitmap with length same as the maximum number of SS/PBCH blocks, then the "1" in the bitmap, indicating the corresponding SS/PBCH block is transmitted, may be consecutive.

Figure 22:
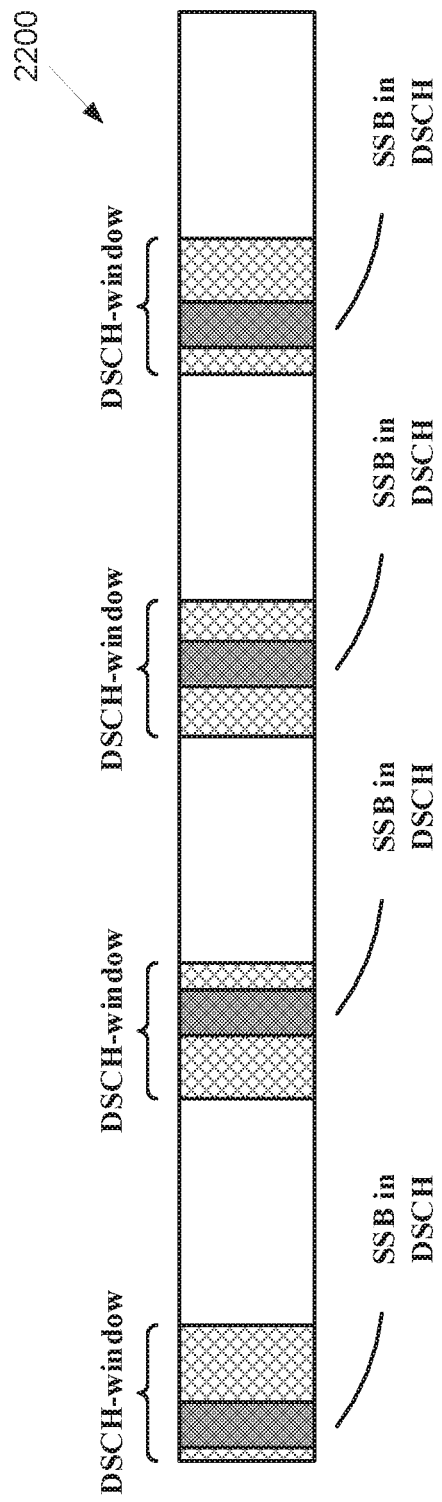
FIG. 22 illustrates an example configuration of SS/PBCH block within DSCH according to embodiments of the present disclosure.

FIG. 22 illustrates an example configuration of SS/PBCH block within DSCH 2200 according to embodiments of the present disclosure. The embodiment of the configuration of SS/PBCH block within DSCH 2200 illustrated in FIG. 22 is for illustration only. FIG. 22 does not limit the scope of this disclosure to any particular implementation.

In one embodiment, all SS/PBCH blocks are determined as part of DSCH for NR unlicensed. For this embodiment, the transmission of SS/PBCH blocks and timing and QCL determination from SS/PBCH blocks follow the embodiments/examples for DSCH described in this disclosure. An illustration of this embodiment is shown in FIG. 22.

Figure 23:
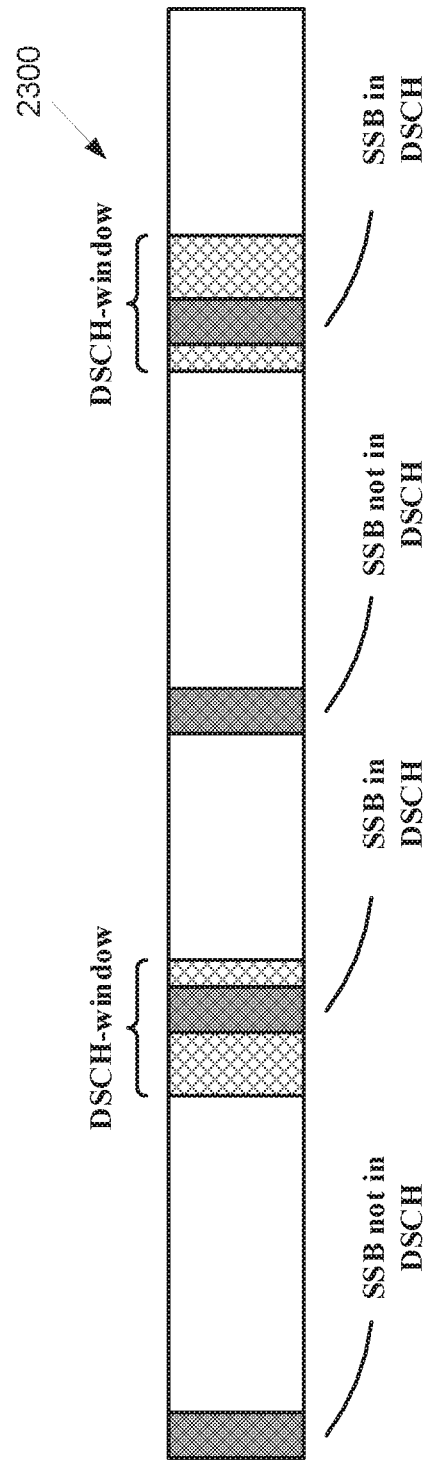
FIG. 23 illustrates an example configuration of SS/PBCH block within DSCH according to embodiments of the present disclosure.

FIG. 23 illustrates an example configuration of SS/PBCH block within DSCH 2300 according to embodiments of the present disclosure. The embodiment of the configuration of SS/PBCH block within DSCH 2300 illustrated in FIG. 23 is for illustration only. FIG. 23 does not limit the scope of this disclosure to any particular implementation.

In another embodiment, part of the SS/PBCH blocks can be configured as part of DSCH for NR unlicensed. For this embodiment, the transmission of SS/PBCH blocks and timing and QCL determination from SS/PBCH blocks follow the embodiments/examples for DSCH described in this disclosure, and the remaining SS/PBCH blocks not as part of DSCH are mapped to the potential locations in a same way as NR licensed but actually transmitted subject to the LBT. An illustration of this embodiment is shown in FIG. 23.

In one example, whether the SS/PBCH block is part of DSCH or not is explicitly indicated to the UE.

In one example, the indication of whether the SS/PBCH block is part of DSCH or not is carried by the DMRS of PBCH in the corresponding SS/PBCH block. This indication can be either an independent bit or jointly coded with the timing offset O_DSCH. For instance, if jointly coded with the timing offset O_DSCH, the candidate values of this indication can be {Not_DSCH, O_DSCH_0, O_DSCH_1, . . . }, wherein Not_DSCH means the SS/PBCH is not part of DSCH, and O_DSCH_i means the SS/PBCH is part of DSCH and the timing offset between the transmission starting location and window starting location is i, where i corresponds to a possible value that O_DSCH can take.

In another example, the indication of whether the SS/PBCH block is part of DSCH or not is carried by the content of PBCH in the corresponding SS/PBCH block. This indication can be either an independent bit or jointly coded with the timing offset O_DSCH. For instance, if jointly coded with the timing offset O_DSCH, the candidate values of this indication can be {Not_DSCH, O_DSCH_0, O_DSCH_1, . . . }, wherein Not_DSCH means the SS/PBCH is not part of DSCH, and O_DSCH_i means the SS/PBCH is part of DSCH and the timing offset between the transmission starting location and window starting location is i, where i corresponds to a possible value that O_DSCH can take.

In another example, whether the SS/PBCH block is part of DSCH or not is not explicitly indicated to the UE, and if the SS/PBCH block is not part of DSCH, O_DSCH=0, which means there is no distinguish from the following two scenarios: 1) SS/PBCH block is not part of DSCH; 2) SS/PBCH block is part of DSCH, and the timing offset between the transmission starting location and window starting location is 0. This is no need to distinguish the two scenarios since the two scenarios are equivalent to the UE in an initial cell search procedure, and the UE can determine the timing information in the same way for the two scenarios.

In yet another example, the content of PBCH, other than the timing offset O_DSCH (if carried by the content of PBCH), is the same for all SS/PBCH blocks in a burst set on the same carrier frequency layer, which means even though a burst set can be transmitted in a different half frame and/or a different frame indicated by the PBCH content (e.g. the DSCH window is large), there is no need for another channel coding of PBCH content.

In yet another example, the content of PBCH, other than the timing information (e.g. including at least the SS/PBCH block index, SFN, half frame indicator, and timing offset O_DSCH (if carried by the content of PBCH)), is the same for all SS/PBCH blocks across burst sets on the same carrier frequency layer, which means the multiplexing pattern, the relative frequency location of CORESET comparing to SS/PBCH block, the BW of CORESET, and the number of symbols for CORESET are the same for all SS/PBCH blocks on the same carrier frequency layer.

Figure 24:
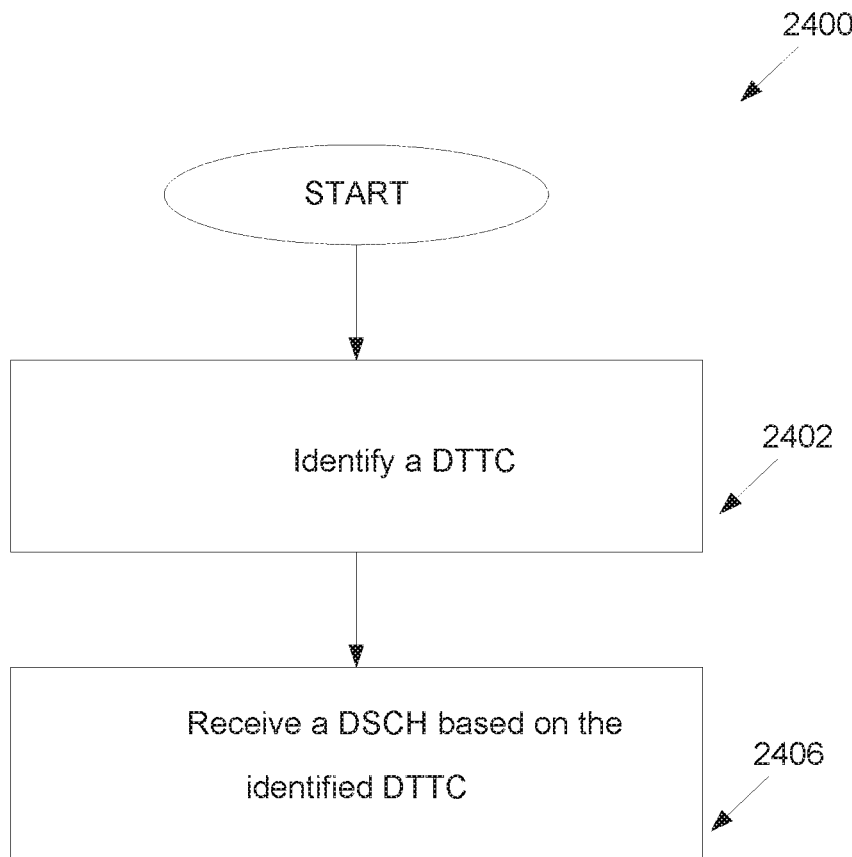
FIG. 24 illustrates an example of a flow chart of a method for discovery signal and channel according to embodiments of the present disclosure.

FIG. 24 illustrates an example of a flow chart of a method 2400 for discovery signal and channel according to embodiments of the present disclosure, as may be performed by a user equipment (UE) (e.g., 111-116 as illustrated in FIG. 1). The embodiment of the method 2400 illustrated in FIG. 24 is for illustration only. FIG. 24 does not limit the scope of this disclosure to any particular implementation.

As illustrated in FIG. 24, the method 2400 begins at step 2402. In step 2402, the UE identifies a discovery signals and channels (DSCH) transmission timing configuration (DTTC) including at least one of a first periodicity, a duration of a first transmission window, or a first timing offset of the first transmission window, wherein the DTTC is identified for the DSCH or radio link monitoring (RLM) in a serving cell.

The UE identifies a DSCH measurement timing configuration (DMTC) including at least one of a second periodicity, a duration of a second transmission window, or a second timing offset of the second transmission window, wherein the DMTC is identified for radio resource management (RRM) measurement based on the DSCH.

In step 2406, the UE receives, from a base station (BS), at least one DSCH from a set of DSCH over unlicensed downlink channels based on the identified DTTC, wherein the received at least one DSCH includes a synchronization signals and physical broadcast channel (SS/PBCH) block.

In one embodiment, the UE determines at least one of the DSCH including a set of control resource sets (CORESET) for monitoring a set of physical downlink control channels (PDCCH) and a set of physical downlink shared channels (PDSCH) scheduled by the set of PDCCH, each of the set of PDSCH including information for at least one of a remaining minimum system information (RMSI), other system information (OSI), or a paging message; or the DSCH including a set of channel state information reference signals (CSI-RS).

In such embodiment, the set of CORESET and the set of SS/PBCH blocks in the set of DSCH are configured to locate in different time instances, respectively, and a bandwidth of the set of SS/PBCH blocks and a bandwidth of the set of CORESET are configured to overlap each other.

In such embodiment, the set of CORESET and the set of SS/PBCH blocks are configured to locate in a same slot when the set of CORESET for monitoring the set of PDCCH includes information for the RMSI In such embodiment, the set of CORESET and the set of SS/PBCH blocks are configured to locate in different slots, respectively, when the set of CORESET for monitoring the set of PDCCH includes information for at least one of the OSI or the paging message, wherein a timing offset between a slot including the set of CORESET and a slot including the set of SS/PBCH blocks is determined as a time duration including transmissions of the set of SS/PBCH blocks.

In one embodiment, the UE identifies an index of the received SS/PBCH block in DSCH and a location of the received SS/PBCH block in DSCH of two predefined locations within a slot in the DTTC.

In one embodiment, the UE determines a starting slot of the transmission of the set of DSCH.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station (BS) in a wireless communication system, the BS comprising:
at least one processor configured to:
identify a set of discovery signals and channels (DSCH) including a set of synchronization signals and physical broadcast channel (SS/PBCH) blocks;
identify a DSCH transmission timing configuration (DTTC) including a first periodicity, a duration of a first transmission window, and a first timing offset of the first transmission window, wherein the DTTC is identified for a transmission of the set of DSCH and radio link monitoring (RLM) in a serving cell;
identify a DSCH measurement timing configuration (DMTC) including a second periodicity, a duration of a second transmission window, and a second timing offset of the second transmission window, wherein the DMTC is identified for radio resource management (RRM) measurement based on the set of DSCH; and
perform a channel access procedure based on listen-before-talk (LBT) procedure for the set of DSCH based on the identified DTTC; and
a transceiver operably connected to the processor, the transceiver configured to transmit, to a user equipment (UE), the set of DSCH over unlicensed downlink channels based on the LBT procedure.

2. The BS of claim 1, wherein the at least one processor is further configured to determine the set of DSCH including a set of control resource sets (CORESET) for monitoring a set of physical downlink control channels (PDCCH) and a set of physical downlink shared channels (PDSCH) scheduled by the set of PDCCH, each of the set of PDSCH including information for a remaining minimum system information (RMSI).

3. The BS of claim 2, wherein:
the set of CORESET and the set of SS/PBCH blocks in the set of DSCH are configured to locate in different time instances, respectively, and
a bandwidth of the set of SS/PBCH blocks and a bandwidth of the set of CORESET are configured to overlap each other.

4. The BS of claim 3, wherein the set of CORESET and the set of SS/PBCH blocks are in a same slot when the set of CORESET for monitoring the set of PDCCH includes information for the RMSI.

5. The BS of claim 1, wherein:
at least one slot in the DTTC includes two predefined locations for a transmission of each of the set of SS/PBCH blocks in the set of DSCH;
a starting slot of the transmission of the set of DSCH is determined as a first slot based on the LBT procedure; and
an index of each of the set of SS/PBCH blocks in the set of DSCH is given by i mod L where i is an index of a location for the transmission of each of the set of SS/PBCH blocks in the set of DSCH within the identified DTTC, and L is a maximum number of the set of SS/PBCH blocks within the DTTC.

6. The BS of claim 5, wherein the starting slot of the transmission of the set of DSCH is indicated in the set of DSCH.

7. The BS of claim 1, wherein an LBT category and a channel access priority class are determined based on a transmission duration of the set of DSCH, the transmission duration of the set of DSCH being determined based on an indication of actually transmitted SS/PBCH blocks in the set of DSCH.

8. The BS of claim 1, wherein the DTTC is separately configured from the DMTC, the DMTC is used for measurement of the DSCH, and the DTTC is used for rate matching on the serving cell.

9. A user equipment (UE) in a wireless communication system, the UE comprising:
at least one processor configured to:
identify a discovery signals and channels (DSCH) transmission timing configuration (DTTC) including a first periodicity, a duration of a first transmission window, and a first timing offset of the first transmission window, wherein the DTTC is identified for the DSCH and radio link monitoring (RLM) in a serving cell; and identify a DSCH measurement timing configuration (DMTC) including a second periodicity, a duration of a second transmission window, and a second timing offset of the second transmission window, wherein the DMTC is identified for radio resource management (RRM) measurement based on the DSCH; and a transceiver operably connected to the processor, the transceiver configured to receive, from a base station (BS), at least one DSCH from a set of DSCH over unlicensed downlink channels based on the identified DTTC, wherein the received at least one DSCH includes a synchronization signals and physical broadcast channel (SS/PBCH) block.

10. The UE of claim 9, wherein the at least one processor is further configured to determine the set of DSCH including a set of control resource sets (CORESET) for monitoring a set of physical downlink control channels (PDCCH) and a set of physical downlink shared channels (PDSCH) scheduled by the set of PDCCH, each of the set of PDSCH including information for at least one of a remaining minimum system information (RMSI).

11. The UE of claim 10, wherein:
the set of CORESET and the SS/PBCH block in the set of DSCH are configured to locate in different time instances, respectively, and
a bandwidth of the SS/PBCH block and a bandwidth of the set of CORESET are configured to overlap each other.

12. The UE of claim 11, wherein the set of CORESET and the SS/PBCH block are in a same slot when the set of CORESET for monitoring the set of PDCCH includes information for the RMSI.

13. The UE of claim 9, wherein the at least one processor is further configured to determine:
an index of the received SS/PBCH block in the at least one DSCH; and
a location of the received SS/PBCH block in the at least one DSCH of two predefined locations within a slot in the DTTC.

14. The UE of claim 13, wherein the at least one processor is further configured to determine a starting slot of the reception of the at least one DSCH.

15. A method of base station (BS) in a wireless communication system, the method comprising:
identifying a set of discovery signals and channels (DSCH) including a set of synchronization signals and physical broadcast channel (SS/PBCH) blocks;
identifying a DSCH transmission timing configuration (DTTC) including a first periodicity, a duration of a first transmission window, and a first timing offset of the first transmission window, wherein the DTTC is identified for a transmission of the set of DSCH and radio link monitoring (RLM) in a serving cell;

identifying a DSCH measurement timing configuration (DMTC) including a second periodicity, a duration of a second transmission window, and a second timing offset of the second transmission window, wherein the DMTC is identified for radio resource management (RRM) measurement based on the set of DSCH;
performing a channel access procedure based on listen-before-talk (LBT) procedure for the set of DSCH based on the identified DTTC; and
transmitting, to a user equipment (UE), the set of DSCH over unlicensed downlink channels based on the LBT procedure.

16. The method of claim 15, further comprising determining the set of DSCH including a set of control resource sets (CORESET) for monitoring a set of physical downlink control channels (PDCCH) and a set of physical downlink shared channels (PDSCH) scheduled by the set of PDCCH, each of the set of PDSCH including information for a remaining minimum system information (RMSI).

17. The method of claim 16, wherein:
the set of CORESET and the set of SS/PBCH blocks in the set of DSCH are configured to locate in different time instances, respectively, and
a bandwidth of the set of SS/PBCH blocks and a bandwidth of the set of CORESET are configured to overlap each other.

18. The method of claim 17, wherein the set of CORESET and the set of SS/PBCH blocks are in a same slot when the set of CORESET for monitoring the set of PDCCH includes information for the RMSI.

19. The method of claim 15, wherein:
at least one slot in the DTTC includes two predefined locations for a transmission of each of the set of SS/PBCH blocks in the set of DSCH;
a starting slot of the transmission of the set of DSCH is determined as a first slot based on the LBT procedure; and
an index of each of the set of SS/PBCH blocks in the set of DSCH is given by i mod L where i is an index of a location for the transmission of each of the set of SS/PBCH blocks in the set of DSCH within the identified DTTC, and L is a maximum number of the set of SS/PBCH blocks within the DTTC.

20. The method of claim 19, wherein the starting slot of the transmission of the set of DSCH is indicated in the set of DSCH.

21. The method of claim 15, wherein an LBT category and a channel access priority class are determined based on a transmission duration of the set of DSCH, the transmission duration of the set of DSCH being determined based on an indication of actually transmitted SS/PBCH blocks in the set of DSCH.

* * * * *